(12) United States Patent
Detty et al.

(10) Patent No.: US 7,244,295 B2
(45) Date of Patent: Jul. 17, 2007

(54) HYBRID ANTI-FOULING COATING COMPOSITIONS AND METHODS FOR PREVENTING THE FOULING OF SURFACES SUBJECTED TO A MARINE ENVIRONMENT

(75) Inventors: Michael R. Detty, Rochester, NY (US); Michael D. Drake, Glendale, CA (US); Ying Tang, Amherst, NY (US); Frank V. Bright, Williamsville, NY (US)

(73) Assignee: The Research Foundation of State University of New York, Amherst, NY (US)

( * ) Notice: Subject to any disclaimer, the term of this patent is extended or adjusted under 35 U.S.C. 154(b) by 100 days.

(21) Appl. No.: 10/753,926

(22) Filed: Jan. 7, 2004

(65) Prior Publication Data

US 2005/0013843 A1    Jan. 20, 2005

Related U.S. Application Data

(60) Provisional application No. 60/438,558, filed on Jan. 7, 2003.

(51) Int. Cl.
*C09D 5/14* (2006.01)
(52) U.S. Cl. ............... 106/15.05; 106/287.14; 106/287.11; 106/287.16
(58) Field of Classification Search ........... 106/15.05, 106/287.11, 287.14, 287.16
See application file for complete search history.

(56) References Cited

U.S. PATENT DOCUMENTS

| 4,921,731 A | 5/1990 | Clark et al. |
| 5,677,410 A * | 10/1997 | Mager et al. ............ 528/15 |
| 6,313,193 B1 * | 11/2001 | Simendinger, III ........ 523/122 |
| 6,395,826 B1 | 5/2002 | Mager et al. |
| 6,800,330 B2 * | 10/2004 | Hayashi et al. ........ 427/387 |
| 2004/0126595 A1 * | 7/2004 | Kwon et al. ............ 428/447 |

FOREIGN PATENT DOCUMENTS

| WO | 01/14497 | * 3/2001 |
| WO | 02/094410 | * 11/2002 |

OTHER PUBLICATIONS

Francavilla et al., "Dendrimeric Organochalcogen Catalysts for the Activation of Hydrogen Peroxide: Improved Catalytic Activity through Statistical Effects and Cooperativity in Successive Generations," *J. Am. Chem. Soc.*, 123:57-67 (2001).

Detty et al., "A Mechanism for the Oxidation of Glutathione to Glutathione Disulfide with Organotellurium(IV) and Organoselenium(IV) Compounds. A Stepwise Process with Implications for Photodynamic Therapy and Other Oxidative Chemotherapy," *J. Org. Chem.*, 59:8245-8250 (1994).

Ahsan et al., "Dendrimeric Organotelluride Catalysts for the Activation of Hydrogen Peroxide. Improved Catalytic Activity through Statistical and Stereoelectronic Effects," *Organometallics*, 22:2883-2890 (2003).

Tang et al., "Development of an Anti-Fouling Coating Based on Sol-Gel-Derived Thin Films," Pittcon, New Orleans, LA, USA (Mar. 2002).

* cited by examiner

*Primary Examiner*—Margaret G. Moore
(74) *Attorney, Agent, or Firm*—Nixon Peabody LLP

(57) ABSTRACT

The present invention relates to a coating composition including a sol-gel matrix and a dendrimeric organochalcogeno derivative and a system including the coating composition and a substrate. The present invention also relates to a method of preventing fouling of surfaces subjected to a marine environment.

27 Claims, 38 Drawing Sheets

ELECTRON-RICH ARYLCHALCOGENO GROUPS WITH DIFFERENT SOLUBILITY CHARACTERISTICS.

CORE GROUPS WITH DIFFERENT ATTACHMENT CHARACTERISTICS.

SETTLEMENT OF ENTEROMORPHA ZOOSPORES ON DENDRIMER COATINGS

FIG. 27

DENSITY OF ENTEROMORPHA SPORES REMAINING ON DENDRIMER COATINGS AFTER WATER PRESSURE OF 77 kPa

FIG. 28

DENSITY OF ENTEROMORPHA SPORES REMAINING AFTER PRESSURE OF 83 kPa UNDER WATER JET

FIG. 35

PERCENT REMOVAL OF ENTEROMORPHA SPORES FROM SOL-GELS AFTER PRESSURE OF 83 kPa UNDER WATER JET

FIG. 36

HYBRID ANTI-FOULING COATING COMPOSITIONS AND METHODS FOR PREVENTING THE FOULING OF SURFACES SUBJECTED TO A MARINE ENVIRONMENT

The present invention claims benefit of U.S. Provisional Patent Application Ser. No. 60/438,558, filed Jan. 7, 2003, which is hereby incorporated by reference in its entirety.

The subject matter of this application was made with support from the United States Government under Office of Naval Research (ONR) Grant No. N000140110653 and ONR Grant No. N000140210836.

FIELD OF THE INVENTION

The present invention relates to a coating composition including a sol-gel matrix and a dendrimeric organochalcogeno derivative and methods for preventing the fouling of surfaces subjected to a marine environment.

BACKGROUND OF THE INVENTION

One of the main challenges facing the Office of Naval Research is the development of an inexpensive, environmentally friendly, robust "coating" that can minimize adhesion of native marine species onto the coated surface. Current antifouling approaches work to some degree; however, they all exhibit several drawbacks including: high cost, coating material leaching, ocean pollution, and/or poor surface-to-film stability.

Oxidized sea water, produced by electrolysis or ozonolysis has been used to prevent biofouling on flat surfaces, especially in connection with cooling water intakes of coastal power plants (Allonier et al., *J. Rech. Oceanogr.* 23:21 et al. (1998); Baboian et al., *Mater. Perform.* 19:42 et al. (1980); Johnson et al., *Energy Res. Abstr.* 8, Abstract 10409 (1983)). As a consequence of this application, a significant body of information has been generated with respect to the chemistry associated with the antifouling agents and to their environmental impact. Oxidized seawater involves the equilibria between elemental halogens and water and the corresponding hypochlorous or hypobromous acid. Near the ocean surface, hypochlorous acid/hypochlorite will oxidize bromide to give hypobromous acid/hypobromite with the kinetics of oxidation dependent upon pH, temperature, and halide ion concentrations (Sugum et al., *Chemospere* 10:41 et al. (1981); Fisher et al., *Water Res.* 33:760 et al. (1998, Volume Date 1999)). Thus, the oxidation of either chloride or bromide contained in seawater will produce hypobromous acid as the primary biocide.

The hypohalous acids are produced naturally at low concentrations in seawater. Ocean water is approximately 0.5 M in chloride, 1 mM in bromide, and 1 μM in iodide (Butler et al., *Chem. Rev.* 93:1937 et al. (1993)). Near the surface (0 to 25 meters), ocean water contains $1-2\times10^{-7}$ M (0.1-0.2 μM) hydrogen peroxide (Zika et al., *Geochim. Cosmochim. Acta* 49:1173 et al. (1985)). The photo-oxidation of organic matter in seawater is thought to be the major source of hydrogen peroxide in the ocean via the formation of superoxide, which gives molecular oxygen and hydrogen peroxide in the presence of a proton source (Zika, *EOS* 61:1010 et al. (1980); Cooper et al., *Science* 220:711 et al. (1983); Draper et al., *Agric. Food. Chem.* 31:734 et al. (1983); Draper et al., *Arch. Environ. Contam. Toxicol.* 2:121 et al. (1983)). Chloride, bromide, and iodide are slowly oxidized by hydrogen peroxide in the absence of a catalyst to give the corresponding hypohalous acid (Leulier, *Bull. Soc. Chim. Fr.* 35:1325 et al. (1924); Mohammed et al., *J. Am. Chem. Soc.* 56:1680 et al. (1934)). Nature has taken full advantage of these resources through the evolution of the haloperoxidase enzymes, which produce the halometabolites found in many marine organisms via the enzymatic production of positive halogen species (Butler et al., *Chem. Rev.* 93:1937 et al. (1993); Butler et al., *Coord. Chem. Rev.* 109:61 et al. (1991); Wever et al., Chasten, ed., in *Vanadium in Biological Systems*, Kluwer Academic Publishers: Dordrecht, The Netherlands, pp. 81-97 (1990); Butler, Reedijk, ed., in *Bioinorganic Catalysis*, Marcel Dekker: New York, N.Y., pp. 425-445 (1992)).

Once produced, the hypohalous acids/hypohalites enter a many faceted degradation scheme. As shown in equations 1-3, bromide acts as a catalyst for the degradation of hydrogen peroxide through the intermediacy of hypobromous acid (Butler et al., *Chem. Rev.* 93:1937 et al. (1993); Leulier, *Bull. Soc. Chim. Fr.* 35:1325 et al. (1924); Mohammed et al., *J. Am. Chem. Soc.* 56:1680 et al. (1934); Butler et al., *Coord. Chem. Rev.* 109:61 et al. (1991); Wever et al., Chasten, ed., in *Vanadium in Biological Systems*, Kluwer Academic Publishers: Dordrecht, The Netherlands, pp. 81-97 (1990); Butler, Reedijk, ed., in *Bioinorganic Catalysis*, Marcel Dekker: New York, N.Y., pp. 425-445 (1992)):

$$H_2O_2 + NaBr \longrightarrow HOBr + NaOH \quad (1)$$

$$HOBr + H_2O_2 \longrightarrow H_2O + HBr + O_2 \quad (2)$$

$$2H_2O_2 \longrightarrow 2H_2O + O_2 \quad (3)$$

Other degradation reactions for hypohalous acids involve reduction to halide salts and water in the presence of natural reducing agents (Jaworske et al., *Environ. Sci. Technol.* 19:1188 et al. (1985)), loss to the atmosphere (as $Cl_2$ or $Br_2$) (Helz et al., *Gov. Rep. Announce. Index* 81:2634 et al. (1981)), reactions with ambient ammonia to produce halamines (with oxidation of bromide by hypochlorite being more rapid than production of $ClNH_2$ from $NH_3$) (Sugum et al., *Water Chlorination: Environ. Impact Health Eff.* 3:427 et al. (1980)), and decarboxylation of amino acids found in organic matter near the surface (Helz et al., *Water Chlorination: Environ. Impact Health Eff.* 3:387 et al. (1980); Dotson et al., *Water Chlorination: Environ. Impact Health Eff.* 5:713 et al. (1985)). The production of polyhaloalkanes is a minor degradation process, accounting for less than 4% of the degradation products from hypohalous acids (Helz et al., *Water Chlorination: Environ. Impact Health Eff.* 3:387 et al. (1980); Dotson et al., *Water Chlorination: Environ. Impact Health Eff.* 5:713 et al. (1985)). Furthermore, the degradation of hypobromous acid/hypobromite as well as bromamine derivatives was found to be 2 to 5 times faster than degradation of hypochlorous acid/hypochlorite in the marine environment (Allonier et al., *J. Rech. Oceanogr.* 23:21 et al. (1998); Fisher et al., *Water Res.* 33:760 et al. (1998, Volume Date 1999)).

One environmental concern with the use of hypohalous acids as an antifoulant in coastal power plant cooling towers is the effect of higher concentrations of hypohalous acids on local marine organisms (Fisher et al., *Water Res.* 33:760 et al. (1998, Volume Date 1999); Mimura et al., *Suisan Zoshaku* 46, 579 et al. (1998)). Electrolysis procedures generate hypohalous acids continuously as long as the electrolysis current flows. At concentrations of hypohalous acid greater than 40 μM, delayed hatching in several species of fish eggs has been noted (Mimura et al., *Suisan Zoshaku* 46, 579 et al. (1998)). However, concentrations as low as 0.1 μM have been effective at minimizing the adhesion of marine organisms in cooling water intakes.

Chemists have sought to mimic the halogenation reactions employed by marine organisms in the laboratory. Recent efforts in this area have involved chloroperoxidase (Dexter et al., *J. Am. Chem. Soc.* 117:6412 et al. (1995); Allain et al., *J. Am. Chem. Soc.* 115:4415 et al. (1993)) and bromoperoxiadse (Butler et al., *Chem. Rev.* 93:1937 et al. (1993); Leulier, *Bull. Soc. Chim. Fr.* 35:1325 et al. (1924); Mohammed et al., *J. Am. Chem. Soc.* 56:1680 et al. (1934)) enzymes and model systems to mimic their activity (Collman et al., *J. Am. Chem. Soc.* 117:692 et al. (1995); Palucki et al., *J. Am. Chem. Soc.* 116:9333 et al. (1994); Jacobsen et al., *J. Am. Chem. Soc.* 113:7063 et al. (1991); Lee et al., *Tetrahedron Lett.* 32:6533 et al. (1991); Andersson et al., *Tetrahedron Lett.* 36:2675 et al. (1995); Clague et al., *J. Am. Chem. Soc.* 117:3563 et al. (1995); Meister et al., *Inorg. Chem.* 33:3269 et al. (1994); Colpas et al., *J. Am. Chem. Soc.* 116:3627 et al. (1994); Reynolds et al., *Inorg. Chem.* 33:4977 et al. (1994); Espenson et al., *J. Am. Chem. Soc.* 116:2869 et al. (1994); Ma et al., *Inorg. Chem.* 31:1925 et al. (1992); de la Rosa et al., *J. Am. Chem. Soc.* 114:760 et al. (1992)). These systems use a transition metal (heme-bound iron for chloroperoxidase, non-heme vanadium for bromoperoxidase) (Butler et al., *Chem. Rev.* 93:1937 et al. (1993)) to activate hydrogen peroxide for the oxidation of halide to halogen or halohydrin, which can then react with an appropriate substrate. Model studies have shown that chloride (Soedjak et al., *Inorg. Chem.* 29:5015 et al. (1990)), bromide (Butler et al., *Chem. Rev.* 93:1937 et al. (1993); Leulier, *Bull. Soc. Chim. Fr.* 35:1325 et al. (1924); Mohammed et al., *J. Am. Chem. Soc.* 56:1680 et al. (1934); Andersson et al., *Tetrahedron Lett.* 36:2675 et al. (1995); Clague et al., *J. Am. Chem. Soc.* 117:3563 et al. (1995); Meister et al., *Inorg. Chem.* 33:3269 et al. (1994); Colpas et al., *J. Am. Chem. Soc.* 116:3627 et al. (1994); Reynolds et al., *Inorg. Chem.* 33:4977 et al. (1994); Espenson et al., *J. Am. Chem. Soc.* 116:2869 et al. (1994); Ma et al., *Inorg. Chem.* 31:1925 et al. (1992); de la Rosa et al., *J. Am. Chem. Soc.* 114:760 et al. (1992)), and iodide (Secco, *Inorg. Chem.* 19:2722 et al. (1980); Arias et al., *Can. J. Chem.* 68:1499 et al. (1990)) can be oxidized by such catalysts and that the metal undergoes sequential one-electron steps. These biomimetic reactions are important to chemistry in general because they perform many desired chemical transformations such as epoxidations and halogenations in an environmentally acceptable way by avoiding unneeded byproducts and by using water as the solvent. However, the one-electron steps at the transition metal can lead to reactions derived from halogen radicals that may destroy the active catalyst.

The present invention is directed to overcoming these and other deficiencies in the art.

SUMMARY OF THE INVENTION

The present invention relates to a coating composition including a sol-gel matrix and a dendrimeric organochalcogeno derivative bound to at least a portion of the sol-gel matrix.

Another aspect of the present invention relates to a system including a coating composition including a sol-gel matrix and a dendrimeric organochalcogeno derivative bound to at least a portion of the sol-gel matrix and a substrate, wherein at least a portion of the substrate is coated with the coating composition.

The present invention also relates to a method of preventing fouling of surfaces subjected to a marine environment. This method involves providing a coating composition including a sol-gel matrix. The coating composition is applied to a surface subjected to a marine environment under conditions effective to prevent or reduce fouling of the surface. The coating composition may also include a dendrimeric organochalcogeno derivative bound to at least a portion of the sol-gel matrix.

The sol-gels used in the present invention are very porous and permit ready contact between the dendrimeric derivative and sea water, yet leaching of dendrimeric derivative from the sol-gel matrices does not occur. In this way a layer of hypohalous acid (e.g., bleach) is produced within and at the surface of the coating. Thus, the composition of the present invention is an advanced non-toxic coating that minimizes adhesion of oceanic species to the surface of ocean-going vessels. The composition of the present invention can be used to produce tailored anti-fouling barrier properties which are a function of both the sol-gel chemistry and the activity of the organochalcogenide catalyst used. The active agent(s) in the coating of the present invention do not leach from the coating and are not consumed to effect anti-fouling, thereby eliminating or reducing the risk of contamination to the surrounding environment, while increasing the activity and lifetime of the coating. In addition, the active agents are environmentally benign, thereby reducing the risk to the environment, for example, altering the ocean chemistry or harming higher-order species, if they are released.

The coating of the present invention is easy to produce, robust, and uses the ocean's own reagents (e.g., $Cl^-$, $Br^-$, and hydrogen peroxide) to produce hypohalous acid at the interface between the coated substrate and the marine environment. The hypohalous acid serves as an adhesion barrier to marine species. The use of a coating in accordance with the present invention which can be readily deposited onto ocean-going vessels, exhibits long-term stability, and actually minimizes adhesion of marine borne species, will allow owners of water-borne vessels to realize significant economic benefit (e.g., ship hulls would require less maintenance and hull drag will decrease with a concomitant drop in fuel consumption).

BRIEF DESCRIPTION OF THE DRAWINGS

FIG. 12 shows the electrospray mass spectra for compound 9a.

FIG. 16 shows the electrospray mass spectra for compound 20a.

FIG. 27 is a graph showing the settlement of Enteromorpha zoospores on dendrimer coatings after four hours. Each point is the mean from 90 counts on three replicate slides. Bars show 95% confidence limits.

FIG. 28 is a graph showing the density of spores remaining after exposure to surface pressure of 77 kPa. Each point is the mean from 90 observations on three replicate slides. Bars represent 95% confidence limits.

FIG. 35 is a graph showing the density of spores remaining after exposure to surface pressure of 83 kPa. Each point is the mean from 90 observations on three replicate slides. Bars represent 95% confidence limits.

FIG. 36 is a graph showing detachment plotted as percent removal. Each point represents the mean percentage removal of zoospores from 90 observations of controls and 90 observations of treatments from three replicate slides. Bars represent 95% confidence limits from arcsine transformed slides.

DETAILED DESCRIPTION OF THE INVENTION

The present invention relates to a coating composition including a sol-gel matrix and a dendrimeric organochalcogeno derivative bound to at least a portion of the sol-gel matrix.

In one embodiment of the present invention, the dendrimeric organochalcogeno derivative is an arylchalcogeno derivative. In another embodiment, the arylchalcogeno derivative is based on core structures E, F, G, or H set forth in FIG. 1B, where R is a substituted or unsubstituted C1-C10 alkyl group, substituted or unsubstituted C1-C10 alkenyl group, substituted or unsubstituted aryl group, or substituted or unsubstituted heteroaryl group, and the ring hydroxyl group is modified to produce the dendrimeric arylchalcogeno derivative. Suitable substitutions for the alkyl, alkenyl, aryl, or heteroaryl groups include, but are not limited to, hydroxyl, unsubstituted amino, alkyl amino, carboxylic acid, carboxylic ester, thiol, cyanate, or aldehyde groups that would permit covalent attachment to the sol-gel matrix. Suitable organochalcogeno derivatives in accordance with the present invention include, but are not limited to,

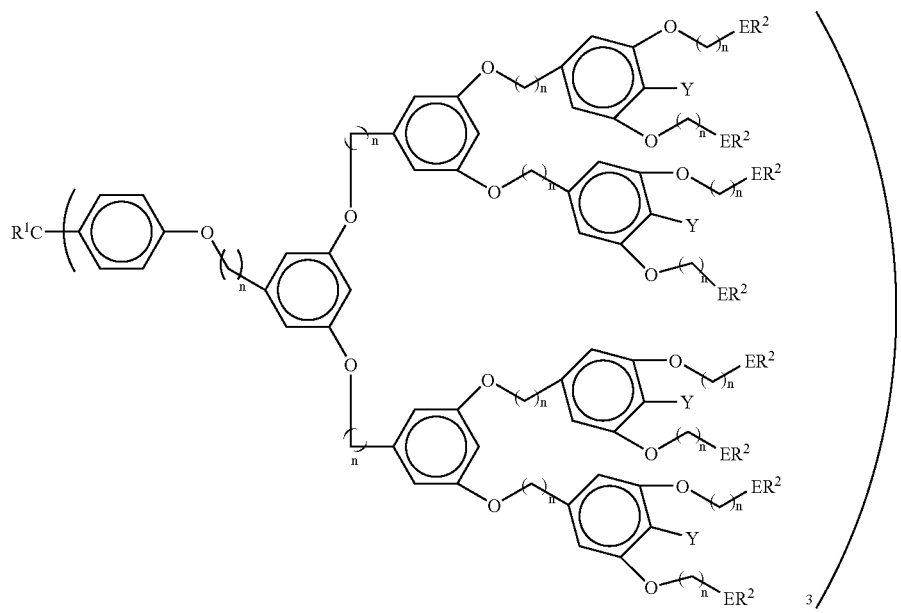

-continued
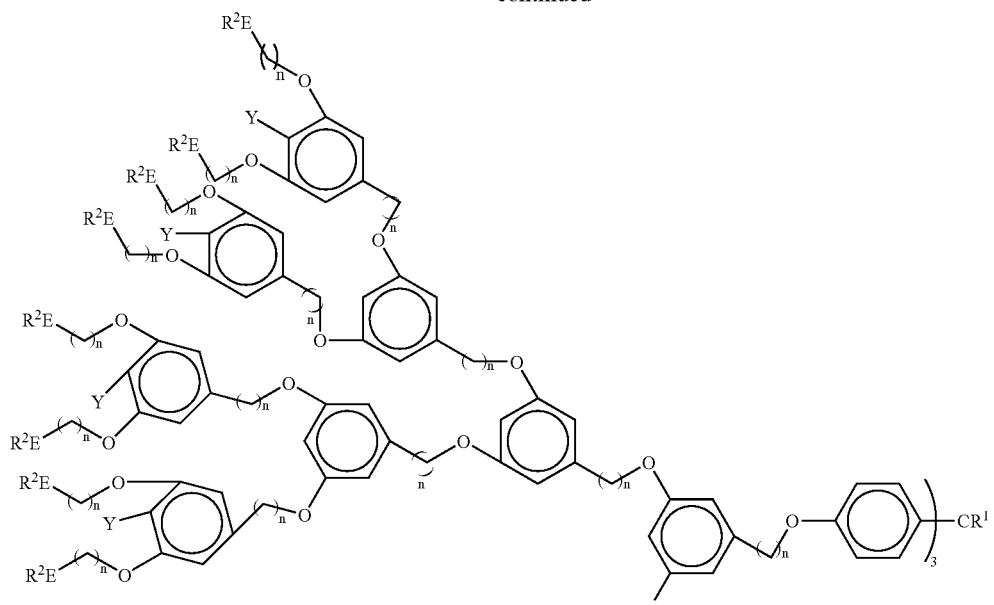
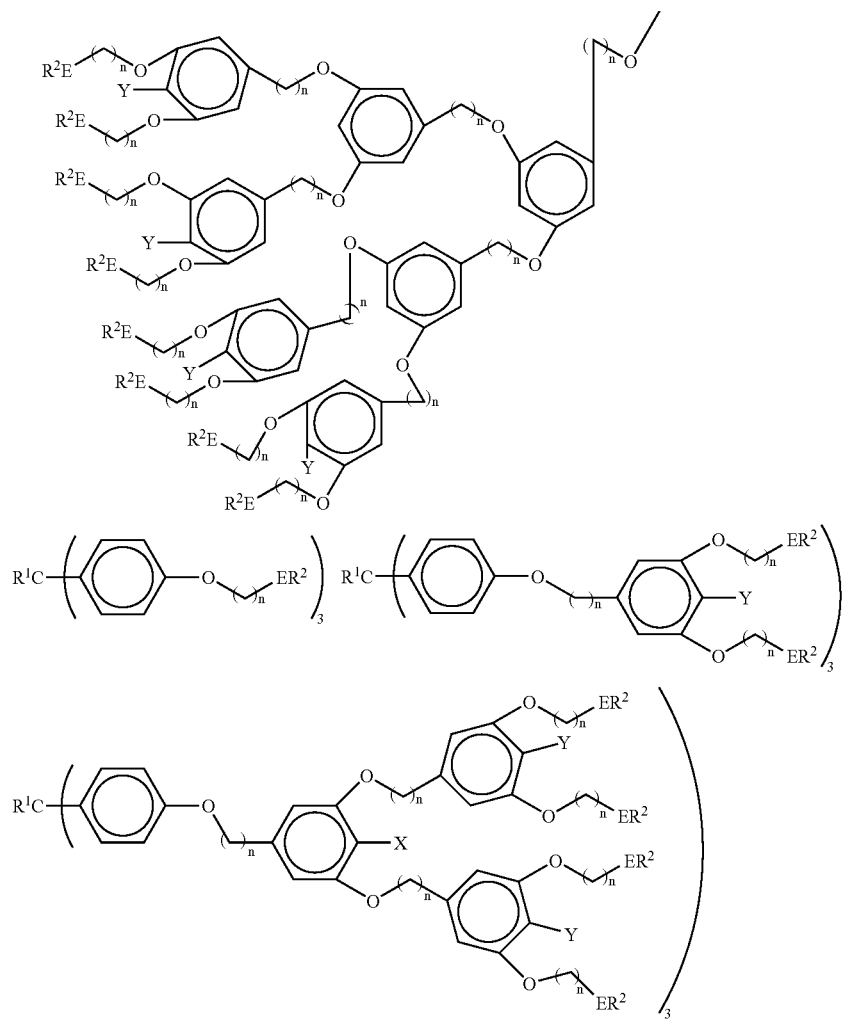

-continued
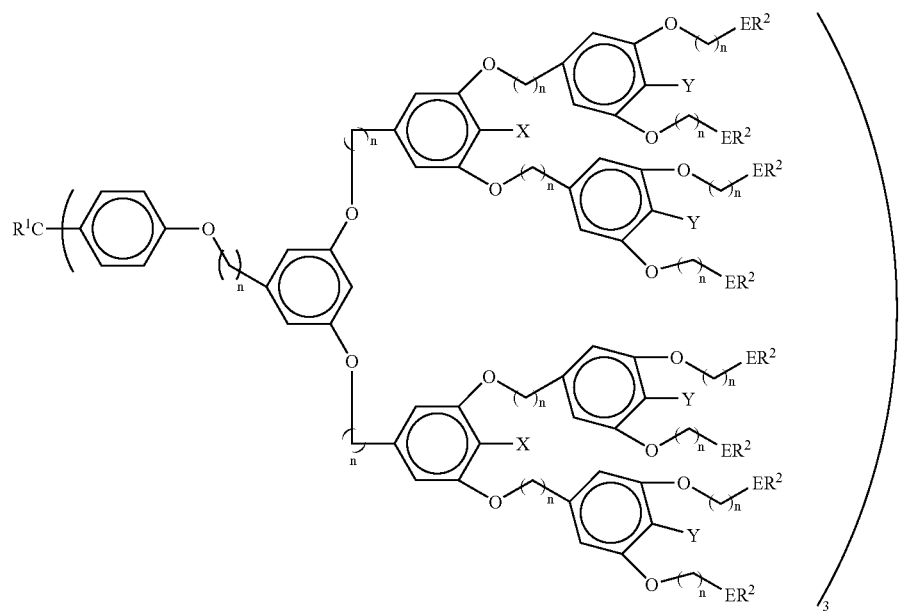
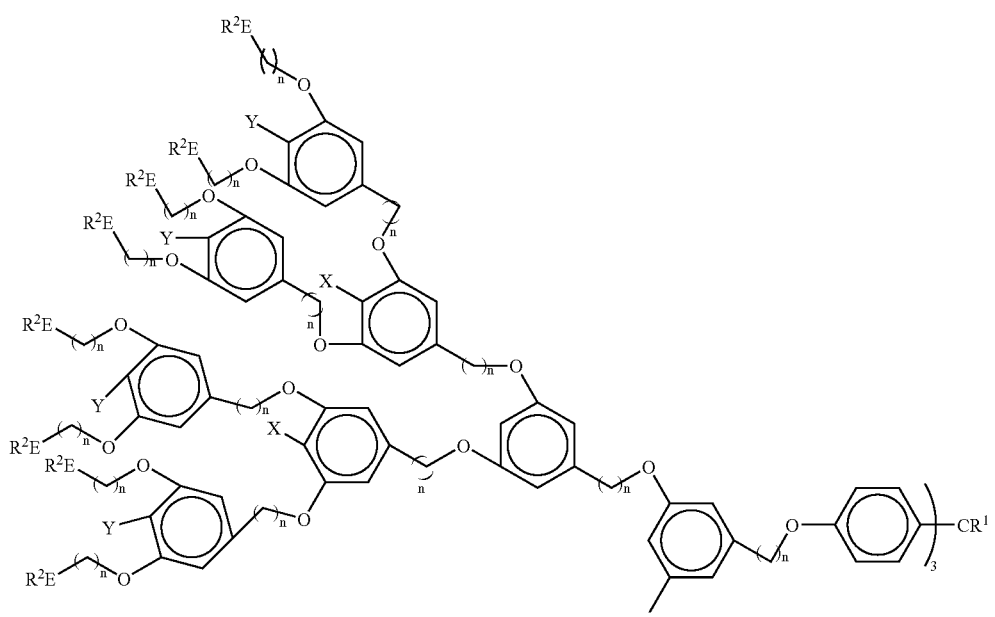

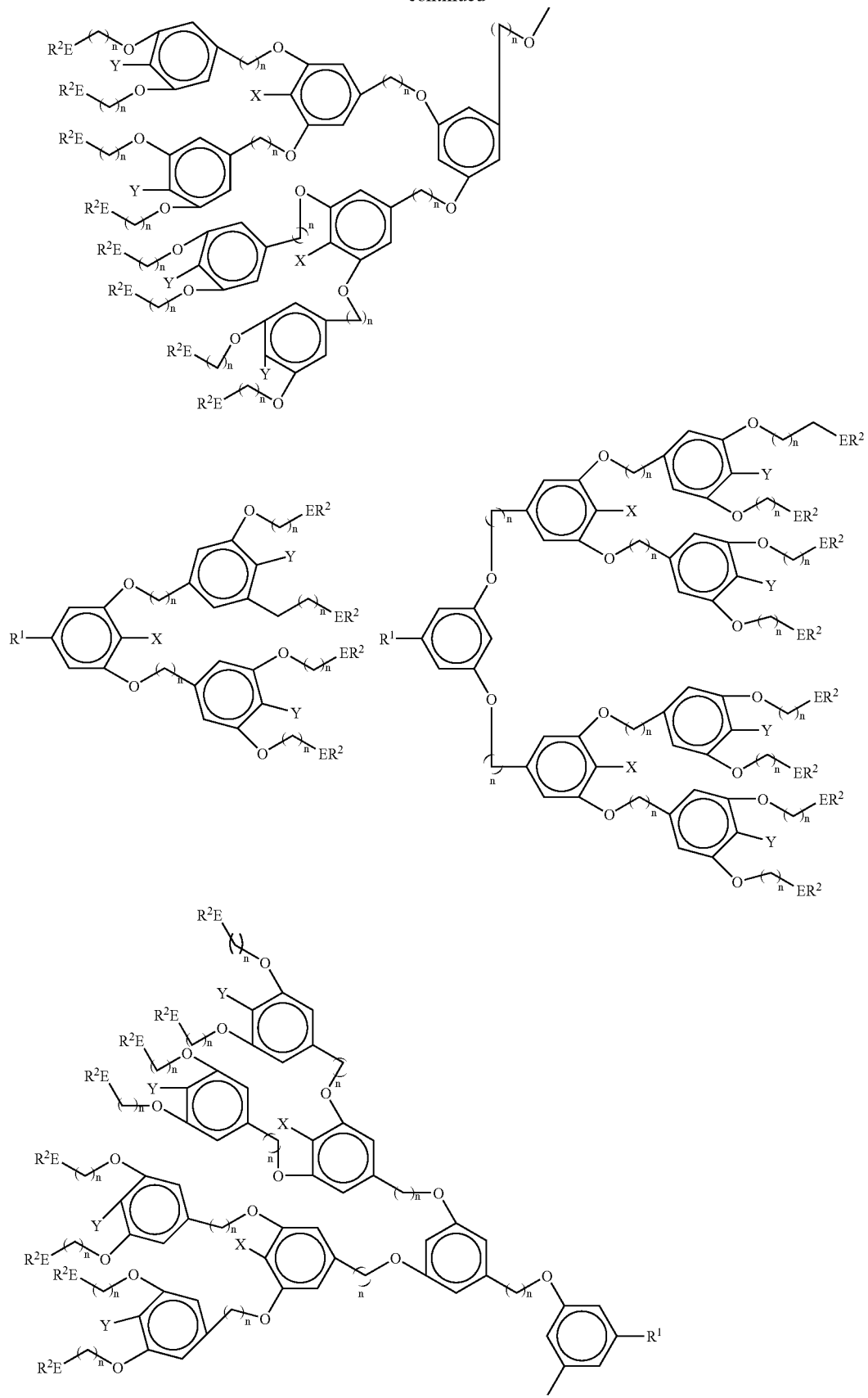

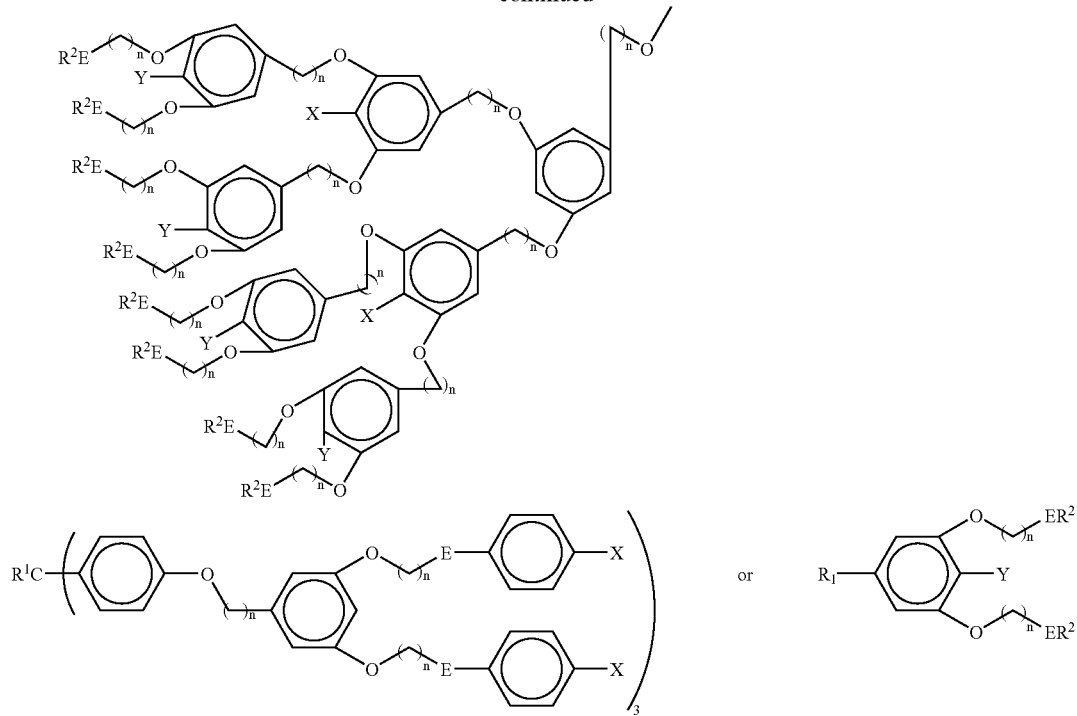

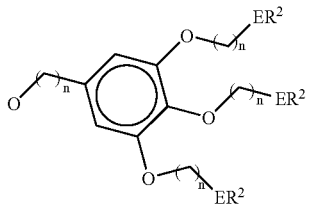

wherein each Y individually is H or $O(CH_2)_nER^2$, each X individually is H, $N((CH_2)_nCO_2Na)_2$ or $R^1$ is a substituted or unsubstituted, straight or branched chain C1-C10 alkyl group, a substituted or unsubstituted, straight or branched chain C1-C10 alkenyl group, a substituted or unsubstituted aryl group or a substituted or unsubstituted heteroaryl group, each E individually is a chalcogen, each $R^2$ individually is a substituted or unsubstituted, straight or branched chain C1-C16 alkyl group, a substituted or unsubstituted aryl group (e.g., aryl groups containing alkoxy, amino, alkylamino, dialkylamino, carboxylic acid, or ester groups at any position), a substituted or unsubstituted heteroaryl group, ethylene glycol oligomers (e.g., from about 6 to about 16 repeat —$CH_2CH_2O$— units terminating in OMe(—$OCH_2CH_2O(CH_2CH_2O)_m$—OMe wherein m=5-15)), a perfluoroalkyl group of from about 5-15 carbon atoms (e.g., $CH_2CF_2(CF_2)_mCF_3$ wherein m=2-12), and each n individually is an integer from 1 to 16. Any additional substituents or further dendrimeric arms may be added to the above structures.

In one embodiment, $ER^2$ is selected from the group consisting of EPh, 4-$(CH_3)_2C_6H_4E$, 4-$(CH_3)_2NC_6H_4E$, 4-$HOC_6H_4E$, 4-$(CH_3O_2CCH_2)_2NC_6H_4E$, 4-$(NaO_2CCH_2)_2$ $NC_6H_4E$, 4-$(HOCH_2CH_2)_2NC_6H_4E$, and 4-$(NaO_2CCH_2O)$ $C_6H_4E$. Other suitable $R^2$ groups include, but are not limited to phenyl, n-$C_6H_{13}$,

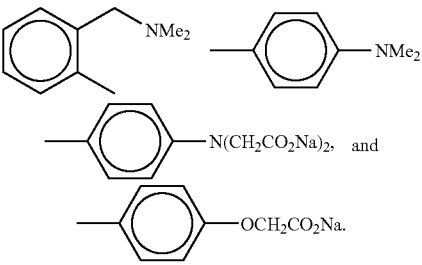

Figure 2:
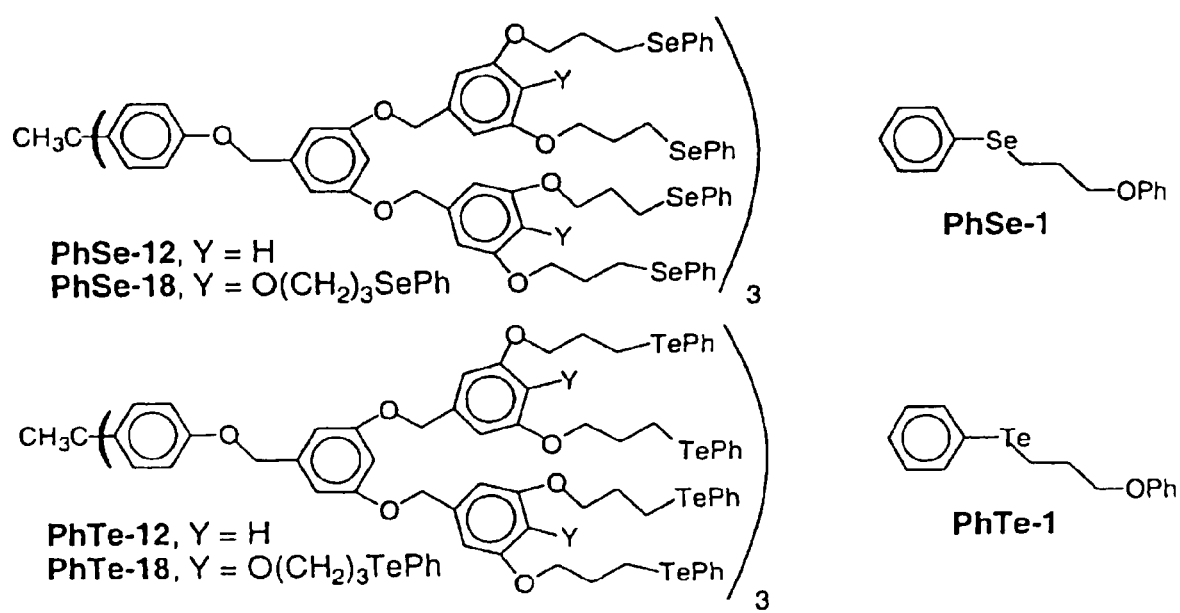
FIG. 2 shows the structures of four dendrimeric arylchalcogeno derivatives of the present invention (PhSe-12, PhSe-18, PhTe-12, and PhTe-18) and two core compounds PhSe-1 and PhTe-1.
Figure 5:
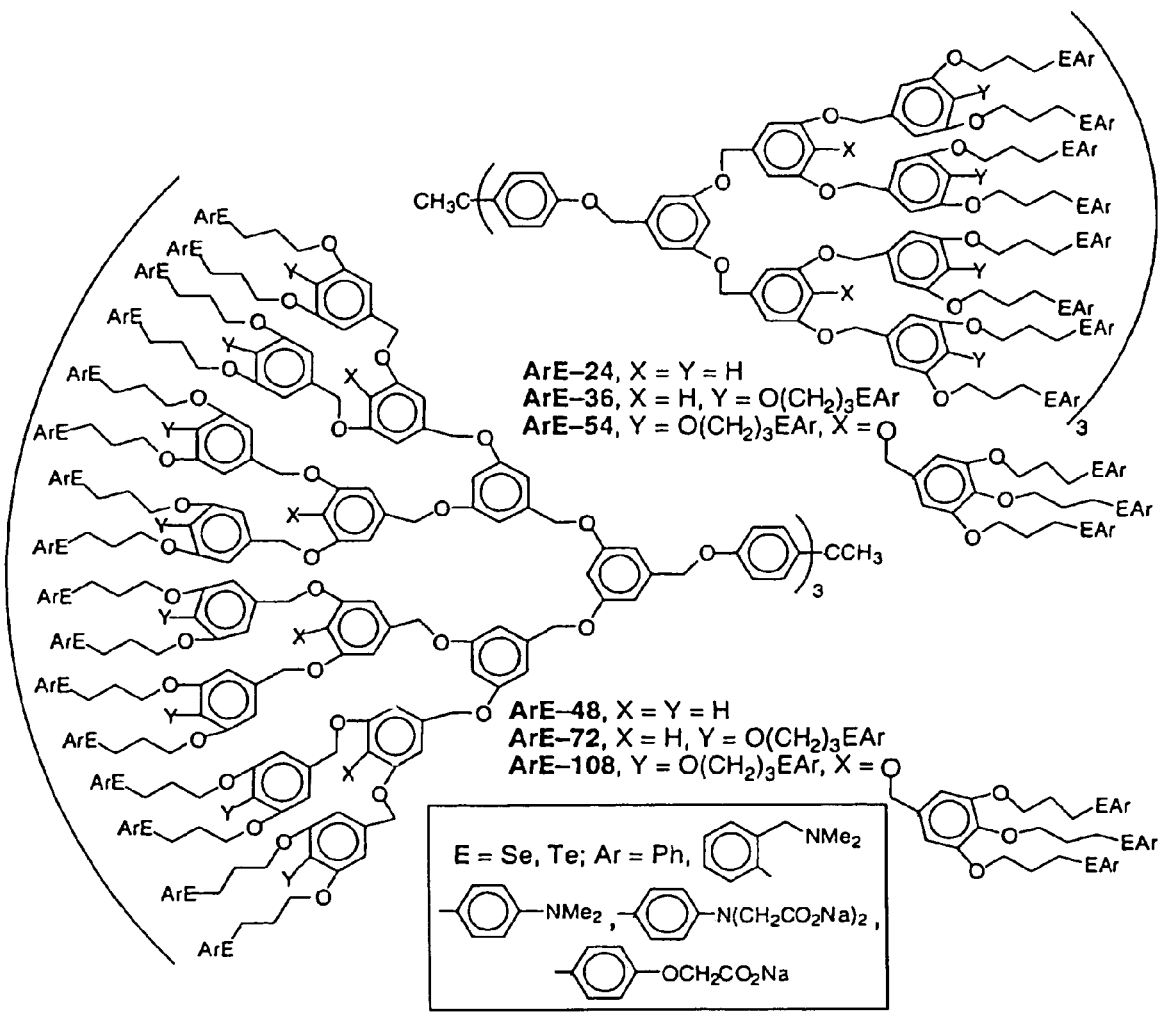
FIG. 5 shows the structures of six dendrimeric arylchalcogeno derivatives of the present invention: ArE-24, ArE-36, ArE-54, ArE-48 ArE-72, and ArE-108.
Figure 6:
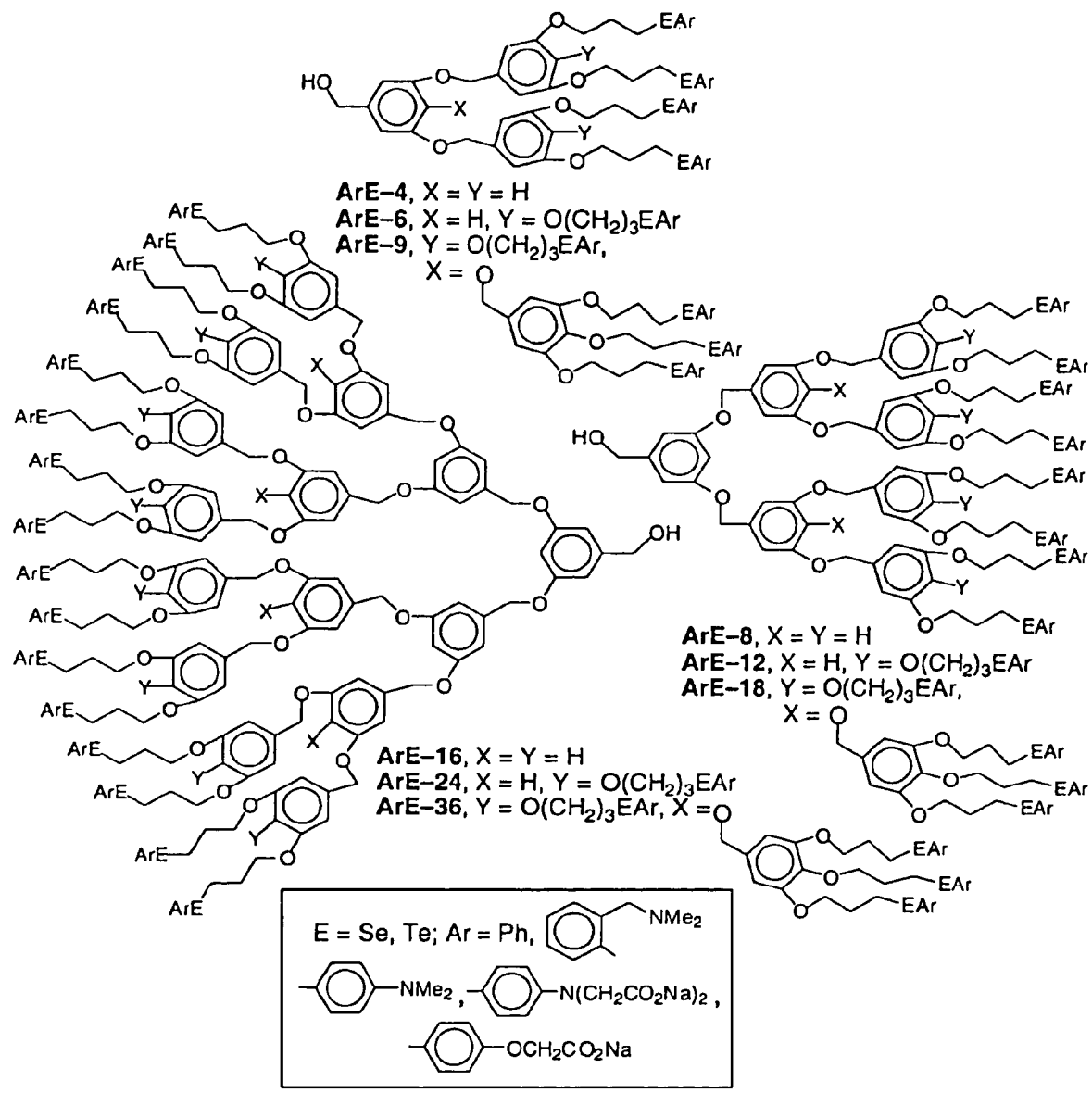
FIG. 6 shows the structures of dendrimeric arylchalcogeno derivatives of the present invention: ArE-4, ArE-6, ArE-9, ArE-8, ArE-12, ArE-18, ArE-16, ArE-24, and ArE-36.
Figure 7:
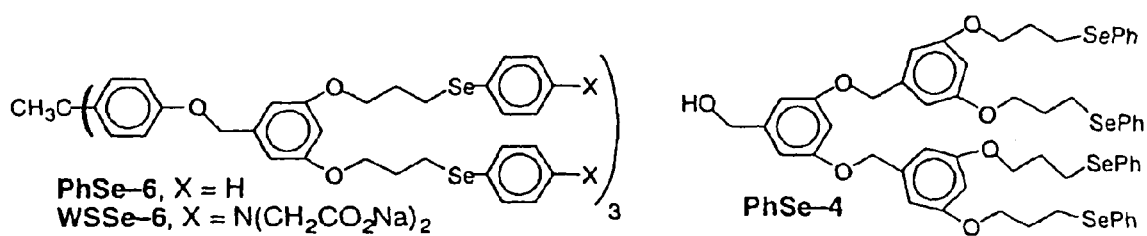
FIG. 7 shows the structures of three dendrimeric arylchalcogeno derivatives of the present invention (PhSe-6, WsSe-18, and PhSe-4).

In yet another embodiment of the present invention, the dendrimeric arylchalcogeno derivative has the formula PhSe-12, PhSe-18, PhTe-12, or PhTe-18 set forth in FIG. 2. In a further embodiment of the present invention, the dendrimeric arylchalcogeno derivative has the formula X-24, X-36, X-48, or X-72 shown in FIG. 3. In another embodiment, the dendrimeric arylchalcogeno derivative has the formula ArE-3, ArE-6, ArE-9, ArE-12, ArE-18, or ArE-27 shown in FIG. 4. In yet another embodiment, the dendrimeric arylchalcogeno derivative has the formula ArE-24, ArE-36, ArE-54, ArE-48, ArE-72, or ArE-108 shown in FIG. 5. In a further embodiment, the dendrimeric arylchalcogeno derivative has the formula ArE-4, ArE-6, ArE-9, ArE-8, ArE-12, ArE-18, ArE-16, ArE-24, or ArE-36 shown in FIG. 6. In another embodiment, the dendrimeric arylchalcogeno derivative has the formula PhSe-6 or WSSe-6 shown in FIG. 7.

The dendrimeric organochalcogeno derivative of the present invention acts as a catalyst for the activation of peroxides, such as hydrogen peroxide, and mimics the activity of haloperoxidases. In addition, the dendrimeric organochalcogeno derivative has enhanced catalytic activity through both statistical and cooperative effects. In particular, the organotelluride PhTe-12 illustrates statistical effects in the catalyst design by having roughly twelve times the catalytic activity of monotelluride PhTe-1 (FIG. 2) for the oxidation of halide salts in the presence of hydrogen peroxide (Francavilla et al., *J. Am. Chem. Soc.* 123:57 et al. (2001), which is hereby incorporated by reference in its entirety). The organoselenide PhSe-12 illustrates the effects of cooperativity with catalytic activity more than 900-fold greater than monoselenide PhSe-1 (FIG. 2) for the oxidation of halide salts in the presence of hydrogen peroxide.

Figure 3:
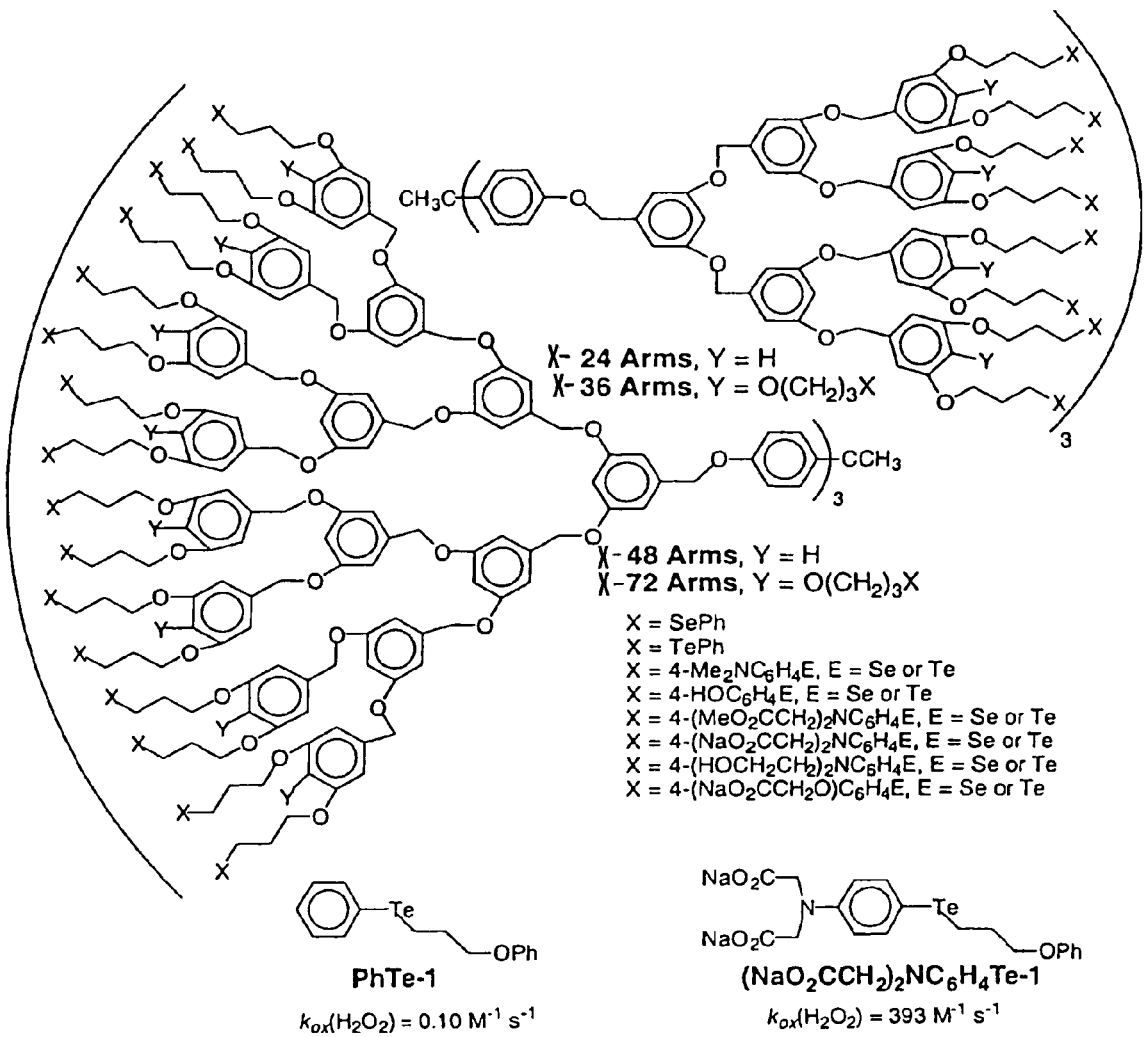
FIG. 3 shows the structures of dendrimeric arylchalcogeno derivatives of the present invention having 24, 36, 48, and 72 arms and core compounds PhTe-1 and anilino-substituted PhTe-1.

The rate-determining step in the haloperoxidase-like reactions of the dendrimer derivatives examined to date is the rate of oxidation of the chalcogenide (Francavilla et al., *J. Am. Chem. Soc.* 123:57 et al. (2001); Detty et al., *J. Org. Chem.* 59:8245 et al. (1994), which are hereby incorporated by reference in their entirety). Given this, more electron-rich groups can be used to increase reactivity. As shown in FIG. 3, $(NaO_2CCH_2)_2NC_6H_4Te-1$ with a more electron-rich anilino group has a nearly 4000-fold larger rate constant for oxidation with hydrogen peroxide than PhTe-1. Thus, similar electron-rich substituents can be incorporated in the dendrimeric catalysts of the present invention to increase catalytic activity (see, e.g., FIGS. 1A and 3-6). As used herein, suitable electron-rich substituents include, but are not limited to, aniline, alkyl, perfluoroalkyl, and polyethylene glycol oligomers.

Figure 1A:
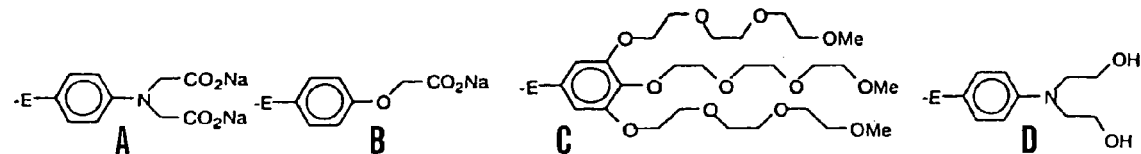
FIG. 1A shows four electron-rich arylchalcogeno groups with different solubility characteristics.
Figure 4:
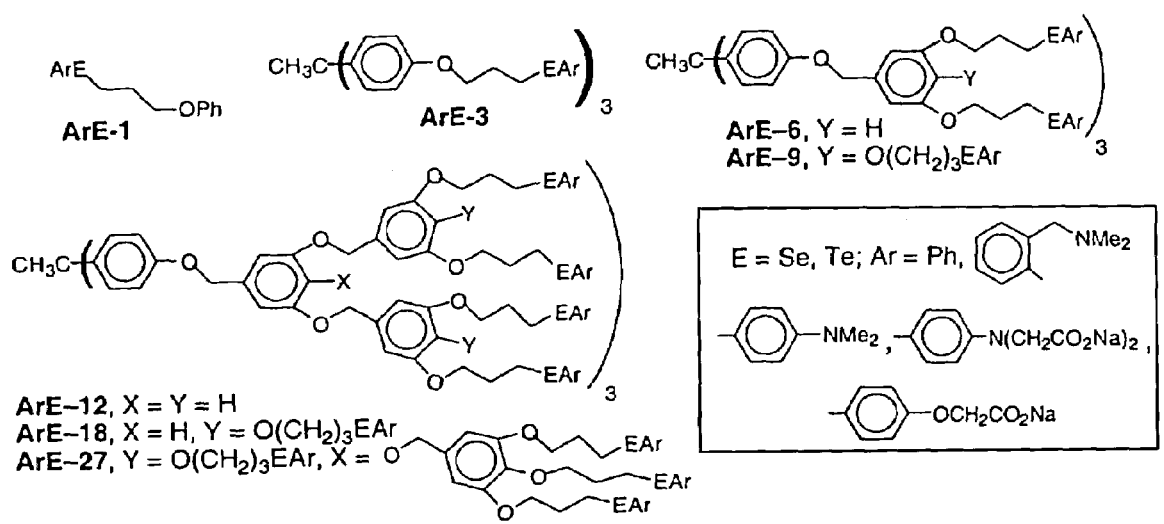
FIG. 4 shows the structures of dendrimeric arylchalcogeno derivatives of the present invention bearing electron-rich arylchalcogeno groups and promoting hydrophilic character (ArE-3, ArE-6, ArE-9, ArE-12, ArE-18, ArE-27) based upon core structure ArE-1.

The solubility characteristics of the dendrimer derivatives can also be controlled through proper choice of substituents (see FIGS. 1 and 4). For example, in FIG. 1A, carboxylate salts A and B can be incorporated in the organochalcogen derivatives to provide water solubility. Alternatively, other types of functionality promote more lipophilic behavior (e.g., long carbon-chain aliphatic groups) while other functionalities give characteristics for both hydrophilicity and lipophilicity (e.g., polyethylene glycol units as in C and the diethanolamine groups as in D in FIG. 1A). Any suitable substituents may be used for controlling solubility including, but not limited to, alcohols, acids, esters, and carboxylate salts.

The synthetic enzymes in the form of dendrimeric molecules of the present invention have a high turnover number, will minimize the formation of radical intermediates, will react rapidly with peroxides at the dilute concentrations found in seawater, and the oxidized form will oxidize halide salts to the positive halogen/hypohalous acid equivalent. Furthermore, those molecules that undergo reductive elimination in the oxidized form to regenerate the catalytic site will reenter the catalytic cycle to be reoxidized by hydrogen peroxide. In addition, only two-electron processes are involved in reactions of the organochalcogeno derivatives, avoiding the intervention of radical intermediates. The dendrimeric PhTe-12 and PhSe-12 derivatives have turnover numbers of greater than 30,000 moles of halogen per mole of derivative without a decrease in catalytic activity (Francavilla et al., *J. Am. Chem. Soc.* 123:57 et al. (2001), which is hereby incorporated by reference in its entirety). The rate-limiting step in these reactions appears to be the rate of oxidation of the chalcogen atom (Francavilla et al., *J. Am. Chem. Soc.* 123:57 et al. (2001), which is hereby incorporated by reference in its entirety). The high turnover numbers shows that the dendrimeric organochalcogeno derivatives are robust catalysts and will have a long catalytic lifetime in a coated adhesion barrier.

Figure 8:
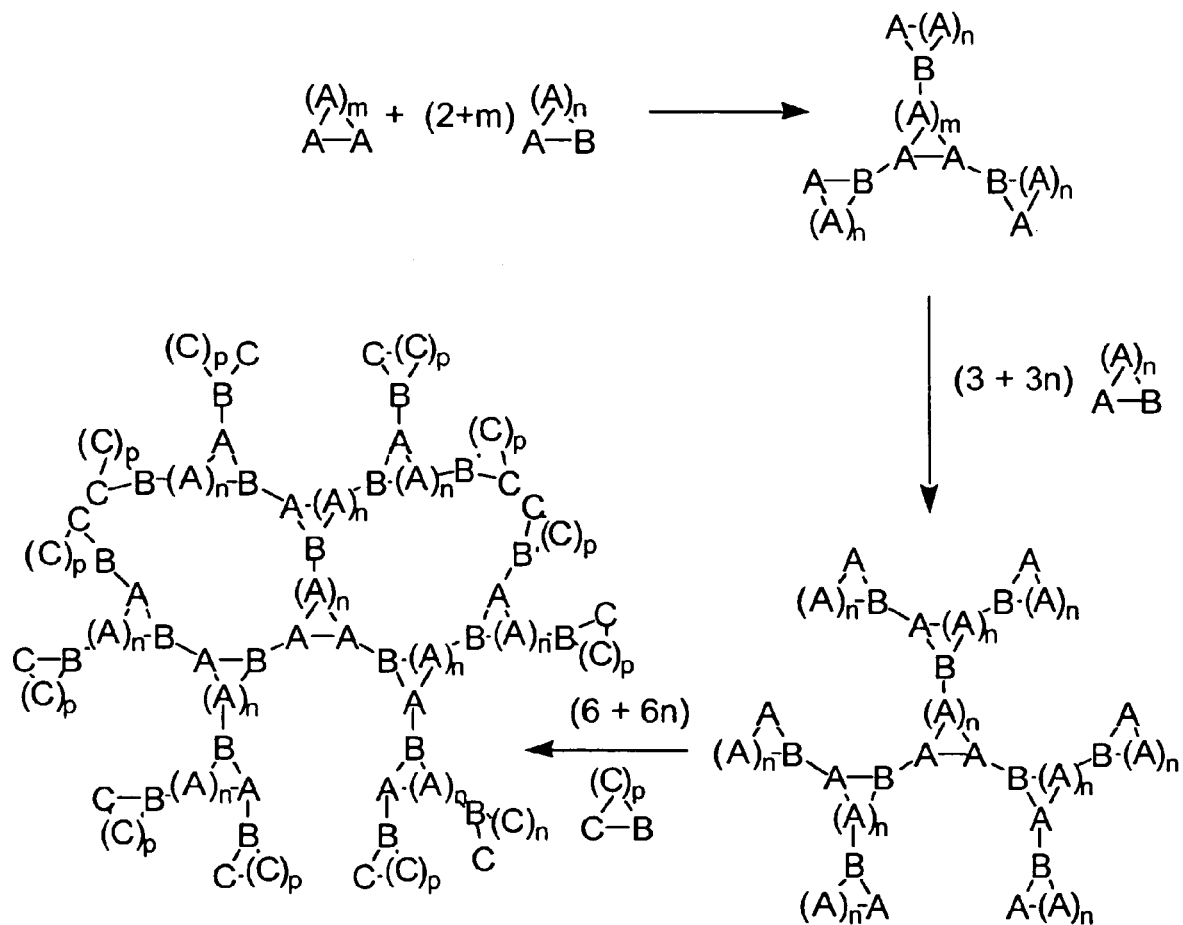
FIG. 8 shows the formation of a dendrimer using a first molecule including 2-6 "A" groups (m=0-4) which is covalently attached to a second molecule containing 2-5 "A" groups (n=1-4) and a "B" group, which is covalently attached to a third molecule containing a "B" group and 2-5 "C" groups (p=1-4).

In accordance with the present invention, dendrimeric organochalcogeno derivatives can be made using methods known in the art and described herein. For example, the dendrimeric organochalcogeno derivatives of the present invention can be made as described in Ahsan et al., "Dendrimeric Organotelluride Catalysts for the Activation of Hydrogen Peroxide. Improved Catalytic Activity through Statistical and Stereoelectronic Effects," *Organometallics*, 22:2883-2890 (2003) and Francavilla et al., "Dendrimeric Organochalcogen Catalysts for the Activation of Hydrogen Peroxide. Improved Catalytic Activity through Statistical Effects and Cooperativity in Successive Generations," *J. Am. Chem. Soc.*, 123:57-67 (2001), which are hereby incorporated by reference in their entirety. A general description for formation of a dendrimer in accordance with the present invention is shown in FIG. 8. In particular, a first molecule having 2-6 "A" groups (m=0-4) is covalently attached to a second molecule containing a group "B" that will form a covalent bond upon reaction with the "A" groups in the first molecule (n=1-4) and 2-5 "A" groups. This process can be repeated numerous times to build the dendrimer. In the final iteration, a third molecule is reacted with the dendrimer, where the third molecule contains a "B" group and 2-5 "C" groups (that can add useful properties, such as hydrophobicity, hydrophilicity, catalytic groups, and reactive groups) (p=1-4) that represent the terminal functionality on the final dendrimer. In accordance with one embodiment of the present invention, the "A" group is a phenolic OH, the "B" group is a benzylic halide or benzylic sulfonate, and the "C" group is an alkoxy (e.g., propyloxy) selenide or alkoxy telluride, n=1, m=1, and p=1 or 2.

As described above, these dendrimer derivatives can utilize species native to the ocean to produce hypohalous acid—a barrier to marine species adhesion. However, in order to form such an effective/stable barrier, one must devise a methodology to immobilize these dendrimers within an easily prepared, robust matrix such that they remain active and accessible to the "reagents".

Thus, in accordance with the present invention, the dendrimeric organochalcogeno derivative of the present invention is substantially incorporated within a sol-gel matrix (i.e., bound to at least a portion of the sol-gel matrix). As used herein, sol-gel matrices comprise sol-gel processed xerogels. Suitable sol-gel matrices in accordance with the present invention include, but are not limited to, xerogels that are based on TMOS (tetramethoxysilane, $Si(OMe)_4$)) or TMOS co-doped with one of more of the following additives: poly(N-vinylimidazole) (PNV, cationic), poly(ethyleneimine) (PE, cationic), poly(ethyleneoxide) (PEO, neutral), triethoxysilane (TREOS, $HSi(OEt)_3$), diethoxydimethylsilane (DEDMS, $SiMe_2(OEt)_2$), diethoxymethylsilane (DEMS, $HSiMe(OEt)_2$), aminopropyltriethoxysilane (APTES, $H_2N—(CH_2)_3Si(OMe)_3$), or carboxypropyltriethoxysilane (CPTES, $HOOC—(CH_2)_3Si(OMe)_3$), xerogels based on tetraethylorthosilane (TEOS) or TEOS co-doped with one or more of the above additives, hybrid n-propyl-trimethoxysilane (pro-TriMOS)/tetramethylorthosilane (TMOS) xerogels, bis[3-(trimethoxysilyl)propyl]ethylenediamine (enTMOS)/TEOS xerogels, hybrid TEOS/aminopropyl-triethoxysilane (APTES) xerogels, hybrid TMOS/pro-triMOS/enTMOS xerogels, and hybrid TMOS/n-octyl-triethoxysilane xerogels.

In one embodiment of the present invention, more than one dendrimeric derivative is incorporated within the sol-gel matrix.

Figure 1B:
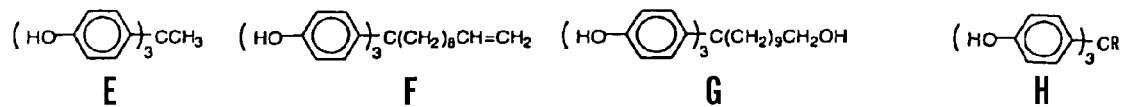
FIG. 1B shows four core groups with different attachment characteristics.

The incorporation and immobilization of the dendrimeric derivative(s) within the sol-gel matrix can be either by non-covalent or covalent (entrapment or adsorption, respectively) methods. For example, the PhTe-12 and PhSe-12 dendrimers (FIG. 2) are constructed from the 1,1,1-triarylethane core molecule E illustrated in FIG. 1B. This particular core molecule lacks functionality for covalent attachment and dendrimer catalysts derived from this core would be entrapped in the film. However, the triarylundecene F of FIG. 1B and other derivatives of varying chain length are readily prepared from triarylmethanes. The olefinic groups can be transformed to suitable derivatives for covalent attachment. As one example, F can be hydroborated to give alcohol G, which offers a reactive group for covalent attachment within a sol-gel-derived matrix (FIG. 1B). Other suitable modifications for covalent attachment include, but are not limited to, modifications to include hydroxyl, unsubstituted amino, alkyl amino, carboxylic acid, carboxylic ester, thiol, cyanate, or aldehyde groups that would permit covalent attachment to the sol-gel matrix.

Sol-gel-processed materials (*Chemical Processing of Advanced Materials*, Hench, eds. Wiley: New York, N.Y. (1992); Brinker et al., *Sol-Gel Science*, Academic Press: New York, N.Y. (1989), which are hereby incorporated by reference in their entirety) are readily prepared by the hydrolysis of metal or semi-metal alkoxides to form a robust inorganic network into which one can easily dope organic materials (Baker et al., *J. Sol-Gel Sci. Technol.* 17:71 et al. (2000); Pandey et al., *Chem. Mater.* 12:3547 et al. (2000); Baker et al., *J. Sol-Gel Sci. Technol.* 15:37 et al. (1999); Jordan et al., *Anal. Chim. Acta* 332:83 et al. (1996), which are hereby incorporated by reference in their entirety). These sol-gel-derived composites are particularly attractive because they: (1) have tunable surface area, mean pore dimensions, pore size distributions, and fractal dimension; (2) are thermally stable well beyond their organic guests; (3) do not photodegrade; (4) are electrochemically stable; (5) are optically transparent; (6) can be made conductive; (7) are open to a range of secondary chemical modification strategies; (8) can enhance the stability of an entrapped molecule by formation of a semi-rigid cage; (9) can be prepared as monoliths, thin films, powders, and fibers; (10) provide a high-level of tunable interactions between the dopant and solutes because of the combination of high dopant loading and inherent material porosity; (11) keep potentially reactive dopants isolated from one another; (12) exhibit minimal dopant leaching; and (13) are prepared at or below room temperature under mild conditions.

The halogen and hypohalous acid produced in the catalytic cycle by the coating composition of the present invention is similarly substantially incorporated within the coating composition.

In accordance with the present invention, it is possible to incorporate, maintain, and tune the intrinsic function and behavior of dopants (dendrimeric organochalcogeno derivatives) sequestered within sol-gel-derived composite materials.

Moreover, as shown in the Examples below, the sol-gel matrix itself is active in minimizing the adhesion of marine species to a water-borne vessel. Thus, an active sol-gel matrix or the combination of an active sol-gel matrix and dendrimeric derivative according to the present invention can be used to prevent fouling of surfaces subjected to a marine environment, as described below.

One of the benefits of the present invention is the ability to have a constant concentration of hypohalous acid at the coated surface interface to prevent adhesion. Furthermore, the equilibria associated with hypohalous acids and the dendrimeric catalysts limit the quantities of hypohalous acids produced. However, the hypohalous acids that escape the film interface will be rapidly diluted as they diffuse away from the interface to give non-toxic concentrations of hypohalous acids that undergo the natural degradation processes described above.

The reactivity of the dendrimeric polyorganochalgogeno derivatives can be fine-tuned in several different ways for optimal performance in an adhesion barrier. The dendrimer architecture gives precise control over the number of reactive groups on the dendrimer surface. The density of functional groups on the surface can also be controlled. As shown in FIG. 2, the addition of a third functional group on the terminal aryls gives 18 reactive groups (PhSe-18 and PhTe-18) and an increased functional group density. Extending this to higher generations as shown in FIG. 3 gives dendrimers with 36 and 72 reactive groups.

In one embodiment of the present invention, from about 0.1 wt % to about 5.0 wt % of dendrimeric derivative is incorporated within the sol-gel matrix. In a preferred embodiment, from about 0.5 wt. % to about 2 wt % of dendrimeric derivative is incorporated within the sol-gel matrix. Higher loading levels of dendrimeric derivative are possible by using multi-component sol-gel processing methods or more water soluble dendrimers (Baker et al., *J. Sol-Gel Sci. Technol.* 17:71 et al. (2000); Pandey et al., *Chem. Mater.* 12:3547 et al. (2000); Baker et al., *J. Sol-Gel Sci. Technol.* 15:37 et al. (1999); Jordan et al., *Anal. Chim. Acta* 332:83 et al. (1996), which are hereby incorporated by reference in their entirety).

Another aspect of the present invention relates to a system including a coating composition including a sol-gel matrix and a dendrimeric organochalcogeno derivative bound to at least a portion of the sol-gel matrix and a substrate, wherein at least a portion of the substrate is coated with the coating composition.

Any suitable substrate may be used in the system of the present invention including, but not limited to, metals, plastics, glass, wood, and other natural fibers. In one embodiment, the substrate is glass or marine grade aluminum. In one embodiment, substantially all surfaces of the substrate to be are coated with the coating composition. In another embodiment, a portion of the surfaces of the substrate are coated with the coating composition.

The present invention also relates to a method of preventing fouling of surfaces subjected to a marine environment. This method involves providing a coating composition including a sol-gel matrix. The coating composition is applied to a surface subjected to a marine environment under conditions effective to prevent or reduce fouling of the surface. As used herein, fouling relates to adhesion of marine species to the surface.

In one embodiment, the coating composition further includes a dendrimeric organochalcogeno derivative bound to at least a portion of the sol-gel matrix. Although not wishing to be bound by theory, it is believed that the sol-gel matrix, which is a porous surface, prevents or reduces fouling as marine species avoid this type of texture. The addition of dendrimeric organochalcogeno derivatives to the surface of the sol-gel matrix further adds to the texture, such that settlement and removal of marine species is affected (e.g., marine species do not anchor well to such a texture). Moreover, the dendrimeric organochalcogeno derivatives react with peroxides and halide salts present in the marine environment to produce hypohalous acid, thereby further preventing or reducing fouling of the surface.

Suitable sol-gel matrices include both hydrophobic sol-gel matrices, which limit or prevent settlement of marine species, and hydrophilic sol-gel matrices, which provide improved removal of marine species from a coated surface. Examples of suitable sol-gel matrices are described above and in the Examples, below.

Figure 9:
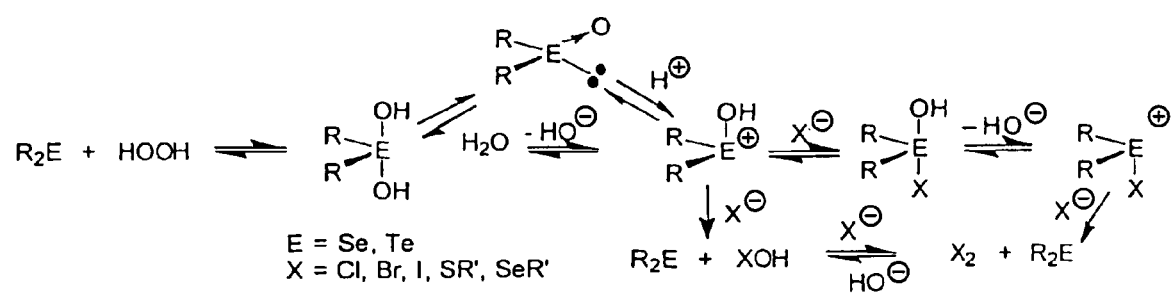
FIG. 9 shows oxidative-addition, reductive-elimination reactions with two-electron changes at the main group element using hydrogen peroxide as an oxidant.

In particular, in accordance with the present invention, the coating composition causes peroxides in the marine environment to oxidize the dendrimeric derivative which will oxidize halide salts present in the marine environment to a positive halogen/hypohalous acid equivalent, thereby preventing fouling of the surface. As shown in FIG. 9, many main group elements, including chalcogenides, undergo oxidative-addition, reductive-elimination reactions with two-electron changes at the main-group element (Cotton et al., *Advanced Inorganic Chemistry*, 5th ed., Wiley Interscience, New York, N.Y. (1988), which is hereby incorporated by reference in its entirety). A process including two-electron changes at the main group element minimizes the formation of radical intermediates, which can lead to reactions that may destroy the active catalyst (i.e., dendrimeric derivative). Oxidation of a main-group element such as selenium or tellurium with hydrogen peroxide or some other source of reactive oxygen followed by halide substitution for an oxygen-containing ligand at the main-group element leads to a positive-halogen equivalent upon reductive elimination (FIG. 9 where X=Cl, Br, I). The transfer of the positive halogen regenerates the reduced main-group element, thus a catalytic cycle exists wherein the catalytic site reenters the catalytic cycle to be re-oxidized by hydrogen peroxide and hydrogen peroxide "activation" and oxidation of halide occurs sequentially at the main-group element.

The composition of the present invention can be applied to a surface using simple coating methods, such as spraying, dipping, spreading, or brushing. Any suitable surface can be coated in accordance with the present invention, including, but not limited to, metals, plastics, glass, wood, and other natural fibers. In one embodiment, the substrate is glass or marine grade aluminum.

EXAMPLES

Example 1

Preparation of Dendrimeric Arylchalcogeno Derivatives

Dendrimeric polyorganotellurides are prepared in high yield using propyloxy spacers to connect the organotelluride groups to the core molecules. The polyorganotellurides catalyze the oxidation of thiophenol with hydrogen peroxide to give diphenylsulfide in homogeneous solutions (5% $CH_2Cl_2$/MeOH or 46% $CH_2Cl_2$/MeOH). The polyorganotellurides with 2, 3, 4, and 6 catalytic groups show roughly statistical increases for the number of catalytic groups relative to the corresponding monotellurides. Catalysts containing 4-dimethylaminophenyltelluro groups and n-hexyltelluro groups are oxidized more rapidly by hydrogen peroxide and also show greater catalytic activity than the corresponding catalysts containing phenyltelluro groups. A combination of statistical effects and stereoelectronic effects give a 26-fold increase in catalytic activity from 1-phenoxy-3-(phenyltelluro)propane (23a, $v_0$=12 µM min$^{-1}$) to dendrimer 22c with 6 n-hexyltelluro groups ($v_0$=312 µM min$^{-1}$) for the oxidation of $1.0\times10^{-3}$ M PhSH with $3.75\times10^{-3}$ M $H_2O_2$ in the presence of $1.0\times10^{-5}$ M catalyst. The rate of appearance of PhSSPh, with a molar extinction coefficient, ∈, of $1.24\times10^{-3}$ L mol$^{-1}$ cm$^{-1}$ at 305 nm, was monitored at 305 nm.

While $H_2O_2$ is a powerful oxidant thermodynamically, many of the reactions of $H_2O_2$ are limited by the kinetics of reaction as illustrated by the oxidation of halides to the corresponding halogen/hypohalous acid (Mohammed, et al., *J. Am. Chem. Soc.*, 56:1680 et al. (1934), which is hereby incorporated by reference in its entirety) and the oxidation of thiols to disulfides (Detty et al., *Organometallics*, 11:2147 et al. (1992); Engman et al. *J. Org. Chem.*, 59:1973 et al. (1994); Vessman et al., *J. Org. Chem.*, 60:4461 et al. (1995); Kanda et al. *J. Org. Chem.*, 64:8161 et al. (1999), which are hereby incorporated by reference in their entirety). Nature has developed a variety of peroxidase enzymes to accelerate these reactions of $H_2O_2$ and other peroxy compounds and chemists have designed synthetic catalysts to mimic the peroxidase enzymes (Back et al., *J. Am. Chem. Soc.*, 124: 12104 et al. (2002); Dexter et al., *J. Am. Chem. Soc.*, 117:6412 et al. (1995); Allain et al., *J. Am. Chem. Soc.*, 115:4415 et al. (1993); Butler et al., *Chem. Rev.*, 93:1937 (1993), which are hereby incorporated by reference in their entirety). Among these latter catalysts, diorganotellurides have been excellent catalysts for the activation of $H_2O_2$ in these particular reactions (Detty et al., *Organometallics*, 11:2147 et al. (1992); Engman et al. *J. Org. Chem.*, 59:1973 et al. (1994); Vessman et al., *J. Org. Chem.*, 60:4461 et al. (1995); Kanda et al. *J. Org. Chem.*, 64:8161 et al. (1999); Detty et al., *J. Am. Chem. Soc.*, 118:313 et al. (1996); Higgs et al., *Org. Lett.*, 3:349 et al. (2001); You et al., *Organometallics*, 21:4546 et al. (2002), which are hereby incorporated by reference in their entirety).

The diorganotellurides undergo two-electron redox processes at the Te atom during the catalytic cycle (Detty et al., *Organometallics*, 11:2147 et al. (1992); Engman et al. *J. Org. Chem.*, 59:1973 et al. (1994); Vessman et al., *J. Org. Chem.*, 60:4461 et al. (1995); Kanda et al. *J. Org. Chem.*, 64:8161 et al. (1999); Detty et al., *J. Am. Chem. Soc.*, 118:313 et al. (1996); Higgs et al., *Org. Lett.*, 3:349 et al. (2001); You et al., *Organometallics*, 21:4546 et al. (2002); Detty et al., *J. Org. Chem.*, 59:8245-8250 (1994), which are hereby incorporated by reference in their entirety). Peroxide oxidation of the diorganotelluride gives the corresponding oxide (or its hydrate), which then acts as an oxidant (kinetically superior to $H_2O_2$) for a variety of substrates. The diorganotelluride is regenerated in the process to resume the catalytic cycle. The rate-limiting step in the catalytic process is the rate of oxidation of the diorganotelluride (Detty et al., *J. Am. Chem. Soc.*, 118:313 et al. (1996), which is hereby incorporated by reference in its entirety).

For the diorganotellurides, catalytic activity with $H_2O_2$ will be a balance between the rate of oxidation of the Te atom with $H_2O_2$ and the rate of reductive elimination to form product and to regenerate catalyst. Traditionally, the molar activity of catalysts has been optimized through structure-activity relationships derived from substituent changes. However, stereoelectronic effects can only go so far with respect to increasing rates of oxidation of the Te atom. Enhanced catalytic activity in dendrimeric (Grayson et al., *Chem. Rev.*, 101:3819-3867 (2001); Fisher et al., *Angew. Chem. Int. Ed. Engl.*, 38:884 et al. (1999); "Dendrimers," *Top. Curr. Chem.*, 197: (1998); Gorman, *Adv. Mater.*, 295: (1998), which are hereby incorporated by reference in their entirety) diorganotelluride catalysts (Francavilla et al., *J. Am. Chem. Soc.*, 123:57 (2001), which is hereby incorporated by reference in its entirety) is shown in which statistical increases in catalytic activity in two-phase systems were noted by incorporating the catalytic telluride functionality at the end of each dendrimer arm. Herein, the thiol peroxidase-like activity of dendrimeric organotellurides in a homogeneous system (Iwaoka et al., *J. Am. Chem. Soc.*, 116:2557 et al. (1994); Mugesh et al., *J. Am. Chem. Soc.*, 123:839 et al. (2001), which are hereby incorporated by reference in their entirety) is described and not only statistical effects but also stereoelectronic effects in the telluride substituents is examined (Ahsan et al., "Dendrimeric Organotelluride Catalysts for the Activation of Hydrogen Peroxide. Improved Catalytic Activity Through Statistical and Stereoelectronic Effects," *Organometallics*, 22(14):2883-2890 (2003) (and supporting information available at http://pubs.acs.org), which is hereby incorporated by reference in its entirety).

Materials and Methods

Solvents and reagents were used as received from Sigma-Aldrich Chemical Co. (St. Louis, Mo.) unless otherwise noted. Concentration in vacuo was performed on a Büchi rotary evaporator. NMR spectra were recorded at 30.0° C. on a Varian Gemini-300, Inova 400, or Inova 500 instrument with residual solvent signal as internal standard: $CDCl_3$ ($\delta$ 7.26 for proton, $\delta$ 77.0 for carbon). Infrared spectra were recorded on a Perkin-Elmer FT-IR instrument. Elemental analyses were conducted by Atlantic Microlabs, Inc. High-resolution mass spectrometry was conducted by the Campus Chemical Instrumentation Center of The Ohio State University (Columbus, Ohio). Compounds 5, 21, 22a, and 23a, as described below, were prepared according to Francavilla et al., *J. Am. Chem. Soc.*, 123:57 et al. (2001), which is hereby incorporated by reference in its entirety. Compound 24, as described below, was prepared according to Butcher et al., *J. Org. Chem.*, 64:5677 et al. (1999), which is hereby incorporated by reference in its entirety.

Preparation of Methyl 3,4,5-tris[3-(tert-butyldimethylsilyloxy)propyloxy]benzoate (10)

Methyl gallate (28.5 g, 155 mmol), 1-bromo-3-(tert-butyldimethylsiyloxy)propane (129.2 g, 0.51 mol), $K_2CO_3$ (96.2 g, 0.70 mol), 18-crown-6 (12.3 g, 46 mmol), and NaI (6.95 g, 46 mmol) in anhydrous acetone (1.0 L) were stirred at reflux for 48 hours. The reaction mixture was concentrated. The residue was partitioned between EtOAc (0.5 L) and $H_2O$ (1.0 L). The aqueous phase was extracted with additional EtOAc (2×250 mL). The combined organic extracts were dried over $MgSO_4$ and concentrated. The crude product was purified by flash chromatography on silica gel eluted with 50% EtOAc/hexanes to give 54.1 g (50%) of 10 as a viscous yellow oil: $^1$H NMR (300 MHz, $CDCl_3$) $\delta$ 7.25 (s, 2H), 4.09 (t, 6H, J=6.0 Hz), 3.86 (s, 3H), 3.79 (t, 6H, J=6.0 Hz), 1.99 (quint, 4H, J=6.0 Hz), 1.91 (quint, 2H, J=6.3 Hz), 0.86 (s, 27H), 0.02 (s, 18 H); $^{13}$C NMR (75 MHz, $CDCl_3$) $\delta$ 166.3, 152.5, 142.1, 124.7, 107.8, 70.3, 65.6, 60.1, 59.5, 52.0, 33.6, 32.5, 25.9, 18.2, −5.4, −5.5; IR (film, NaCl) 1723 cm$^{-1}$ (s); High Resolution MS (electrospray), m/z 723.4120 (Calcd for $C_{35}H_{68}O_8Si_3$+Na$^+$: 723.4120).

Preparation of 3,4,5-tris[3-(tert-butyldimethylsilyloxy)propyloxy]-benzyl alcohol (11)

Ester 10 (13.0 g, 18.5 mmol) and LiAlH$_4$ (0.77 g, 20 mmol) in anhydrous THF (100 mL) were stirred at 0° C. for 1 hour. The reaction was quenched by the slow addition of $H_2O$ (20 mL). The reaction mixture was concentrated to approximately half volume and was then partitioned between EtOAc (250 mL) and water (500 mL). The aqueous phase was extracted with additional EtOAc (2×100 mL). The combined organic layers were dried over $MgSO_4$ and concentrated to yield 10.82 g (87%) of 11 as a colorless oil: $^1$H NMR (300 MHz, $CDCl_3$) $\delta$ 6.56 (s, 2H), 4.58 (d, 2H, J=4.5 Hz), 3.99-4.07 (m, 6H), 3.76-3.82 (m, 6H), 1.98 (quint, 4H, J=6.0 Hz), 1.91 (quint, 2H, J=6.0 Hz), 0.87 (s, 18H), 0.86 (s, 9H), 0.03 (s, 12H), 0.02 (s, 6H); $^{13}$C NMR (75 MHz, $CDCl_3$), $\delta$ 152.9, 136.9, 136.3, 104.9, 70.3, 65.4, 65.2, 60.3, 59.6, 33.5, 32.5, 25.8, 18.2, −5.4, −5.5; IR (film, NaCl) 3435 cm$^{-1}$ (broad); High Resolution MS (electrospray), m/z 695.4178 (Calcd for $C_{34}H_{68}O_7Si_3$+Na$^+$: 695.4171).

General Procedure for the Preparation of Benzoate Esters. Preparation of the Benzoate Ester 6 of 3,5-Bis[3-(tert-butyldimethylsilyloxy)propyloxy]benzyl Alcohol (5)

Benzoic anhydride (0.70 g, 3.1 mmol), pyridine (0.20 mL, 2.5 mmol), and DMAP (0.05 g, 0.4 mmol) were dissolved in 20 mL of freshly distilled $CH_2Cl_2$ (from $CaH_2$). Benzyl alcohol 5 (1.00 g, 2.06 mmol) in 5 mL of $CH_2Cl_2$ was added dropwise. The reaction was stirred 16 hours at ambient temperature. The reaction mixture was poured into 50 mL of $H_2O$, and the products were extracted with $CH_2Cl_2$ (3×30 mL). The organic layers were combined, dried with $MgSO_4$, and concentrated. The crude product was purified by chromatography on silica gel eluted with 20% EtOAc/$CH_2Cl_2$ to give 2.26 g (99%) of 6 as a colorless oil: $^1$H NMR (300 MHz, $CDCl_3$) $\delta$ 8.08 (d, 2H, J=7.2 Hz,), 7.51-7.53 (m, 1H), 7.41 (t, 2H, J=7.7 Hz), 6.58 (s, 2H), 6.45 (s, 1H), 5.28 (s, 2H), 4.05 (t, 4H, J=6.0 Hz), 3.79 (t, 4H, J=6.0 Hz), 1.97 (quint, 4H, J=6.0 Hz), 0.89 (s, 18H), 0.04 (s, 12H); $^{13}$C NMR (75 MHz, $CDCl_3$) $\delta$ 166.2, 160.2, 138.0, 132.9, 130.4, 129.6, 128.2, 106.4, 100.9, 66.5, 64.4, 59.6, 32.3, 25.8, 18.2, −5.5; IR (film, NaCl) 1723.0 cm$^{-1}$ (s); High Resolution MS (electropspray), m/z 611.3198 (Calcd for $C_{32}H_{52}O_6Si_2$+Na$^+$: 611.3200).

Preparation of the Benzoate 12 from 3,4,5-Tris[3-(tert-butyldimethylsilyloxy)propyloxy]benzyl alcohol (11)

Alcohol 11 (2.94 g, 4.4 mmol), benzoic anhydride (1.5 g, 6.6 mmol), pyridine (0.41 g, 5.2 mmol.), DMAP (0.11 g, 0.9 mmol.), in anhydrous $CH_2Cl_2$ (45 mL) were treated as described. The crude product was purified on silica gel eluted with 25% EtOAc/$CH_2Cl_2$ to give 2.98 g (99%) of 12 as a colorless oil: $^1$H NMR (300 MHz, $CDCl_3$) $\delta$ 8.05 (dxd, 2H, J=1.2, 7.8 Hz), 7.52 (t, 1H, J=9 Hz), 7.41 (t, 2H, J=7.2 Hz), 6.64 (s, 2H), 5.24 (s, 2H), 4.09-4.02 (m, 6H), 3.83-3.77 (m, 6H), 2.03-1.90 (m, 6H), 0.87 (s, 9H), 0.9 (s, 18H), 0.03 (s, 6H), 0.0 (s, 12H); $^{13}$C NMR (75 MHz, $CDCl_3$) $\delta$ 163.2, 153.0, 132.9, 131.0, 129.6, 128.3, 106.8, 70.3, 67.0, 65.6, 60.3, 58.6, 33.6, 32.57, 25.9, 25.9, 18.2, −5.3, −5.41; IR (film, NaCl) 1722.2 cm$^{-1}$ (sharp); High Resolution MS (electrospray), m/z 799.4438 (Calcd for: $C_{41}H_{72}O_8Si_3$+Na (799.4433).

Preparation of Benzoate 17 from 3,5-Bis(3,5-bis[3-(tert-butyldimethylsilyloxy)propyloxy]benzyloxy) benzyl Alcohol (16)

Benzoic anhydride (0.632 g, 2.79 mmol), pyridine (0.18 mL, 2.2 mmol), and DMAP (0.046 g, 0.37 mmol), and benzyl alcohol 16 (2.00 g, 1.86 mmol) were treated as described to give 2.06 g (93%) of 17 as a colorless oil: $^1$H NMR (300 MHz, CDCl$_3$) δ 8.04 (d, 2H, J=8.1 Hz), 7.54 (t, 1H, J=7.2 Hz), 7.42 (t, 2H, J=7.7 Hz), 6.65 (s, 2H), 6.54 (s, 5H), 6.39 (s, 2H), 5.26 (s, 2H), 4.94 (s, 4H), 4.02 (t, 8H, J=6.0 Hz), 3.77 (t, 8H, J=6.0 Hz), 1.94 (quint, 8H, J=6.0 Hz), 0.86 (s, 36H), 0.02 (s, 24H); $^{13}$C NMR (75 MHz, CDCl$_3$) δ 166.2, 160.4, 160.0, 138.8, 138.2, 132.9, 130.0, 129.7, 128.3, 106.9, 105.7, 101.6, 100.8, 70.1, 66.4, 64.5, 59.4, 32.3, 25.9, 18.2, −5.4; IR (film, NaCl) 1722.5 cm$^{-1}$ (s); High Resolution MS (electrospray), m/z 1199.6417 (Calcd for C$_{64}$H$_{104}$O$_{12}$Si$_4$+Na$^+$: 1199.6503).

General Procedure for the Desilylation of Silyl Ethers 6, 12, and 17. Preparation of 3,5-Bis(3-hydroxypropyloxy)benzyl Benzoate (7)

Hydrogen fluoride-pyridine complex (0.36 mL, 12.45 mmol based on 70/30 HF/pyridine by weight) was added dropwise to a solution of silyl ether 6 (1.22 g, 2.07 mmol) in THF. The resulting solution was stirred at ambient temperature for 16 hours. The reaction mixture was partitioned between EtOAc (100 mL) and H$_2$O (250 mL). The aqueous phase was extracted with additional EtOAc (3×100 mL). The combined organic extracts were dried over MgSO$_4$ and concentrated. The crude product was purified by chromatography on silica gel eluted with EtOAc and then 10% MeOH/EtOAc to give 0.63 g (89%) of 7 as a white solid, mp 78-82° C.: $^1$H NMR (500 MHz, CDCl$_3$) δ 8.01 (d, 2H, J=7.0 Hz), 7.48 (t, 1H, J=7.0 Hz), 7.36 (t, 2H, J=7.7 Hz), 6.53 (d, 2H, J=2.0 Hz), 6.39 (t, 1H, J=2.0 Hz), 5.19 (s, 2H), 4.00 (t, 4H, J=6.0 Hz), 3.76 (t, 4H, J=6.0 Hz), 3.69 (s, 2H), 1.95 (quint, 4H, J=6.0 Hz); $^{13}$C NMR (125 MHz, CDCl$_3$) δ 166.3, 159.9, 137.9, 132.9, 129.631, 129.4, 128.2, 106.4, 100.7, 66.4, 65.0, 59.3, 31.7; IR (KBr) 3242.7 cm$^{-1}$ (br), 1719.7 cm$^{-1}$ (s); High Resolution MS (electrospray), m/z 383.1462 (Calcd for C$_{20}$H$_{24}$O$_6$+Na$^+$: 383.1471).

Preparation of 3,4,5-Tris(3-hydroxypropyloxy)benzyl Benzoate (13)

Silyl ether 12 (3.41 g, 4.40 mmol) was treated with HF-pyridine complex (2.82 mL, 96 mmol based on 70/30 HF/pyridine by weight) as described. Product yield was 1.76 g (92%) of 13 as a white solid, mp 54-55° C.: $^1$H NMR (300 MHz, CDCl$_3$) δ 8.03 (dxd, 2H, J=1.2, 8.1 Hz), 7.53 (txt, 1H, J=1.2, 7.5 Hz), 7.40 (t, 2H, J=7.5 Hz), 6.66 (s, 2H), 5.22 (s, 2H), 4.16-4.07 (m, 6H), 3.86-3.79 (m, 6H), 3.02 (s, 3H), 2.01 (quint, 4H, J=6.0 Hz), 1.93 (quint, 2H, J=5.1 Hz); $^{13}$C NMR (75 MHz, CDCl$_3$) δ 166.4, 152.4, 133.1, 131.8, 129.6, 128.4, 106.7, 71.8, 67.1, 66.8, 60.7, 60.2, 32.3, 31.8; IR (KBr) 3341.8 cm$^{-1}$ (broad), 1721.7 cm$^{-1}$ (sharp); High Resolution MS (electrospray), m/z 457.1835 (Calcd for C$_{23}$H$_{30}$O$_8$+Na$^+$: 457.1838).

Preparation of 3,5-Bis(3,5-bis[3-hydroxypropyloxy]benzyloxy)benzyl Benzoate (18)

Silyl ether 17 (1.91 g, 1.62 mmol) was treated with HF-pyridine complex (0.47 mL, 16 mmol based on 70/30 HF/pyridine by weight) as described. Product yield was 1.03 g (88%) of 18 as a colorless, viscous oil: $^1$H NMR (300 MHz, CDCl$_3$) δ 8.04 (d, 2H, J=8.4 Hz), 7.55 (t, 1H, J=7.3 Hz), 7.42 (t, 2H, J=7.7 Hz), 6.64 (s, 2H), 6.55 (s, 5H), 6.40 (s, 2H), 5.26 (s, 2H), 4.95 (s, 4H), 4.08 (t, 8H, J=6.0 Hz), 3.82 (t, 8H, J=5.7 Hz), 2.00 (quint, 8H, J=5.7 Hz), 1.80 (s, 4H); $^{13}$C NMR [75 MHz, (CD$_3$)$_2$CO] δ 166.5, 161.1, 160.8, 140.1, 139.4, 133.8, 130.8, 130.1, 129.2, 107.6, 106.5, 102.239, 101.1, 70.3, 66.9, 65.5, 59.0, 33.0; IR (film, NaCl) 3381.9 cm$^{-1}$ (br), 1717.1 cm$^{-1}$ (s); High Resolution MS (electrospray), m/z 743.3041 (Calcd for C$_{40}$H$_{48}$O$_{12}$+Na$^+$: 743.3043).

General Procedure for Conversion of 3-Hydroxypropyloxy Groups to 3-Brompropyloxy Groups. Preparation of 3,5-Bis(3-bromopropyloxy)benzyl Benzoate (8)

Methanesulfonyl chloride (0.38 mL, 4.9 mmol) was added dropwise over 0.5 hours to a solution of diol 7 (0.592 g, 1.64 mmol) and NEt$_3$ (0.64 mL, 4.6 mmol) in 20 mL of THF at 0° C. The solution was stirred 2 hours at 0° C. and LiBr (1.14 g, 13.1 mmol, dried at 110° C. for 16 hours) was then added. The resulting mixture was warmed to ambient temperature where stirring was maintained for 20 hours. The reaction mixture was concentrated and the residue was partitioned between H$_2$O (200 mL) and CH$_2$Cl$_2$ (100 mL). The aqueous layer was extracted with additional CH$_2$Cl$_2$ (3×50 mL). The combined organic extracts were dried over MgSO$_4$ and concentrated. The crude product was purified via chromatography on silica gel eluted with CH$_2$Cl$_2$ to give 0.69 g (87%) of 8 as a white solid, mp 85-87.5° C.: $^1$H NMR (300 MHz, CDCl$_3$) δ 8.09 (d, 2H, J=7.2 Hz), 7.54 (t, 1H, J=7.3 Hz), 7.42 (t, 2H, J=7.5 Hz), 6.61 (d, 2H, J=1.8 Hz), 6.45 (s, 1H), 5.29 (s, 2H), 4.06 (t, 4H, J=6.0 Hz), 3.56 (t, 4H, J=6.4 Hz), 2.26 (quint, 4H, J=6.0 Hz); $^{13}$C NMR (75 MHz, CDCl$_3$) δ 165.9, 159.7, 138.2, 132.8, 129.7, 129.4, 128.1, 106.4, 100.7, 66.1, 65.1, 32.0, 29.8; IR (KBr) 1708.2 cm$^{-1}$ (s); High Resolution MS (electrospray), m/z 506.9787 (Calcd for C$_{20}$H$_{22}$Br$_2$O$_4$+Na$^+$: 506.9782).

Preparation of 3,4,5-Tris(3-bromopropyloxy)benzyl Benzoate (14)

Triol 13 (1.71 g, 3.90 mmol)), NEt$_3$ (2.03 mL, 17.7 mmol), CH$_3$SO$_2$Cl (1.79 g, 17.7 mmol), and LiBr (4.11 g, 47.3 mmol) in 50 mL of THF were treated as described to give 1.50 g (62%) of 14 as white, crystalline solid, mp 53-54° C.: $^1$H NMR (300 MHz, CDCl$_3$) δ 8.06 (dxd, 2H, J=1, 7.5 Hz), 7.55 (txt, 1H, J=1, 7.5 Hz), 7.43 (t, 2H, J=7.8 Hz), 6.68 (s, 2H), 5.27 (s, 2H), 4.13 (t, 4 H, J=6 Hz), 4.06 (t, 2H, J=5.7 Hz), 3.68 (t, 2H, J=6.6 Hz), 3.61 (t, 4H, J=6.3 Hz), 2.33 (quint, 4H, J=6.0 Hz), 2.23 (quint, 2H, J=6.0 Hz); $^{13}$C NMR (75 MHz, CDCl$_3$) δ 165.0, 152.7, 133.1, 131.9, 129.7, 128.4, 107.2, 70.1, 66.7, 66.5, 33.5, 32.3, 30.5, 29.9; IR (KBr) 1714.7 cm$^{-1}$; High Resolution MS (electrospray), m/z 642.9280 (Calcd for C$_{23}$H$_{27}$Br$_3$O$_5$+Na$^+$: 642.9306).

Preparation of 3,5-Bis(3,5-bis[3-bromoxypropyloxy]benzyloxy)benzyl Benzoate (19)

Tetraol 18 (1.00 g, 1.38 mmol), NEt$_3$ (1.08 mL, 7.75 mmol), CH$_3$SO$_2$Cl (0.64 mL, 8.3 mmol), and LiBr (1.92 g, 22.1 mmol) in 20 mL of THF were treated as described to give 0.70 g (52%) of 19 as a viscous oil: $^1$H NMR (300 MHz, CDCl$_3$) δ 8.08 (d, 2H, J=7.8 Hz), 7.56 (t, 1H, J=7.3 Hz), 7.44 (t, 2 H, J=7.5 Hz), 6.71 (s, 2H), 6.61 (d, 5H, J=1.2 Hz), 6.44 (s, 2H), 5.30 (s, 2H), 4.98 (s, 4H), 4.06 (t, 8H, J=5.6 Hz), 3.57 (t, 8H, J=6.3 Hz), 2.27 (quint, 8H, J=6.0 Hz); $^{13}$C NMR (75 MHz, CDCl$_3$) δ 165.9, 159.7, 159.7, 138.9, 138.2, 132.8, 129.7, 129.4, 128.1, 106.7, 105.7, 101.4, 100.6, 69.6, 66.1, 65.1, 32.0, 29.8; IR (film, NaCl) 1716.6 cm$^{-1}$ (s); High Resolution MS (electrospray), m/z 990.9653 (Calcd for C$_{40}$H$_{44}$Br$_4$O$_8$+Na$^+$: 990.9667).

General Procedure for the Preparation of Telluride Catalysts. Preparation of 3,5-Bis[3-(phenyltelluro)propyloxy]benzyl Alcohol (9a)

Sodium borohydride (0.10 g, 2.6 mmol) was added in several portions to a solution of diphenyl ditelluride (0.539 g, 1.32 mmol) in 1 M NaOEt in ethanol (25 mL) and the resulting solution was stirred until the reaction mixture became colorless. The reaction mixture was added dropwise to a solution of 8 (0.43 g, 0.88 mmol) in THF (50 mL) heated. The resulting mixture was heated at reflux for 20 hours. The reaction mixture was concentrated and the residue was partitioned between $H_2O$ (200 mL) and $CH_2Cl_2$ (100 mL). The aqueous phase was extracted with additional $CH_2Cl_2$ (3×50 mL). The combined organic extracts were dried over $MgSO_4$ and concentrated. The residue was purified via chromatography on silica gel eluted first with $CH_2Cl_2$ and then with 20% $EtOAc/CH_2Cl_2$ to give 0.54 g (65%) of 9a as a yellow oil: $^1H$ NMR (500 MHz, $CDCl_3$) δ 7.71 (d, 4H, J=7.0 Hz), 7.24 (t, 2H, J=7.5 Hz), 7.17 (t, 4H, J=7.5 Hz), 6.45, (d, 2H, J=2.0 Hz), 6.29 (t, 1H, J=2.3 Hz), 4.58 (d, 2H, J=6.0 Hz), 3.96 (t, 4H, J=5.7 Hz), 3.02 (t, 4H, J=7.3 Hz), 2.23 (quintet, 4H, J=6.5 Hz), 1.64 (t, 1H, J=6.3 Hz); $^{13}C$ NMR (75 MHz, $CDCl_3$) δ 160.1, 143.3, 138.3, 129.2, 127.6, 111.6, 105.2, 100.6, 68.7, 65.3, 31.2, 4.2; IR (film, NaCl) 3385 $cm^{-1}$; High Resolution MS (electrospray), m/z 659.0061 (Calcd for $C_{25}H_{28}O_3{}^{130}Te_2+Na^+$: 659.0061).

Preparation of 3,5-Bis[3-(4-dimethylaminophenyltelluro)propyloxy]benzyl Alcohol (9b)

Benzoate 8 (1.05 g, 2.16 mmol), $NaBH_4$ (0.73 g, 19 mmol), and $[4-Me_2NC_6H_4Te]_2$ (1.60 g, 3.23 mmol) in THF (50 mL) were treated as described to give 1.43 g (92%) of 9b as a viscous, orange oil: $^1H$ NMR (400 MHz, $CDCl_3$) δ 7.61 (d, 4H, J=8.8 Hz), 6.52 (d, 4H, J=8.8 Hz), 6.38 (d, 2H, J=2.0 Hz), 6.28 (t, 1H, J=2.2 Hz), 4.54 (d, 2H, J=5.6 Hz), 3.93 (t, 4H, J=6.0 Hz), 2.92 (s, 12 H), 2.89 (t, 4H, J=7.2 Hz), 2.19 (quintet, 4H, J=6.0 Hz), 1.93 (t, 1H, J=6.0 Hz); $^{13}C$ NMR (75 MHz, $CDCl_3$) δ 159.7, 149.9, 143.1, 140.7, 113.2, 104.7, 100.1, 94.7, 68.4, 64.7, 40.0, 30.9, 4.1; IR (film, NaCl) 3409 $cm^{-1}$; High Resolution MS (electrospray), m/z 723.1144 (Calc for $C_{29}H_{38}N_2O_3{}^{130}Te_2+H^+$: 723.1085).

Preparation of 3,5-Bis[3-(n-hexyltelluro)propyloxy]benzyl Alcohol (9c)

Benzoate 8 (1.94 g, 4.00 mmol), $NaBH_4$ (1.36 g, 36 mmol), and di-n-hexyl ditelluride (2.55 g, 6.00 mmol) in THF (36 mL) were treated as described to give 1.60 g (62%) of 9c as a viscous, orange oil: $^1H$-NMR (300 MHz, $CDCl_3$) δ 6.51 (s, 2H), 6.51 (s, 1H), 4.61 (s, 2H), 3.99 (t, 4H, J=6.0 Hz), 2.76 (t, 4H, J=7.4 Hz), 2.63 (t, 4H, J=7.7 Hz), 2.23-2.14 (m, 4H), 1.75-1.64 (m, 5H), 1.39-1.28 (m, 12H), 0.88 (t, 6H, J=6.6 Hz); $^{13}C$-NMR (75 MHz, $CDCl_3$) δ 160.2, 143.3, 105.2, 100.6, 68.8, 65.3, 32.1, 31.7, 31.6, 31.1, 22.5, 14.0, 3.2, −1.9; IR (thin film, NaCl) 3399, 2955, 2923, 2855, 1597, 1455 $cm^{-1}$; High Resolution MS (electrospray), m/z 671.1284 (Calcd for $C_{25}H_{44}O{}^{130}Te_2+Na^+$: 671.1285).

Preparation of 3,4,5-Tris[3-(phenyltelluro)propyloxy]benzyl Alcohol (15a)

Benzoate 14 (0.30 g, 0.48 mmol), $NaBH_4$ (0.040 g, 1.0 mmol), and diphenyl ditelluride (0.61 g, 1.5 mmol) in THF (50 mL) were treated as described to give 0.24 g (56%) of 15a as a viscous, orange oil: $^1H$ NMR (300 MHz, $CDCl_3$) δ 7.71-7.67 (m, 6H), 7.26-7.21 (M, 6H), 7.18-7.13 (m, 3H), 6.48 (s, 2H), 4.54 (s, 2H), 4.01-3.88 (m, 6H), 3.13-2.97 (m, 6H), 2.24 (quintet, 4H, J=6.6 Hz), 2.15 (quintet, 2H, J=7.2 Hz); $^{13}C$ NMR (75 MHz, $CDCl_3$) δ 152.8, 138.3, 138.2, 129.2, 129.1, 127.6, 127.4, 111.6, 105.3, 74.1, 69.8, 65.4, 32.1, 31.4, 4.9, 4.4; IR (film, NaCl) 3423.5 $cm^{-1}$; High Resolution MS (electrospray), m/z 916.9856 (Calcd. for $C_{34}H_{38}O_4{}^{130}Te_3+Na^+$: 916.9816).

Preparation of 3,4,5-Tris[3-(4-dimethylaminophenyltelluro)propyloxy]benzyl Alcohol (15b)

Benzoate 14 (0.782 g, 1.25 mmol), $NaBH_4$ (0.66 g, 17 mmol), and $[4-Me_2NC_6H_4Te]_2$ (1.44 g, 2.9 mmol) in THF (50 mL) were treated as described to give 1.20 g (94%) of 15b as a viscous, orange oil: $^1H$ NMR (400MHz, $CDCl_3$) δ 7.64-7.62 (d, 6H, J=8.8 Hz); 6.57-6.52 (t, 6H, J=9.4 Hz); 6.42 (s, 2H); 4.51 (s, 2H); 3.70-3.94 (t, 4H, J=6.2 Hz); 3.30-3.90 (t, 2H, J=8.8 Hz); 2.97-2.89 (m, 8H); 2.94 (s, 12H), 2.91 (s, 6H), 2.26-2.20 (q, 4H, J=6.7 Hz); 2.13-2.06 (q, 2H, J=7.0 Hz); $^{13}C$ NMR (125 MHz, $CDCl_3$) δ 152.6, 150.2, 150.1, 141.0, 140.9, 136.7, 136.2, 113.5, 113.3, 104.9, 94.9, 94.9, 74.1, 69.4, 65.3, 40.2, 32.1, 31.3, 4.9, 4.4; IR (film, NaCl) 3432, 2934, 2876, 2807, 1501, 1439, 1355, 1114 $cm^{-1}$; High Resolution MS (electrospray), m/z 1046.1145 (Calcd for $C_{40}H_{53}N_3O_4{}^{130}Te_3+Na^+$: 1046.1083).

Preparation of 3,4,5-Tris[3-(n-hexyltelluro)propyloxy]benzyl Alcohol (15c)

Benzoate 14 (1.86 g, 3.00 mmol), $NaBH_4$ (0.76 g, 20 mmol), and di-n-hexyl ditelluride (3.00 g, 7.0 mmol) in THF (70 mL) were treated as described to give 1.54 g (56%) of 15c as a viscous, orange oil: $^1H$ NMR (400 MHz, $CDCl_3$) δ 6.58 (s, 2H), 4.60 (s, 2H), 4.01 (t, 4H, J=6.0 Hz), 3.98 (t, 2H, J=6.0 Hz), 2.86-2.77 (m, 6H), 2.66 (t, 6H, J=7.6 Hz), 2.24 (quintet, 4H, J=6.7 Hz), 2.15 (quint, 2H, J=6.7 Hz), 1.78-1.70 (m, 7H), 1.37-1.26 (m, 18H), 0.89-0.87 (m, 9H); $^{13}C$ NMR (75 MHz, $CDCl_3$) δ 153.3, 147.5, 137.1, 105.8, 74.9, 70.4, 68.8, 33.4, 32.8, 32.7, 32.4, 32.3, 32.2, 31.8, 31.7, 30.2, 23.2, 23.1, 14.6, 3.9, 3.5, −0.9, −1.2; IR (film, NaCl) 3284, 2954, 2922, 2855, 1590, 1503, 1435, 1328, 1223, 1115 $cm^{-1}$; High Resolution MS (electrospray), m/z 947.1694 (Calcd for $C_{34}H_{62}O_4{}^{130}Te_3+Na^+$: 947.1733).

Preparation of 3,5-Bis(3,5-bis[3-(phenyltelluro)propyloxy]benzyloxy)benzyl Alcohol (20a)

Dendritic wedge 19 (0.825 g, 0.848 mmol), $NaBH_4$ (0.193 g, 5.1 mmol), and diphenyl ditelluride (1.04 g, 2.55 mmol) in 50 mL of THF were treated as described to give 0.84 g (72%) of 20a as an orange oil: $^1H$ NMR (300 MHz, $CDCl_3$) d 7.71 (d, 8H, J=7.2 Hz), 7.14-7.27 (m, 12H), 6.60 (s, 2H), 6.51 (d, 5H, J=1.5 Hz), 6.32 (s, 2H), 4.93 (s, 4H), 4.61 (s, 2H), 3.96 (t, 8H, J=5.9 Hz), 3.02 (t, 8H, J=7.4 Hz), 2.23 (quint, 8H, J=6.6 Hz); $^{13}C$ NMR (75 MHz, $CDCl_3$) d 160.05, 160.0, 143.4, 139.1, 138.3, 129.1, 127.6, 111.6, 105.8, 105.7, 101.3, 100.8, 69.9, 68.7, 65.2, 31.2, 4.2; IR (film, NaCl) 3442.9 $cm^{-1}$; High Resolution MS (electrospray), m/z 1399.0520 (Calcd for $C_{57}H_{60}O_7{}^{130}Te_4+Na^+$: 1399.0486).

Preparation of 3,5-Bis(3,5-bis[3-(4-dimethylaminophenyltelluro)propyloxy]benzyloxy)benzyl Alcohol (20b)

Dendritic wedge 19 (2.49 g, 2.56 mmol), NaBH$_4$ (1.75 g, 46 mmol), and diphenyl ditelluride (3.81 g, 7.69 mmol) in 50 mL of THF were treated as described to give 3.62 g (92%) of 20b as an orange oil: $^1$H NMR (400 MHz, CDCl$_3$) δ 7.64-7.62 (d, 8H, J=8.8 Hz); 6.55-6.50 (m, 12H); 6.32 (s, 2H); 4.94 (s, 4H); 4.62 (s, 4H); 3.97-3.94 (t, 8H, J=6.0 Hz); 2.93-2.87 (m, 8H); 2.90 (s, 24H) 2.22-2.16 (q, 8H, J=6.6 Hz); $^{13}$C NMR (125 MHz, CDCl$_3$) δ 159.8, 159.5, 149.9, 148.6, 140.8, 138.8, 129.1, 113.0, 105.5, 105.2, 100.7, 100.4, 94.4, 69.5, 68.5, 39.9, 30.9, 4.0; IR (film, NaCl) 3437, 2921, 2873, 2897, 1590, 1501, 1446, 1354, 1196, 1061 cm$^{-1}$; High Resolution MS (electrospray), m/z 1571.2155 (Calcd for C$_{65}$H$_{80}$N$_4$O$_7$$^{130}$Te+Na$^+$: 1571.2174).

Preparation of 3,5-Bis(3,5-bis[3-(n-hexyltelluro)propyloxy]benzyloxy)benzyl Alcohol (20c)

Dendritic wedge 19 (1.95 g, 2.00 mmol), NaBH$_4$ (1.14 g, 30 mmol), and di-n-hexyl ditelluride (2.58 g, 6.0 mmol) in 50 mL of THF were treated as described to give 1.40 g (51%) of 20c as an orange oil: $^1$H NMR (500 MHz, CDCl$_3$) δ 6.61 (s, 2H), 6.53 (s, 1H), 6.41 (s, 2H), 4.96 (s, 4H), 4.64 (d, 2 H, J=5.0 Hz), 4.00 (t, 8H, J=6.0 Hz), 2.77 (t, 8H, J=7.3 Hz), 2.64 (t, 8H, J=7.6 Hz), 2.22-2.17 (m, 8H), 1.76-1.70 (m, 9H), 1.37-1.27 (m, 24H), 0.89-0.86 (m, 12H); $^{13}$C NMR (125 MHz, CDCl$_3$) δ 160.2, 160.1, 143.4, 139.1, 105.8, 105.7, 101.3, 100.8, 70.0, 68.8, 65.3, 32.1, 31.7, 31.6, 31.1, 22.5, 14.0, 3.3, −1.9; IR (film, NaCl) 3228, 2954, 2923, 2855, 1597, 1455, 1377, 1115 cm$^{-1}$; High Resolution MS (electrospray), m/z 1425.3117 (Calcd. for C$_{57}$H$_{92}$O$_7$$^{130}$Te$_4$+Na$^+$: 1425.3120).

Preparation of 1,1,1-Tris[4-(3,5-bis[3-(4-N,N-dimethylaminophenyl)propyloxy]benzyloxy)phenyl]ethane (22b)

Hexabromo dendrimer 21 (0.28 g, 0.20 mmol), bis-4-(N,N-dimethylamino)phenyl ditelluride (0.40 g, 0.81 mmol), and NaBH$_4$ (0.076 g, 2.0 mmol) in THF (10 mL) were treated as described to give 0.40 g (82%) of 22b as an orange oil: $^1$H NMR (500 MHz, CDCl$_3$) δ 7.63 (d, 12H, J=9 Hz), 6.98 (d, 6 H, J=9 Hz), 6.84 (d, 6H, J=9 Hz), 6.53 (d, 12H, J=9 Hz), 6.51 (s,6 H), 6.32 (s, 3H), 4.92 (s, 6H), 3.95 (t, 12H, J=6 Hz), 2.92 (s, 36H), 2.88 (t, 12 H, J=6 Hz), 2.18 (quintet, 12H, J=6 Hz), 2.08 (s, 3H]; $^{13}$C NMR (125 MHz, CDCl$_3$) δ 160.2, 156.8, 150.3, 142.0, 141.1, 139.3, 129.6, 113.9, 113.3, 105.8, 100.7, 94.6, 69.9, 68.8, 50.6, 40.2, 31.2, 4.1; Anal. Calcd for C$_{107}$H$_{126}$N$_6$O$_9$Te$_6$: C, 53.42; H, 5.28; N, 3.49. Found: C, 53.50; H, 5.31; N, 3.24.

Preparation of 1,1,1-Tris[4-(3,5-bis[3-(n-hexyltelluro)propyloxy]benzyloxy)phenyl]-ethane (22c)

Dendrimer 21 (0.38 g, 0.26 mmol), di-n-hexyl ditelluride (1.03 g, 2.4 mmol), and NaBH$_4$ (0.114 g, 3.0 mmol) in THF (20 mL) were treated as described to give 0.26 g (45%) of 22c as an orange oil: $^1$H NMR (400 MHz, CDCl$_3$) δ 7.01 (d, 6H, J=8.6 Hz), 6.87 (d, 8H, J=8.6 Hz), 6.58 (s, 6H), 6.41 (s, 3H), 4.96 (s, 6H), 4.01 (t, 12H, J=6.3 Hz), 2.78 (t, 12H, J=7.3 Hz), 2.65 (t, 12H, J=7.3 Hz), 2.21 (quint, 12H, J=6.3 Hz), 2.12 (s, 3H), 1.74 (quint, 12 H, J=7.3 Hz), 1.39-1.29 (m, 36H), 0.90-0.87 (m, 18H); $^{13}$C NMR (125 MHz, CDCl$_3$) δ 160.0, 156.6, 141.8, 139.3, 129.5, 113.8, 105.7, 100.6, 69.8, 68.7, 50.5, 32.0, 31.6, 31.5, 31.0, 30.6, 22.4, 14.0, 3.1, −2.0; IR (film, NaCl) 2954, 2923, 2868, 1598, 1507, 1457, 13787, 1244, 1178 cm$^{-1}$. Anal. Calcd for C$_{95}$H$_{144}$O$_9$Te$_6$: C, 51.96; H, 6.61. Found: C, 52.11; H, 6.53.

Preparation of 1-phenoxy-3-[4-(N,N-dimethylamino)phenyltelluro]propane (23b)

tert-BuLi (12 mL of a 1.7 M solution, 20 mmol) was added dropwise to a solution of 4-bromo-N,N-dimethylaniline (2.00 g, 10 mmol) in THF (40 mL) at −78° C. The resulting solution was stirred at −78° C. for 1 hour and was then warmed to ambient temperature. Tellurium powder (1.28 g, 10 mmol) was added in one portion and the resulting mixture was stirred at room temperature for 1 hour. 1-Bromo-3-phenoxypropane (2.04 g, 9.5 mmol) in 5 mL of THF was added and the resulting mixture was heated at reflux for 16 hours. The reaction mixture was filtered through Celite and the filter cake was washed with CH$_2$Cl$_2$ (50 mL). The filtrate was concentrated and the residue was partitioned between H$_2$O (100 mL) and CH$_2$Cl$_2$ (50 mL). The aqueous layer was extracted with additional CH$_2$Cl$_2$ (3×25 mL). The combined organic extracts were dried over MgSO$_4$ and concentrated. The crude product was then purified by column chromatography on silica gel eluted with 60% CH$_2$Cl$_2$/hexanes to give 1.9 g (52%) of 23b as an orange oil: $^1$H NMR (400 MHz, CDCl$_3$) δ 7.63 (d, 2H, J=8.8 Hz), 7.24 (t, 2H , J=7.8), 6.91 (t, 1H, J=7.2), 6.84 (d, 2H, J=8.0 Hz), 6.54 (d, 2H, J=8.8 Hz), 3.97 (t, 2H, J=6.0 Hz), 2.94 (s, 6H), 2.90 (t, 2H, J=7.4 Hz), 2.20 (quint, 2H, J=6.8 Hz); $^{13}$C NMR (75 MHz, CDCl$_3$) δ 158.9, 150.3, 141.2, 129.4, 120.6, 114.5, 113.4, 94.7, 68.7, 40.2, 31.2, 4.3; High Resolution MS (EI) m/z 385.0694 (Calcd for C$_{17}$H$_{21}$NO$^{130}$Te: 385.0681). Anal. Calcd for C$_{17}$H$_{21}$NOTe: C, 53.32; H, 5.53; N, 3.66. Found: C, 53.26; H, 5.61; N, 3.32.

Stopped-Flow Experiments

All stopped-flow experiments were performed on a SX18 Stopped-Flow Spectrometer (Applied Photophysics, Leatherhead, UK). The sample-handling unit was fitted with two drive syringes that are mounted inside a thermostatted-bath compartment, which allowed for variable temperature experimentation. The optical detection cell was set up in the 2-mm pathlength. First- and second-order curve fitting and rate constants used a Marquardt algorithm (Marquardt, *J. Soc. Indust. Appl. Mathematics,* 11:431 et al. (1963), which is hereby incorporated by reference in its entirety) based on the routine Curfit (Bevington, *Data Reduction and Error Analysis for the Physical Sciences*, McGraw-Hill, New York (1969), which is hereby incorporated by reference in its entirety).

Preparation of Stock Solutions, Catalysis Experiments

Stock solutions of 2.0×10$^{-3}$ M of catalyst in CH$_2$Cl$_2$ and 5.0×10$^{-2}$ M PhSH in CH$_2$Cl$_2$ were prepared. These were diluted with MeOH to give a 5% CH$_2$Cl$_2$/MeOH solution of 2.0×10$^{-5}$ M telluride and 2.0×10$^{-3}$ PhSH. A stock solution of 7.50×10$^{-3}$ M H$_2$O$_2$ in MeOH was prepared. These two solutions were mixed in the stopped-flow spectrometer to give concentrations of 1.0×10$^{-5}$ M telluride, 1.0×10$^{-3}$ M PhSH, and 3.75×10$^{-3}$ M H$_2$O$_2$ and the increase in absor bance at 305 nm was measured. The concentration of $H_2O_2$ in the stock solution was determined from the absorbance at 240 nm ($\in$=43.6 cm$^{-1}$ M$^{-1}$) (Riley et al., *Endocrinology*, 128:1749 et al. (1991); Zhao et al., *Biochemistry*, 40:10832 et al. (2001), which are hereby incorporated by reference in their entirety). The values in Table 1 are the average of 7-10 independent runs (±standard deviation).

TABLE 1

Initial Rates of Oxidation ($v_0$) of PhSH (1 × 10$^{-3}$ M) with $H_2O_2$ (3.75 × 10$^{-3}$ M) in MeOH with Polyorganotelluride Catalysts (1 × 10$^{-5}$ M) with n Telluride Groups from Initial Linear Increases in Absorbance ($k_0$)[a]

| catalyst | R | n | $k_0$, $\Delta A\ s^{-1}$[b] | $v_0$, μM min$^{-1}$ | $v_0$ (rel) |
|---|---|---|---|---|---|
| none |  | 0 | (3.0 ± 0.2) × 10$^{-6}$ | 0.72 ± 0.05 | 0.06 |
| 23a | Ph | 1 | (5.3 ± 0.4) × 10$^{-5}$ | (1.2 ± 0.1) × 10$^1$ | 1 |
| 9a | Ph | 2 | (8.8 ± 0.5) × 10$^{-5}$ | (2.0 ± 0.1) × 10$^1$ | 1.7 |
| 15a | Ph | 3 | (1.14 ± 0.02) × 10$^{-4}$ | (2.66 ± 0.05) × 10$^1$ | 2.2 |
| 20a | Ph | 4 | (1.81 ± 0.05) × 10$^{-4}$ | (4.3 ± 0.1) × 10$^1$ | 3.6 |
| 22a | Ph | 6 | (4.93 ± 0.05) × 10$^{-4}$ | (1.18 ± 0.01) × 10$^2$ | 9.8 |
| 23b | 4-Me$_2$NC$_6$H$_4$ | 1 | (1.06 ± 0.05) × 10$^{-4}$ | (2.5 ± 0.1) × 10$^1$ | 2.1 |
| 9b | 4-Me$_2$NC$_6$H$_4$ | 2 | (1.69 ± 0.05) × 10$^{-4}$ | (4.0 ± 0.1) × 10$^1$ | 3.3 |
| 15b | 4-Me$_2$NC$_6$H$_4$ | 3 | (3.15 ± 0.03) × 10$^{-4}$ | (7.49 ± 0.07) × 10$^1$ | 6.3 |
| 20b | 4-Me$_2$NC$_6$H$_4$ | 4 | (3.13 ± 0.05) × 10$^{-4}$ | (7.4 ± 0.1) × 10$^1$ | 6.3 |
| 22b | 4-Me$_2$NC$_6$H$_4$ | 6 | (5.6 ± 0.1) × 10$^{-4}$ | (1.34 ± 0.02) × 10$^2$ | 11 |
| 23 | n-hexyl | 1 | (1.53 ± 0.09) × 10$^{-4}$ | (3.6 ± 0.2) × 10$^1$ | 3.0 |
| 9c | n-hexyl | 2 | (2.90 ± 0.06) × 10$^{-4}$ | (6.9 ± 0.1) × 10$^1$ | 5.8 |
| 15c | n-hexyl | 3 | (4.00 ± 0.05) × 10$^{-4}$ | (9.5 ± 0.1) × 10$^1$ | 7.9 |
| 20c | n-hexyl | 4 | (5.47 ± 0.07) × 10$^{-4}$ | (1.31 ± 0.01) × 10$^2$ | 11 |
| 22c | n-hexyl | 6 | (1.30 ± 0.01) × 10$^{-3}$ | (3.12 ± 0.02) × 10$^2$ | 26 |

[a]Reagents were mixed in a stopped-flow spectrometer in a 2-mm cell at 276.8 ± 0.4 K and initial rates were measured at 305 nm for the initial 5–15% of reaction. Values are the average of 7–10 independent runs with ± standard deviation.
[b]Values of $k_0$ were corrected for the uncatalyzed reaction prior to calculation of $v_0$.

Oxidation of Tellurides 23 and 24

Stock solutions of 2.06×10$^{-3}$ M telluride and 2.06×10$^{-2}$ M $H_2O_2$ in 5% $CH_2Cl_2$/MeOH were prepared. These two solutions were mixed in the stopped-flow spectrometer to give concentrations of 1.03×10$^{-3}$ M telluride and 1.03×10$^{-2}$ M $H_2O_2$ and the increase in absorbance at 325 nm for 23a, 350 nm for 23b, and 352 nm for 24 was measured as a function of time for 7-10 independent runs (±standard deviation).

Results and Discussion

Synthesis of Catalysts

Figure 10:
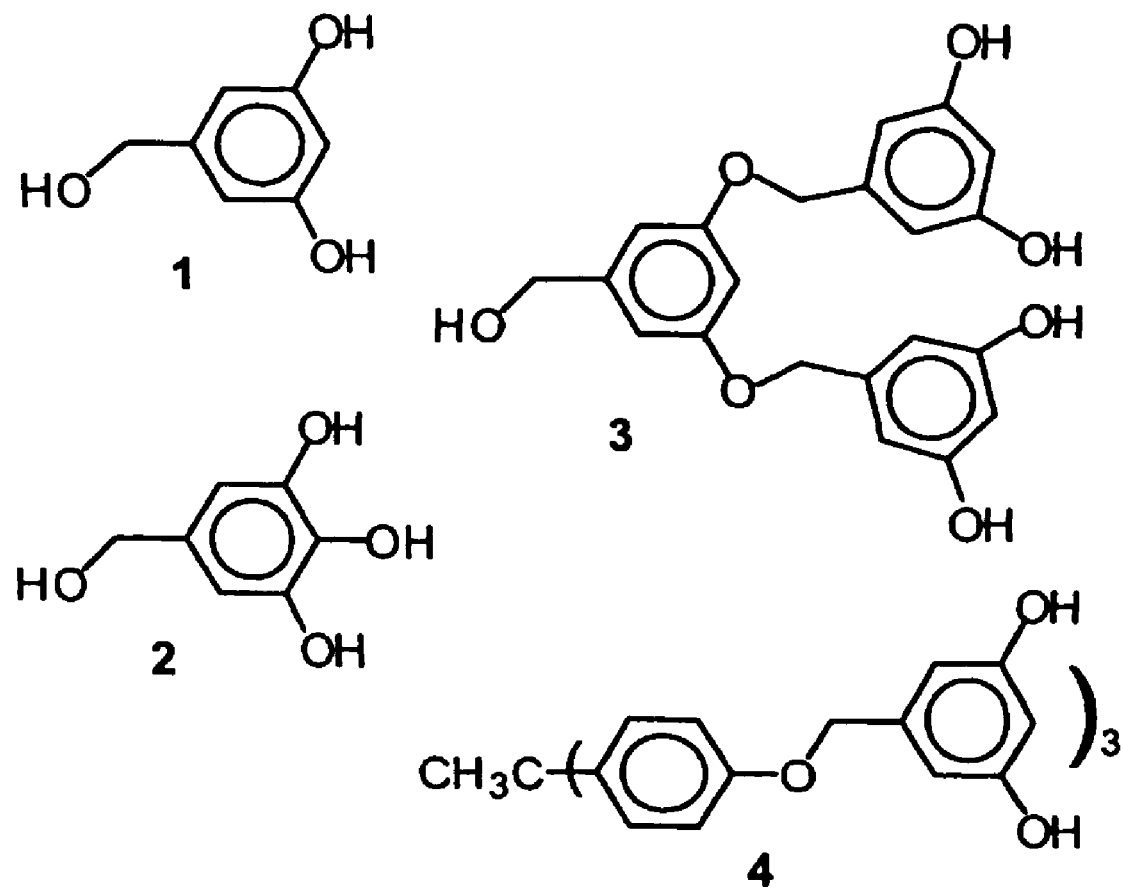
FIG. 10 shows Fréchet-type dendrimers based on 3,5-dihydroxybenzyl alcohol and 3,4,5-trihydroxybenzyl alcohol.

The dendrimer architecture supporting the catalytic organotelluride groups must be stable to $H_2O_2$. It has been demonstrated that Fréchet-type dendrimers (FIG. 10) based on 3,5-dihydroxybenzyl alcohol (1) (Hawker et al., *J. Chem. Soc., Chem. Commun.*, 1010 (1990); Hawker et al., *J. Am. Chem. Soc.*, 112:7638 et al. (1990), which are hereby incorporated by reference in their entirety) and 3,4,5-trihydroxybenzyl alcohol (2) (Percec et al., *J. Am. Chem. Soc.*, 122:10273 (2000); Balagurusamy et al., *J. Am. Chem. Soc.*, 119:1539 et al. (1997), which are hereby incorporated by reference in their entirety) are well suited to this task (Francavilla et al., *J. Am. Chem. Soc.*, 123:57 et al. (2001), which is hereby incorporated by reference in its entirety). Compounds 1 and 2 provide two and three points of attachment, respectively, through the phenolic groups leaving the benzyl alcohol functionality for further functionalization. Linking three molecules of 1 together gives four points of attachment in dendritic wedge 3 through the phenolic groups while linking three molecules of 1 to 1,1,1-tris(4-hydroxyphenyl)ethane gives first-generation dendrimer 4 with six points of attachment (Hawker et al., *J. Chem. Soc., Chem. Commun.*, 1010 (1990); Hawker et al., *J. Am. Chem. Soc.*, 112:7638 et al. (1990), which are hereby incorporated by reference in their entirety).

Figure 11:
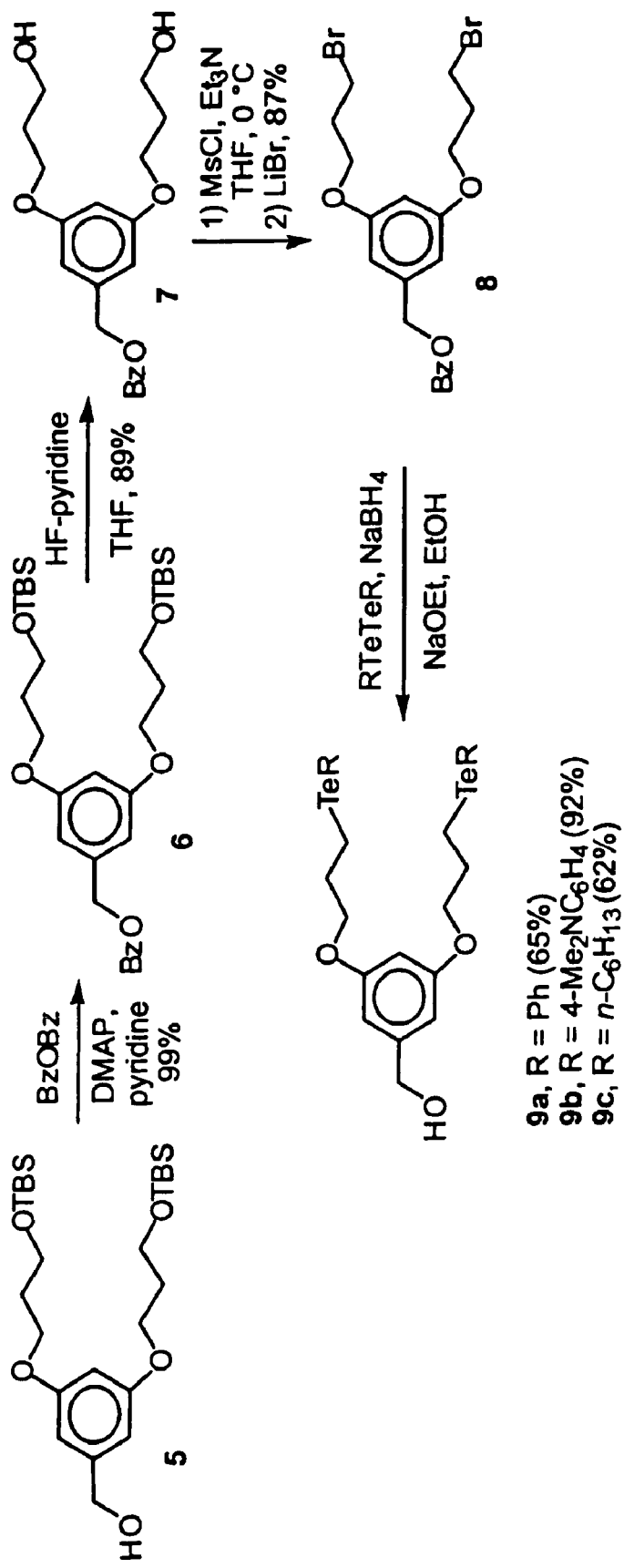
FIG. 11 shows the synthesis of organotelluride catalysts based on 3,5-dihydroxybenzyl alcohol.

The synthesis of organotelluride catalysts based on 3,5-dihydroxybenzyl alcohol (1) is shown in FIG. 11. 3,5-Bis [3-(tert-butyldimethylsilyloxy)propyl-1-oxy]benzyl alcohol (5) (Francavilla et al., *J. Am. Chem. Soc.*, 123:57 et al. (2001), which is hereby incorporated by reference in its entirety) was converted to the corresponding benzoate 6 in 99% isolated yield with benzoic anhydride and pyridine in the presence of catalytic DMAP. The silyl protecting groups were removed with HF-pyridine to give diol 7 in 89% isolated yield. Diol 7 was converted to the corresponding dibromide 8 in two steps (Wendler et al., *Tetrahedron*, 3:144 et al. (1958), which is hereby incorporated by reference in its entirety). The mesylate was first prepared, but not isolated, and was then treated in situ with lithium bromide to give dibromide 8 in 87% isolated yield. The addition of PhTeNa to 8 gave 9a with two phenyltelluro groups in 65% isolated yield; 4-Me$_2$NC$_6$H$_4$TeNa, 9b with two dimethylaminophenyltelluro groups in 92% isolated yield; and n-C$_6$H$_{13}$TeNa, 9c with two hexyltelluro groups in 62% isolated yield.

Figure 12:
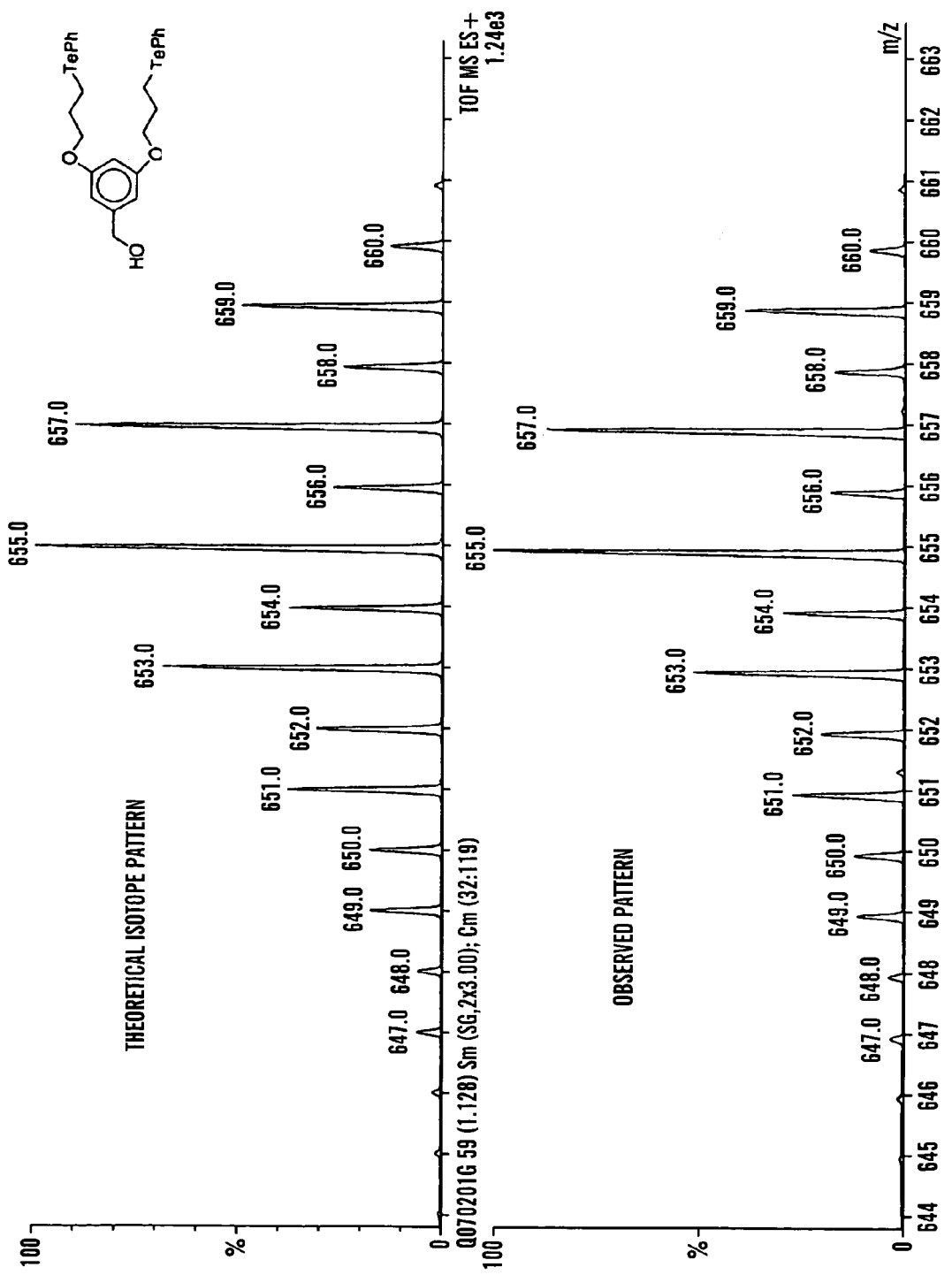

The structures of tellurides 9 followed directly from mass spectrometry and the symmetry of both $^1$H and $^{13}$C NMR spectra. The electrospray mass spectra of all three tellurides 9 displayed the characteristic isotope clusters for molecules with two Te atoms (illustrated for 9a in FIG. 12).

Figure 13:
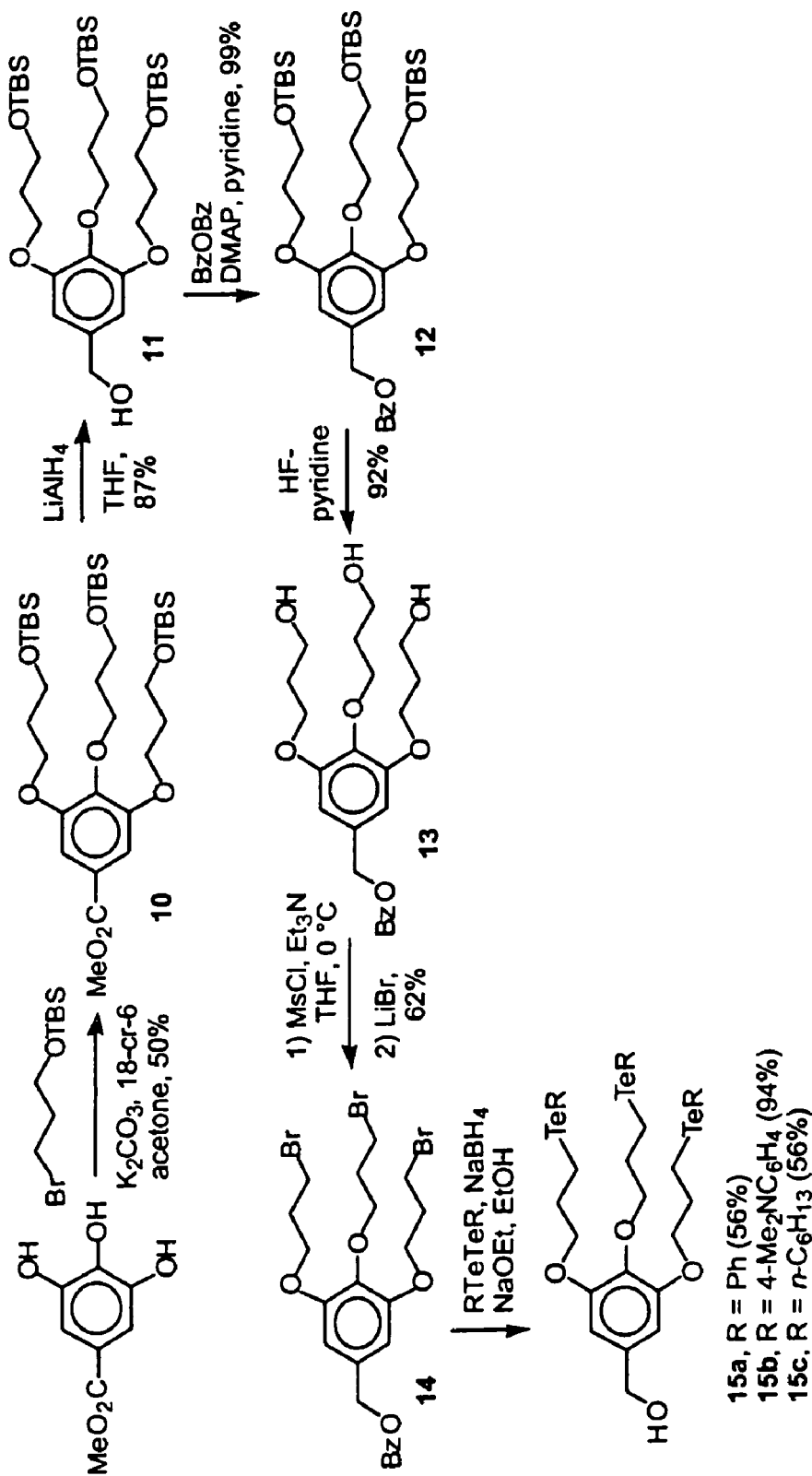
FIG. 13 shows the synthesis of organotelluride catalysts based on 3,4,5-trihydroxybenzyl alcohol.

The synthesis of organotelluride catalysts based on 3,4, 5-trihydroxybenzyl alcohol (2) is shown in FIG. 13. Methyl gallate was treated with excess 3-(tert-butyldimethylsilyloxy)-1-bromopropane in the presence of $K_2CO_3$ to give ester 10 in 50% isolated yield, which was then reduced to benzyl alcohol 11 in 87% isolated yield with LiAlH$_4$. Compound 11 was converted to the benzoate ester 12 in 99% isolated yield as described, which was then desilylated with HF-pyridine to give triol 13 in 92% isolated yield. As before, the hydroxyl groups were converted via the mesylate to the corresponding bromides (Wendler et al., *Tetrahedron*, 3:144 et al. (1958), which is hereby incorporated by reference in its entirety) to give 14 in 62% overall yield. The addition of excess PhTeNa to 14 gave tritelluride 15a in 56% isolated yield; 4-Me$_2$NC$_6$H$_4$TeNa, tritelluride 15b in 94% isolated yield; and n-C$_6$H$_{13}$TeNa, tritelluride 15c in 56% isolated yield.

Figure 14:
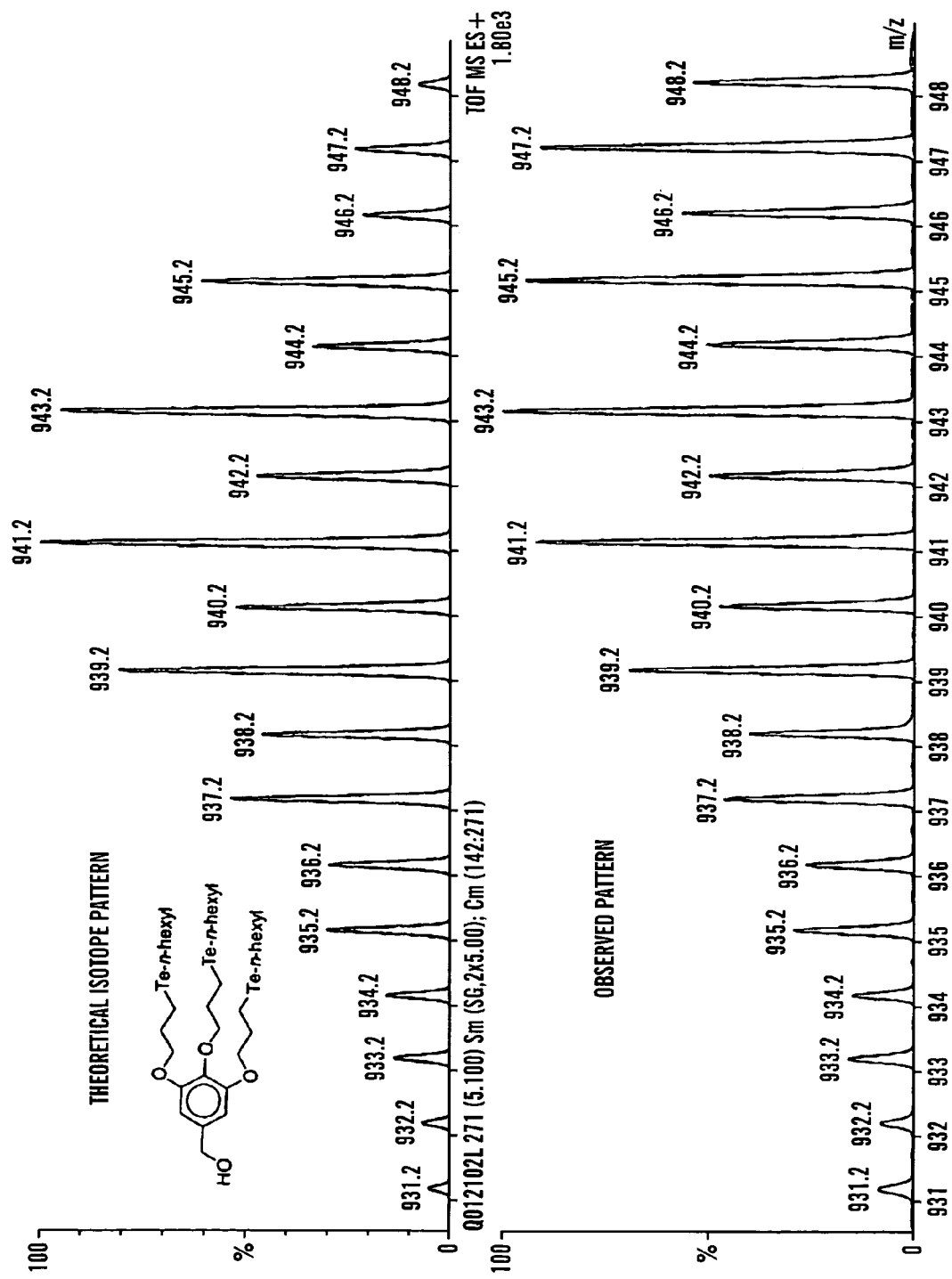
FIG. 14 shows the electrospray mass spectra for compound 15c.

The structures for tritellurides 15 directly followed from mass spectrometry as well as the symmetry of their $^1$H and $^{13}$C NMR spectra. The NMR spectra of compounds 15 displayed the same C$_2$ symmetry as those of compounds 9, but displayed the extra signals from the additional 4-(organotelluropropyloxy) group. The electrospray mass spectra of compounds 15 displayed the characteristic isotope clusters for three Te atoms (illustrated for 15c in FIG. 14).

Figure 15:
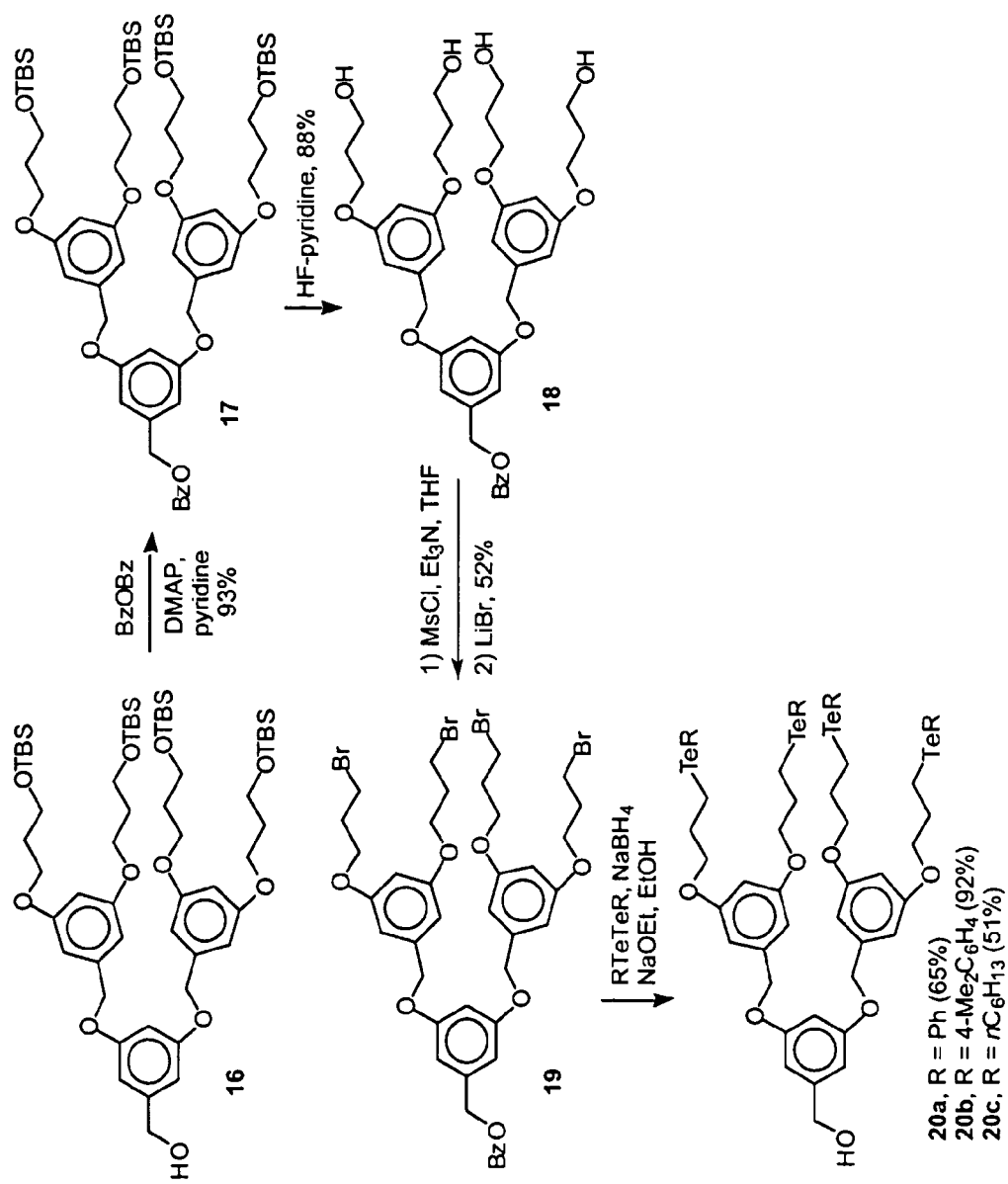
FIG. 15 shows the synthesis of tetratelluride catalysts based on dendritic wedge 3 (FIG. 10).

The synthesis of tetratelluride catalysts based on dendritic wedge 3 is shown in FIG. 15. Benzyl alcohol 16 (Francavilla et al., *J. Am. Chem. Soc.*, 123:57 et al. (2001), which is hereby incorporated by reference in its entirety) was converted to the benzoate 17 in 93% isolated yield with benzoic anhydride as previously described. The four silyl groups were removed with HF-pyridine to give tetraol 18 in 88% isolated yield. As before, the hydroxyl groups were converted via the mesylate to the corresponding bromides (Wendler et al., *Tetrahedron*, 3:144 et al. (1958), which is hereby incorporated by reference in its entirety) to give tetrabromide 19 in 52% overall yield. The addition of excess PhTeNa to 19 gave tetratelluride 20a in 65% isolated yield; 4-Me$_2$NC$_6$H$_4$TeNa, tetratelluride 20b in 92% isolated yield; and n-C$_6$H$_{13}$TeNa, tetratelluride 20c in 51% isolated yield.

Figure 16:
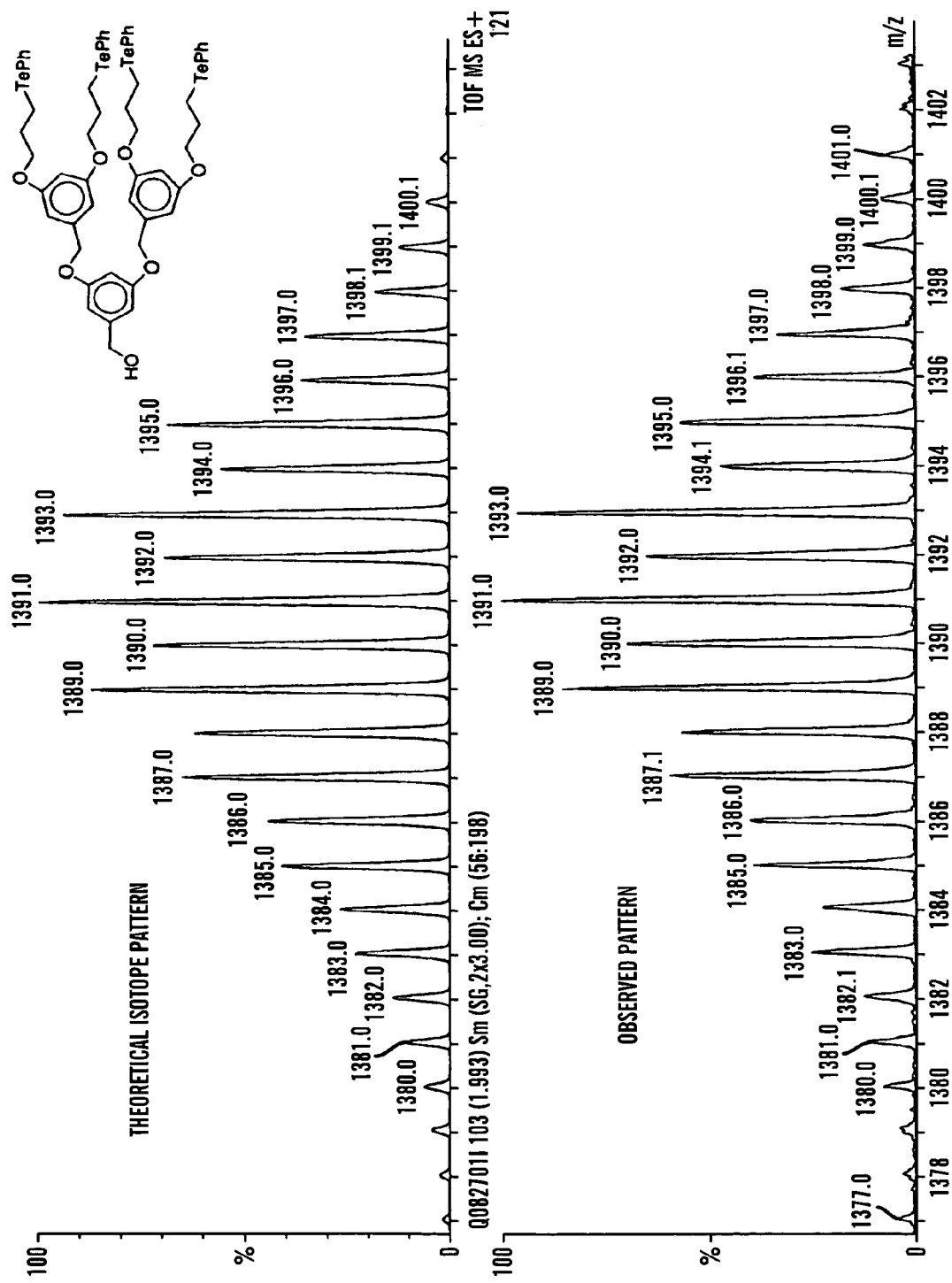

The structures of tetratellurides 20 followed directly from the $^1$H and $^{13}$C NMR spectra as well as the electrospray mass spectra. The $^{13}$C NMR spectra of 20a, 20b, and 20c displayed the expected 17, 18, and 19 lines, respectively, for the tetratelluride. The mass spectra of compounds 20 displayed the characteristic isotope clusters for molecules containing four Te atoms (illustrated for 20a in FIG. 16).

Figure 17:
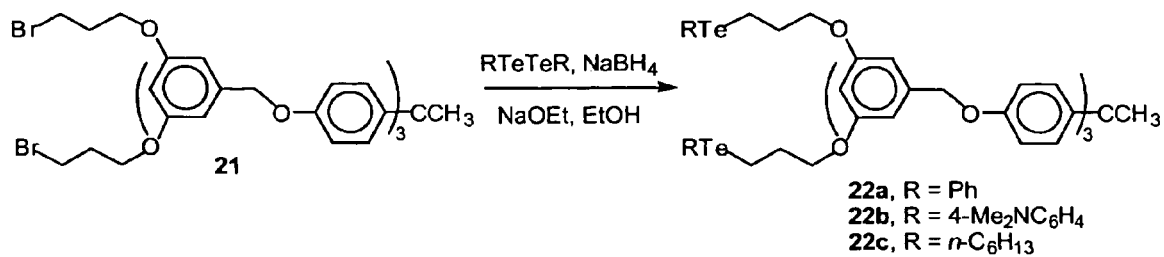
FIG. 17 shows the synthesis of hexatelluride catalysts based on the first-generation dendrimer 4 (FIG. 10).

The synthesis of hexatelluride catalysts based on the first-generation dendrimer 4 is shown in FIG. 17. Hexabromide 21 (Francavilla et al., *J. Am. Chem. Soc.*, 123:57 et al. (2001), which is hereby incorporated by reference in its entirety) was treated with excess PhTeNa to give hexatelluride 22a (Francavilla et al., *J. Am. Chem. Soc.*, 123:57 et al. (2001), which is hereby incorporated by reference in its entirety) in 82% isolated yield; with excess 4-Me$_2$NC$_6$H$_4$TeNa to give hexatelluride 22b in 82% isolated yield; and with excess n-C$_6$H$_{13}$TeNa to give hexatelluride 22c in 45% isolated yield.

Unlike tellurides 9, 15, and 20, the hexatellurides 22 did not give a parent ion by mass spectrometry under several soft ionization conditions (FAB, electrospray ionization). The $^1$H and $^{13}$C NMR spectra of compounds 22 were consistent with the proposed structures. Dendrimer 22a terminating in six phenyltelluro groups displayed the expected eighteen $^{13}$C NMR signals for the first-generation dendrimer. Similarly, dendrimer 22b terminating in six 4-dimethylaminophenyltelluro groups displayed the expected nineteen signals from the additional aliphatic signal of the dimethylamino substituent. Dendrimer 22c terminating in six hexyltelluro groups displayed the expected twenty signals including the additional six aliphatic carbon signals. The roughly 25-30-ppm upfield shift observed in the $^{13}$C chemical shift for the aliphatic C's bonded to Te in compounds 22 relative to Br in hexabromide 21 (δ 32.3) (Francavilla et al., *J. Am. Chem. Soc.*, 123:57 et al. (2001), which is hereby incorporated by reference in its entirety) was diagnostic for the displacement of bromides by the organotelluride groups. For 22a, this signal is observed at δ 4.3. For 22b, this signal is observed at δ 4.1. For 22c terminating in hexylelluro groups, two highly shielded aliphatic carbons are observed at δ 3.1 and δ–2.0, which is consistent with a dialkyl telluride.

Oxidation of Telluride Catalysts with Hydrogen Peroxide

Figure 18:
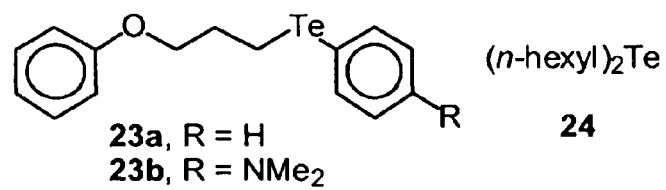
FIG. 18 shows monotellurides and di-n-hexyltelluride which are model catalytic systems for the dendrimeric organotelluride catalysts 9, 15, 20, and 22.

For the catalytic cycle described above, the rate-determining step in all systems examined to date is the rate of oxidation of the telluride, (Detty et al., *J. Am. Chem. Soc.*, 118:313 et al. (1996), which is hereby incorporated by reference in its entirety) which is accelerated by electron-donating substituents. In contrast, reductive elimination of the oxidized substrate is accelerated by electron-withdrawing substituents (Higgs et al., *Org. Lett.*, 3:349 et al. (2001); Leonard et al., *Organometallics*, 15:4285 et al. (1996), which are hereby incorporated by reference in their entirety). The 4-dimethylaminophenyl and n-hexyl substituents are both more electron-donating than the phenyl substituent, which suggests that organotelluride catalysts bearing the former substituents should be more readily oxidized than the phenyl-series of catalysts. The monotellurides 23 and di-n-hexyltelluride (24) (Butcher et al., *J. Org. Chem.*, 64:5677 et al. (1999), which is hereby incorporated by reference in its entirety) shown in FIG. 18 are model catalytic systems for the dendrimeric organotelluride catalysts 9, 15, 20, and 22, and the rates of oxidation of the monotellurides should predict the relative rates of oxidation in the dendrimeric catalysts.

Figure 19:
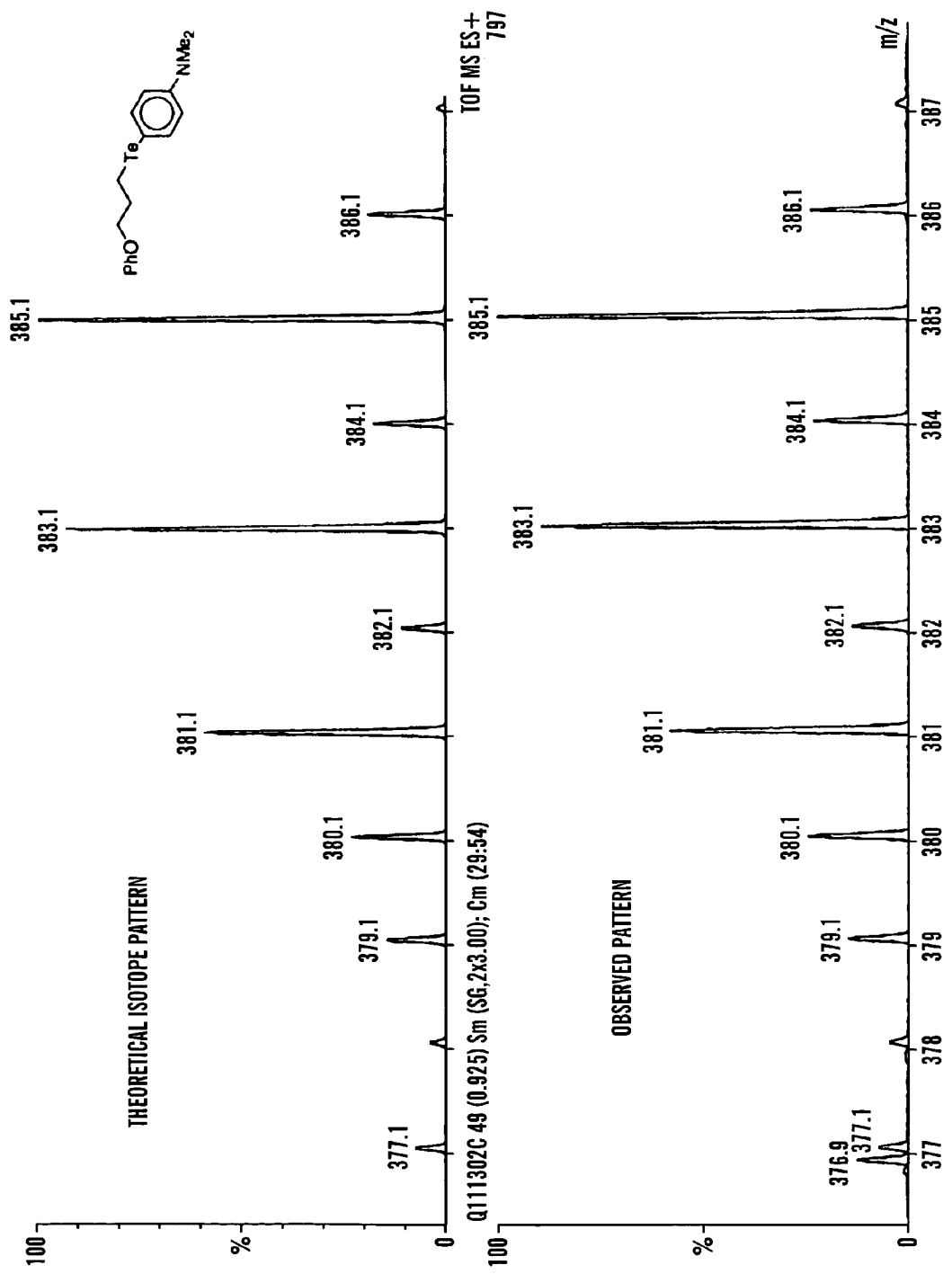
FIG. 19 shows the electrospray mass spectra for compound 23b.

1-Phenoxy-3-(phenyltelluro)propane (23a) (Francavilla et al., *J. Am. Chem. Soc.*, 123:57 et al. (2001), which is hereby incorporated by reference in its entirety) and 1-phenoxy-3-[4-(N,N-dimethylamino)phenyltelluro]propane (23b) were prepared by the addition of PhTeNa and 4-Me$_2$NC$_6$H$_4$TeNa, respectively, to 1-bromo-3-phenoxypropane. Di-n-hexyltelluride (24) was prepared by the addition of 1-bromohexane to Li$_2$Te (Leonard et al., *Organometallics*, 15:4285 et al. (1996), which is hereby incorporated by reference in its entirety). The mass spectra of the monotellurides displayed the characteristic isotope pattern for the Te atom (illustrated for 23b in FIG. 19).

The rates of oxidation of monotellurides 23 and 24 were followed in the stopped-flow spectrometer under pseudo first-order conditions. Final concentrations of $1.03 \times 10^{-3}$ M telluride and $1.03 \times 10^{-2}$ M H$_2$O$_2$ at 276.8±0.4 K gave observed rate constants for oxidation of $(1.10 \pm 0.01) \times 10^{-1}$ s$^{-1}$ for 23a, $(3.62 \pm 0.02) \times 10^{-1}$ s$^{-1}$ for 23b, and $(4.5 \pm 0.4) \times 10^{-1}$ for 24, which correspond to second-order rate constants of 10.7±0.1 M$^{-1}$ s$^{-1}$ for 23a, 35.1±0.2 M$^{-1}$ s$^{-1}$ for 23b, and 44±4 M$^{-1}$ s$^{-1}$ for 24. If telluride oxidation were to remain the rate-determining step in reactions with dendrimeric telluride catalysts, then the dimethylaminophenyl-series and n-hexyl-series of tellurides should be more active than the phenyl-series of tellurides.

Thiol Peroxidase Activity of Organotelluride Catalysts

In earlier work with dendrimeric organotelluride catalysts for the oxidation of halide salts with H$_2$O$_2$ (Francavilla et al., *J. Am. Chem. Soc.*, 123:57 et al. (2001), which is hereby incorporated by reference in its entirety), a two-phase system of CH$_2$Cl$_2$ and pH-6 buffer was employed, which kept the catalysts and substrate in solution. In order to evaluate the catalysts in a homogeneous system, the method of Tomoda et al. (Iwaoka et al., *J. Am. Chem. Soc.*, 116:2557 et al. (1994); Mugesh et al., *J. Am. Chem. Soc.*, 123:839 et al. (2001), which are hereby incorporated by reference in their entirety) was employed to measure thiol peroxidase activity. In this procedure, thiophenol (PhSH) is oxidized to diphenyl disulfide (PhSSPh) using $H_2O_2$ as the oxidant. Catalytic activity was determined by the initial rates for the oxidation of PhSH ($1.0 \times 10^{-3}$ M) with $H_2O_2$ ($3.75 \times 10^{-3}$ M) in MeOH in the presence of a catalyst at a standard concentration of $1.0 \times 10^{-5}$ M.

A 5% $CH_2Cl_2$/MeOH solution of catalyst (9, 15, 20, 23, or 24 at $2.0 \times 10^{-5}$ M) and PhSH ($2.0 \times 10^{-3}$ M) was mixed with an equal volume of a 5% $CH_2Cl_2$/MeOH solution of $H_2O_2$ ($7.5 \times 10^{-3}$ M) in a stopped-flow spectrophotometer at $276.8 \pm 0.4$ K to give final concentrations of $1.0 \times 10^{-5}$ M catalyst, $1.0 \times 10^{-3}$ M PhSH, and $3.75 \times 10^{-3}$ M $H_2O_2$. The rate of appearance of PhSSPh, with a molar extinction coefficient, $\epsilon$, of $1.24 \times 10^{-3}$ L mol$^{-1}$ cm$^{-1}$ at 305 nm (Mugesh et al., *J. Am. Chem. Soc.*, 123:839 et al. (2001), which is hereby incorporated by reference in its entirety), was monitored at 305 nm. The 5% $CH_2Cl_2$ was added to keep the tellurides/oxidized tellurides in solution during the course of the reaction. For hexatellurides 22, the percentage of $CH_2Cl_2$ was increased to 46% (by volume) in both solutions to keep the dendrimers in solution during the time-course of the analysis.

Linear increases in absorbance, $k_0$, were observed in the initial stages of the catalyzed reaction and are listed in Table 1 in units of $\Delta A\ s^{-1}$ where A is the absorbance at 305 nm. A slow, uncatalyzed background reaction was observed upon mixing the two solutions in the stopped-flow spectrometer without added catalyst. Values of $k_0$ were corrected for the uncatalyzed background reaction and converted to initial velocities, $v_0$, in units of μM min$^{-1}$ (Table 1). Values of $v_0$ as a function of the number of catalytic groups is plotted in FIG. 20.

Figure 20:
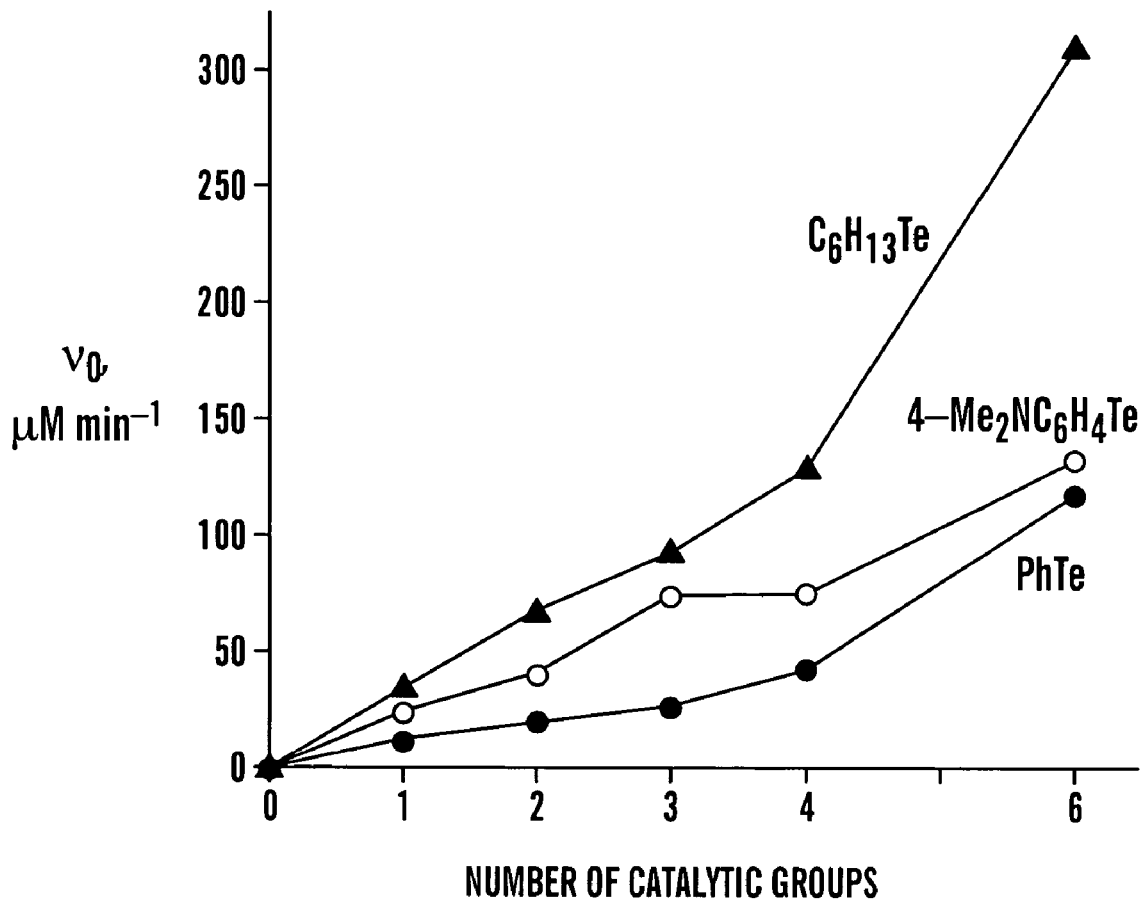
FIG. 20 is a graph showing a plot of initial velocities, $v_0$, for the oxidation of thiophenol to diphenylsulfide with hydrogen peroxide as a function of the number of organotelluride groups in polyorganotellurides for the phenyltelluro series (filled circles), 4-dimethylaminophenyltelluro series (open circles), and n-hexyltelluro series (filled triangles). The lines connect related points and have no other significance. Standard deviations are given in Table 1.

As shown in FIG. 20, increasing the number of telluride groups attached to the molecular scaffold increased the catalytic activity on a molar basis along statistical lines. Stereoelectronic effects can also be imposed. In the series of molecules described here, electron-donating substituents increase the rate of oxidation of the telluride groups in the catalytic cycle, which increases overall rates of catalysis. If 1-phenoxy-3-(phenyltelluro)propane (23a) is assigned a relative rate of 1.0 ($v_0$=12 μM min$^{-1}$), the dendrimer catalyst 22c with six n-hexyltelluro groups has a relative rate of 26 ($v_0$=312 μM min$^{-1}$) from a combination of statistical and stereoelectronic effects.

The use of dendrimeric catalysts offer potential advantages for catalyst loading on solid supports where multiple catalytic sites can be tethered to a single site on the support. The combination of statistical and stereoelectronic effects can be used to tailor the overall catalytic activity.

Example 2

Preparation of Coating Compositions

PhSe-6 (Francavilla et al., *J. Am. Chem. Soc.* 123:57 et al. (2001), which is hereby incorporated by reference in its entirety) (FIG. 7) was incorporated in a hybrid TEOS-based [tetraethoxysilane, $Si(OEt)_4$] sol-gel and the water-soluble dendrimer WSSe-6 (FIG. 7) was incorporated in a hybrid TEOS and enTMOS sol-gel at loading levels of 10 to 100 ppm. At the higher loading levels, dichloromethane was used as a cosolvent to solubilize the PhSe-6 dendrimer. No film desorption and no leaching of the sequestered material were observed within the detection limits of inductively coupled plasma mass spectrometry (20 parts per trillion (ppt) for Te and 42 ppt for Se) using water, dichloromethane, ethanol, or various buffers (pH=2-9) as solvent.

Figure 21A:
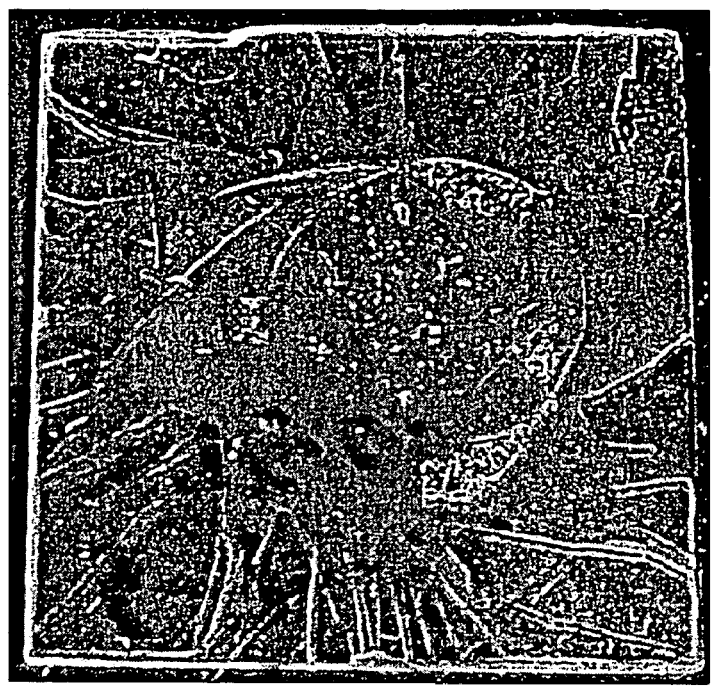
FIG. 21A-F show unretouched photographs of sol-gel films at 80 ppm of dendrimer.
Figure 21B:
Figure 21C:
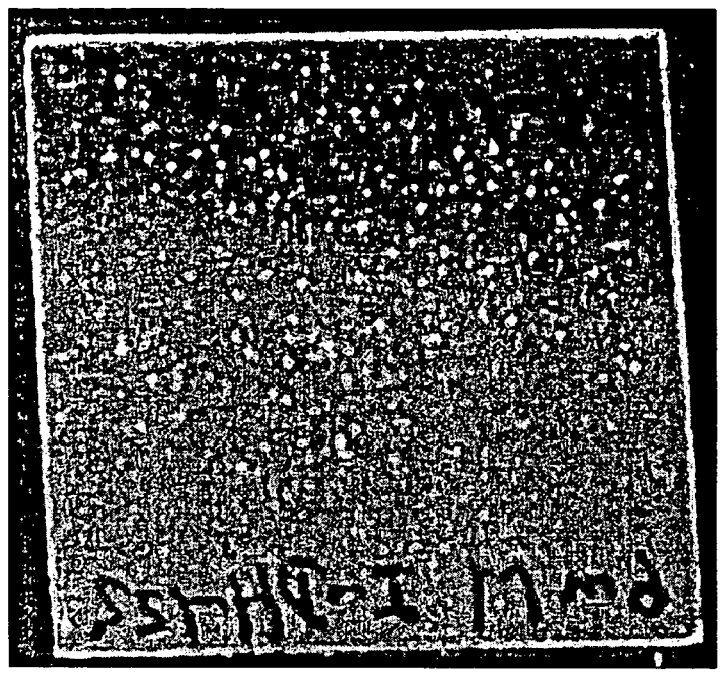
Figure 21D:
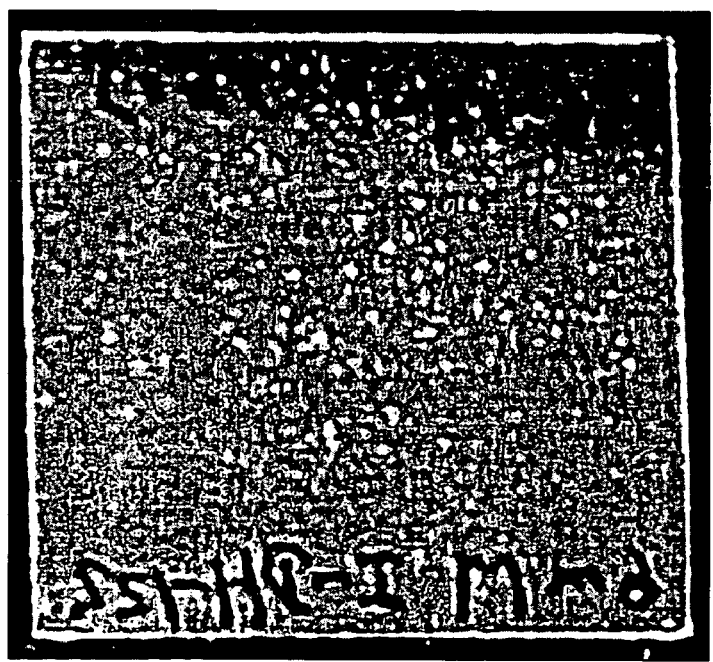
Figure 21E:
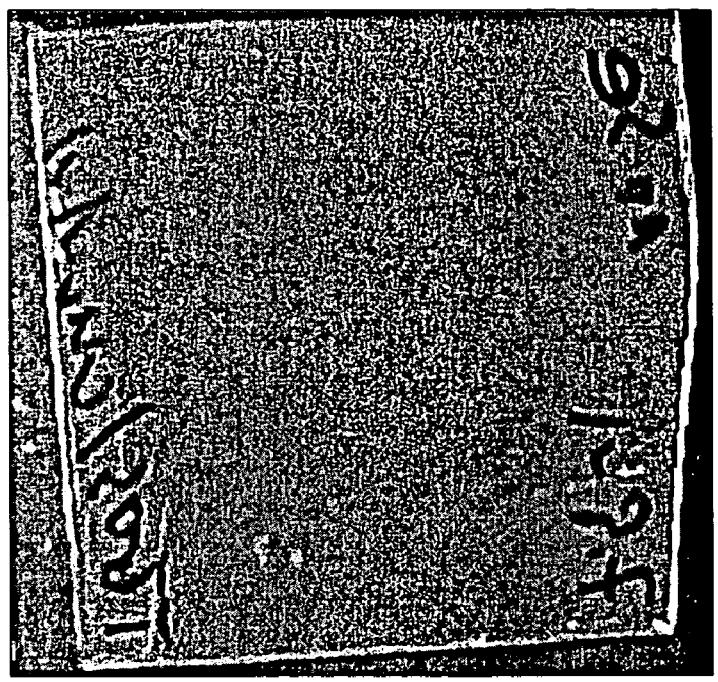
Figure 21F:
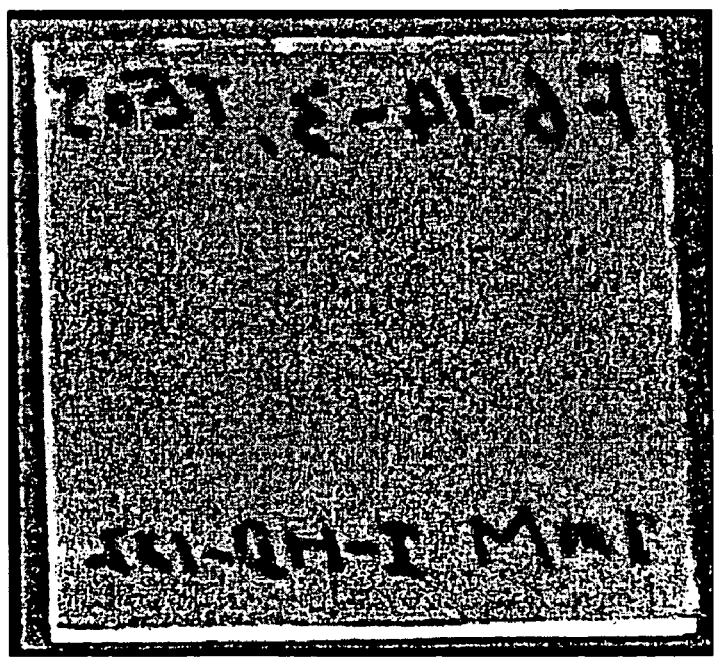

Unretouched photographs of 1-2 μm-thick sol-gel films at 80-ppm loading of dendrimer are shown in FIG. 21A-F. FIG. 21A shows a blank, homogeneous sol-gel film. FIG. 21B shows a hybrid TEOS/enTMOS composite of water-soluble WSSe-6 as a homogeneous film with no phase separation. These films can be compared to FIG. 21C where phase-separation is clearly observed in the TEOS sol-gel with the dichloromethane-soluble dendrimer PhSe-6 and to FIG. 21D where phase separation is observed with the TEOS sol-gel and the water-soluble dendrimer PhSe-6. FIG. 21D shows the negligible effect of soaking the sol-gel film of FIG. 21C in dichloromethane for 1 hour and FIG. 21F shows the negligible effect of soaking the film of FIG. 21E in water for 15 minutes. These data indicate that covalent attachment of the dendrimer may not be a critical design criterion and accessibility of the dendrimer to solution borne reagents (e.g., chloride, bromide, $H_2O_2$) is guaranteed (Baker et al., *J. Sol-Gel Sci. Technol.* 17:71 et al. (2000); Pandey et al., *Chem. Mater.* 12:3547 et al. (2000); Baker et al., *J. Sol-Gel Sci. Technol.* 15:37 et al. (1999); Jordan et al., *Anal. Chim. Acta* 332:83 et al. (1996), which are hereby incorporated by reference in their entirety). Photographs typical of PhSe-6 sequestered in sol-gel films are reproduced in FIGS. 21A-F.

Alternatively, the dendrimer was covalently bound to the sol-gel. The dendrimer wedge PhSe-4 (FIG. 7) has a benzylalcohol terminus, which reacts during the formation of the sol-gel to give covalent attachment of the wedge. Again, no leaching of the covalently bound material and no film desorption was observed using water, dichloromethane, ethanol, or various buffers (pH=2-9) as a solvent.

Example 3

Bleach Generating Coatings: Peroxide Activation with Sol-Gel-Immobilized Dendrimers Nine samples were tested, as set forth in below:

| Blanks | B2 | B3 | B4 |
| Catalyst | X2 | X3 | X4 |
| Catalyst | Y2 | Y3 | Y4 |

The blanks are sol-gel matrices without a dedrimeric derivative of the present invention. B2 is a 45/55 (mol. ratio) n-propyl-trimethoxysilane (pro-TriMOS)/tetramethylorthosilane (TMOS) sol-gel, B3 is a 2/98 (mol. ratio) bis[3-(trimethoxysilyl)propyl]ethylenediamine (enTMOS)/TEOS sol-gel, and B4 is a 77/23 (mol. ratio) pro-TriMOS/TMOS sol-gel. The samples identified as catalyst are coating compositions including one of the above-described sol-gel matrices (X2 and Y2 include B2; X3 and Y3 include B3; X4 and Y4 include B4) and a dendrimeric derivative. The X series of catalysts includes the dendrimeric derivative 9a identified in Example 1. The Y series of catalysts includes the dendrimeric derivative 15a identified in Example 1. The blank samples (B) produce no hypochlorous acid. Dendrimer X and Y vary in the number of catalytic sites per bound molecule (2 for X, 4 for Y).

Methods

Standard leaching and settlement methods were used and these are summarized below. Spore detachment was examined using the automated water jet. Spores were settled on six replicates of each test surface; three were used to determine the spore count before exposure and three to determine the spore count after exposure to the water jet.

Prior to the spore settlement assay, the slides were incubated at approximately 20° C. for 24 hours during which time the sea water was continually stirred. Zoospores were obtained from mature *Enteromorpha* plants by the standard method (Finlay et al., "Adhesion Strength of Settled Spores of the Green Alga *Enteromorpha*," *Biofouling* 18(4):251-256 (2002), which is hereby incorporated by reference in its entirety). Zoospores were settled in individual dishes containing 10 ml of zoospore suspension in the dark at approximately 20° C. After 1 hour, the slides were gently washed in seawater to remove zoospores that had not attached. The slides were then incubated in the light at approximately 20° C. for a further three hours (total of four hours). The density of zoospores attached to the surface was counted on each of three replicate slides using an image analysis system attached to a fluorescent microscope. Spores were visualized by autofluorescence of chlorophyll. Counts were made for 30 fields of view (each 0.064 $mm^2$) on each slide.

Spore motility was used to indicate whether toxic compounds were leaching out of the coatings. At the washing stage (1 hour post addition of spores), the sea water and unsettled spores were poured into 20 ml glass vials and placed in the light. If toxic ingredients had leached out of the coatings, the swimming spores would have lost their ability to swim (spores are negatively phototactic and quickly move to the shaded side of a container) and hence they would have remained in suspension.

Slides settled with zoospores were incubated for a total of 4 hours (as described above) before exposure to the automated water jet, which was run (21 psi regulator pressure) to produce a surface pressure of 56 kPa. An area of 5 $cm^2$ was subjected to the compressive and shear stresses induced by the water jet. Glass standards were included.

The number of spores remaining attached was compared with unexposed control slides (the same as used to determine settlement). The number of cells in 30 fields of view (each 0.064 $mm^2$) were counted on each of 3 replicate slides as described above.

Sporelings were cultured in enriched sea water medium in individual (10 ml) wells in a polystyrene dish under illuminated conditions. The medium was refreshed every three days and the sporelings cultured for eight days. Biomass was estimated at eight days by extraction of chlorophyll α and data are expressed as weight of chlorophyll α/unit area of test surface. A known area of algal biofilm was removed and chlorophyll α extracted in dimethyl sulphoxide (DMSO) kept in the dark. Chlorophyll α concentration was determined spectrophotometrically using the equations of Jeffrey et al., *JPP* 167:191-194 (1975), which is hereby incorporated by reference in its entirety.

Results and Discussion

Figure 22A:
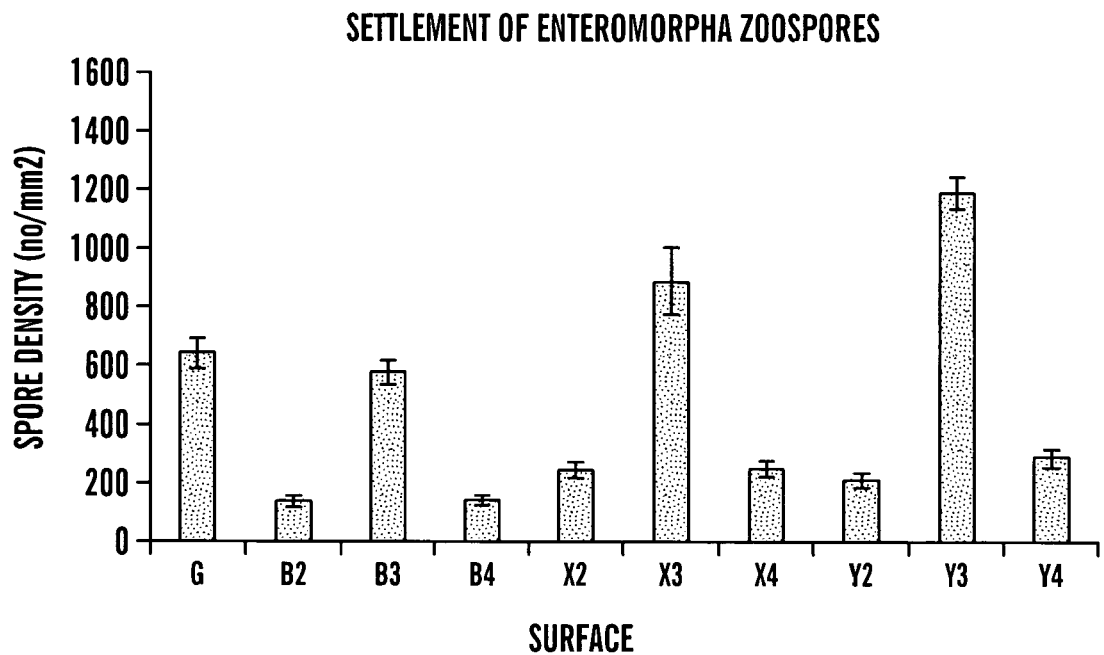
FIG. 22A is a graph showing the settlement of Enteromorpha zoospores on sol-gel films after one hour. Each point is the mean from 90 counts on three replicate slides. Bars show 95% confidence limits.
Figure 22B:
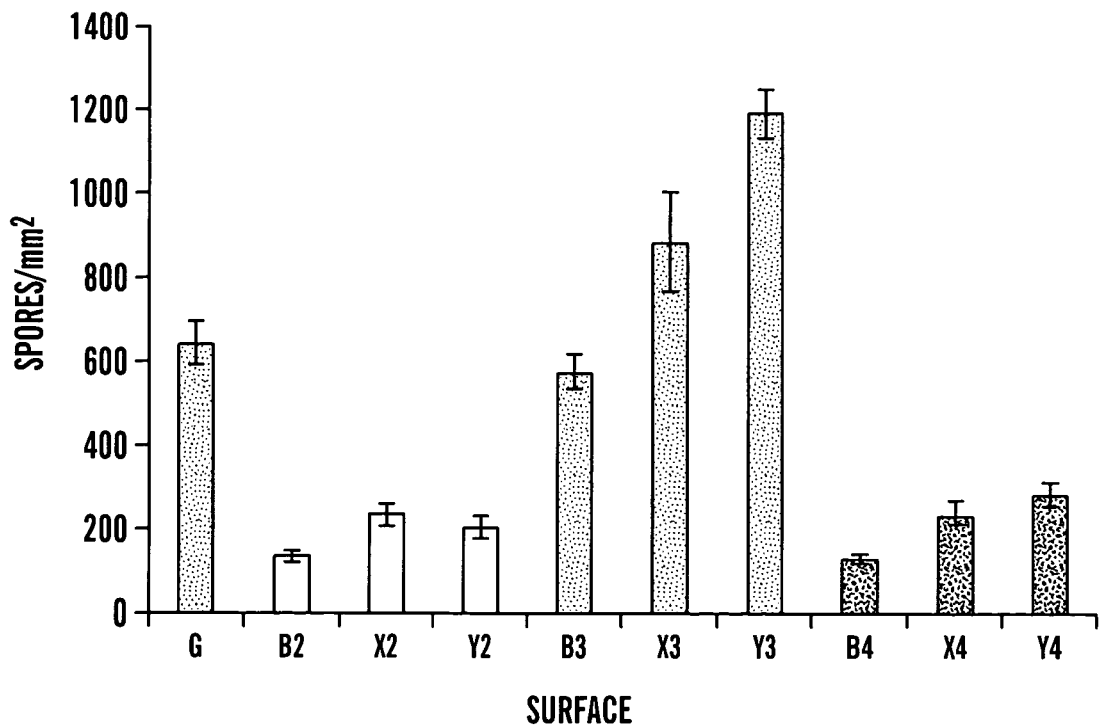
FIG. 22B is the data shown in FIG. 22A plotted so that B/X/Y polymers can be readily compared.

None of the coatings detached or changed visually. Spores settled normally indicating the leachate was not toxic. The settlement of zoospores is shown in FIGS. 22A-B. A clear pattern can be seen, showing that in each subgroup the '3' series samples had higher density of spores settled. Blank B3 had the highest settlement of the blank coatings, X3 of the X catalysts and Y3 of the Y catalysts. All of the other coatings had a lower settlement density than glass (G). One-way analysis of variance showed that the settlement density on B3 was similar to that on glass, but distinct from all others (F 9,890=200.8<0.05). Settlement on X3 and Y3 were significantly different from all other treatments.

The bases B2 and B4 deterred settlement to a higher degree than any of the X or Y series. The high surface porosity of inert sol-gels may have contributed to it.

Contact angles were determined for the samples tested. Measurements were made using static droplets of distilled water (approximately 2 μl). Surfaces were new and unleached. Contact angles represent the mean of three measurements and are shown in Table 2, below.

TABLE 2

Contact angle measurements.

| Surface | Contact Angle | Surface | Contact Angle | Surface | Contact Angle |
|---|---|---|---|---|---|
| B2 | 94 | X2 | 92 | Y2 | 93 |
| B3 | 25 | X3 | 46 | Y3 | 65 |
| B4 | 71 | X4 | 73 | Y4 | 77 |

The contact angles were lower for B3, X3 and Y3 than for the other surfaces. On many surfaces, high settlement is associated with a high contact angle, so in this case the settlement must be determined by some factor other than wettability. Since high settlement was associated with the blank as well as the catalyst containing slides, it is likely to have been caused by some factor in the base itself.

Figure 23:
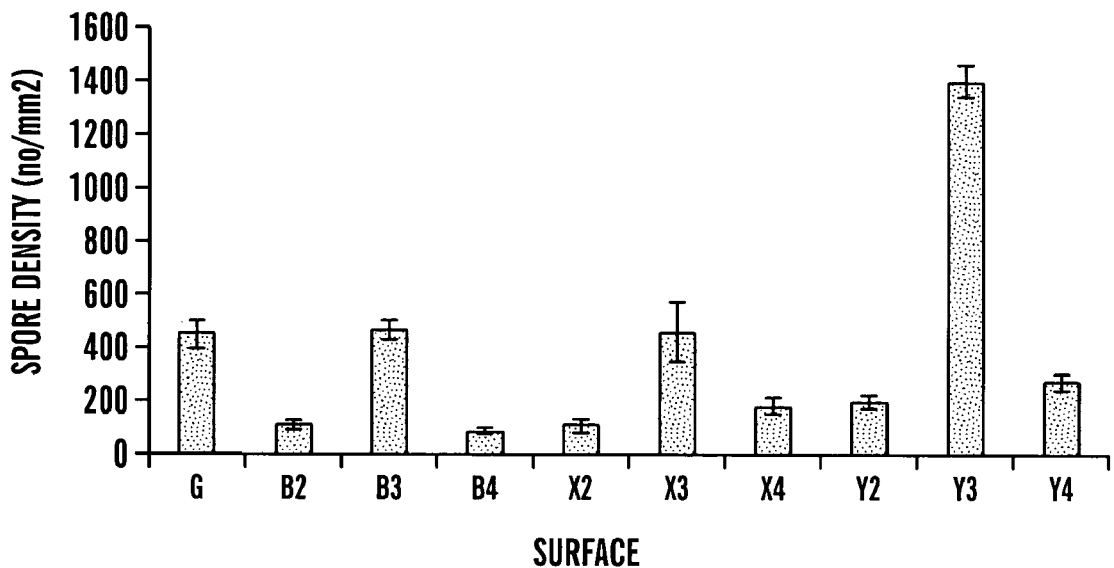
FIG. 23 is a graph showing the density of spores remaining after exposure to surface pressure of 56 kPa. Each point is the mean from 90 observations on three replicate slides. Bars represent 95% confidence limits.

The number of spores remaining after exposure to surface stress of 56 kPa is shown in FIG. 23. The overall pattern was similar to that for settlement with higher spore densities remaining on glass and the series '3' coatings. One-way analysis of variance indicated that spore density retained on Y4 was significantly different from all the others (F 9.890=300.8<0.05). Spore density on glass, B3, and X3 was similar or higher than on the remaining coatings. On these, B2, B4, X2, X4, Y2, and Y4 spore density was approximately equal.

Figure 24A:
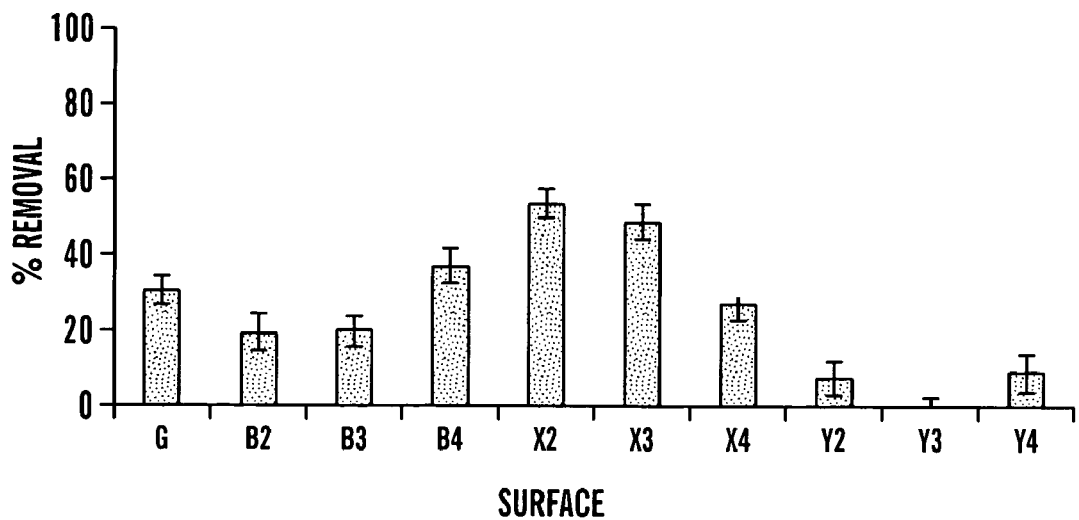
FIG. 24A is a graph showing detachment plotted as % removal. Each point represents the mean percentage removal of zoospores from 90 observations of controls and 90 observations of treatments from three replicate slides. Bars represent 95% confidence limits from arcsine transformed slides.
Figure 24B:
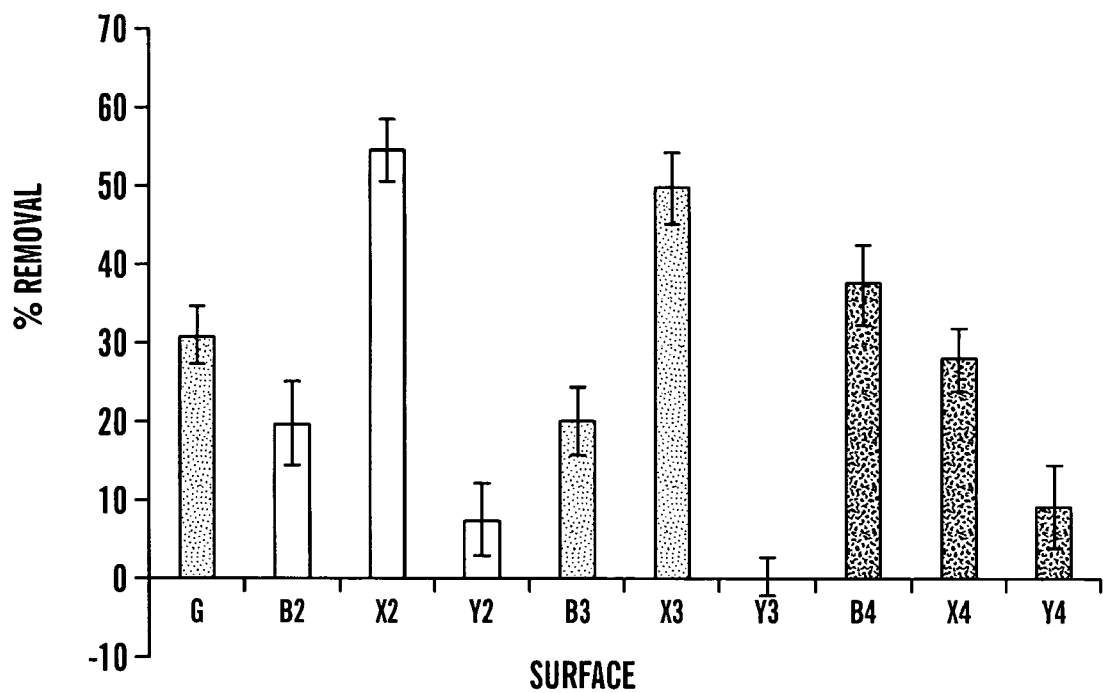
FIG. 24B is the data shown in FIG. 24A plotted so that B/X/Y polymers can be readily compared.

Removal on a percentage basis is shown in FIGS. 24A-B. Removal was highest from the X series. Only these were as effective or better than glass at releasing spores. The Y series performed worse than the base only samples, which themselves were intermediate between the two types of hypochlorous acid generating coatings.

Figure 25:
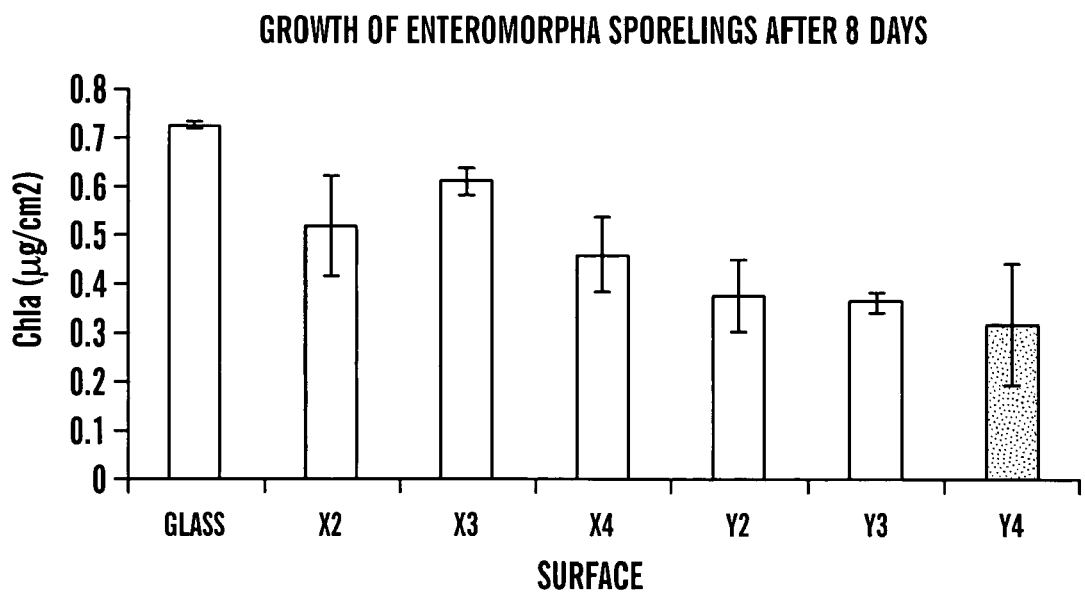
FIG. 25 is a graph showing the growth of sporelings after eight days, measured as chlorophyll α ($\mu g\ cm^{-2}$). Each point represents the mean of three slides with standard errors represented as bars.

The growth of sporelings in terms of chlorophyll α per unit area is shown in FIG. 25. Only six blank slides were used so only the X and Y samples were tested. Growth on the test surfaces was slightly lower than on glass. The trend was for less growth on the Y series and suggests that the Y catalyst series outperformed the X series.

One-way analysis of variance at the 5% level showed there were significant differences within the data set (F 6, 14=3.85). There was no difference between the X and Y sets, however, comparisons with the glass standard showed a significant difference to Y4 and a borderline difference with Y2 and Y3. The X series surfaces were not significantly different to glass.

The Y dendrimer coatings contained more catalytic sites for the production of hypochlorous acid and would therefore be expected to inhibit growth more than the X series. Although the evidence is not statistically strong, it would indicate that the Y coatings are producing toxic materials and reducing the growth of *Enteromorpha*.

Figure 26:
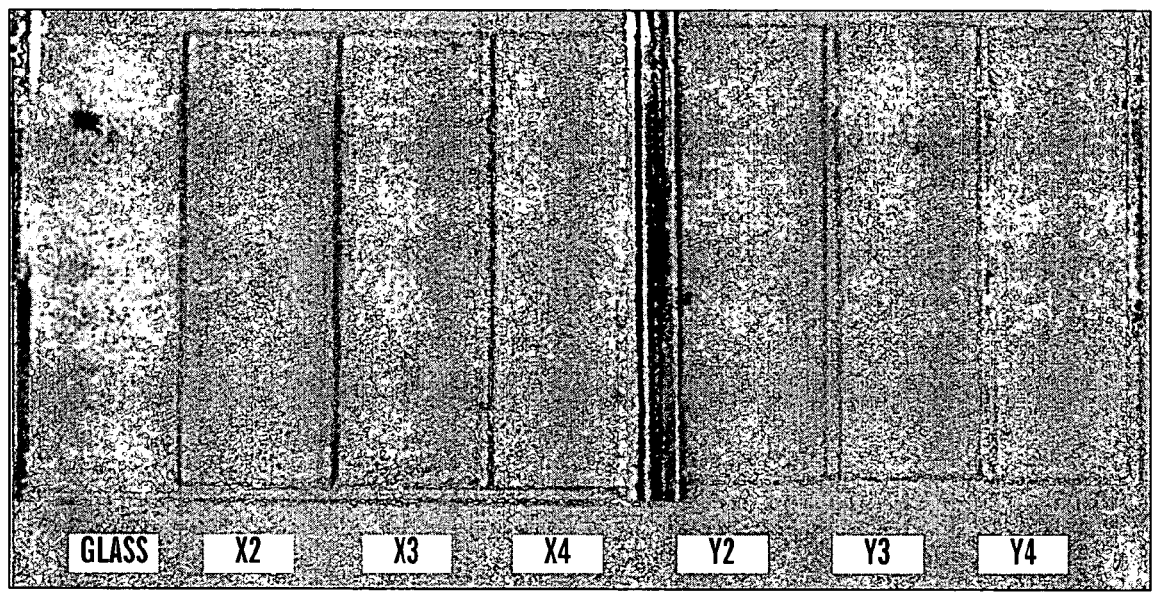
FIG. 26 shows the growth of sporelings on hypochlorous acid generating coatings after eight days. Slides typical of the series are shown. Reduced growth on the Y series and the patchy appearance of the biofilm on the test coatings can be seen.

An image showing typical sporeling growth on the sol-gel films and glass standards is shown in FIG. 26. Growth was more patchy on the sol-gel surfaces. Whether this was due to the direct effects of bleach or the development of different microbial flora cannot be determined.

Thus, in summary, settlement of spores was greater on the '3' series (B3, X3 and Y3) than on the other sol-gel films. Settlement on B2, B4, X2, X4, Y2, and Y4 was significantly less (approximately one third) than on glass. The greatest inhibition of spore settlement was on the blanks B2 and B4. The '3' series coatings all had lower contact angles than their '2' and '4' series counterparts. After exposure to water pressure of 56 kPa, the density of spores was still highest on the '3' series (B3, X3, and Y3) surfaces. Percentage removal data indicated greatest removal from the X series (up to 60% removal) and lowest removal from the Y series. Overall the best performance based on settlement and removal data was shown by X2 and to a lesser extent X4.

The coatings were good and tests indicated that effects on spore settlement were not due to toxicity. The base coatings B2 and B4 significantly inhibited spore attachment compared to glass. The mechanism behind this is of interest and should be explored further.

Spores stick tenaciously to glass, so surfaces worthy of further investigation should offer a significant improvement above glass in terms of percentage removal. X2 and X3 had significantly greater spore removal than glass, but X3 still retained moderately high numbers of spores since a higher number of spores settled on this surface compared to glass (see FIG. 23). In terms settlement and percent removal data, X2 performed best. Surface X2 appears to have dual functionality, the ability to inhibit spore settlement and to reduce adhesion of those spores that do settle. On the other hand, Y2 reduces settlement but appears to enhance the strength of attachment compared to glass. A similar situation was seen for Y2 and Y4; both inhibited spore settlement but attachment was stronger than to glass. The mechanism whereby generation of hydrogen peroxide/hypochlorous acid could decrease strength of spore adhesion to some polymers (X2) but increase the strength of attachment to others (Y series) is unclear.

The sporeling growth data are difficult to interpret since base polymers were not included and different numbers of spores settled. However, the Y series appeared to grow less well than the X series, which may reflect a greater generation of hypochlorous acid. The effect may not be seen if the culture medium was changed more frequently or if the slides were cultured in flowing water.

Example 4

Dendrimer Coatings for Hypochlorous Acid Production: Sol-Gel Base Analysis

The use of dendrimeric polyorgano selenide and telluride catalysts to generate hydrogen peroxide and hypochlorous acid from sea water as antifouling agents was examined in the previous example with some promising results. Subsequently, a study to determine the most suitable sol-gel base to provide a matrix for the dendrimers was carried out. Founded on these data, a series of active coatings was produced and tested as described below.

Seven combinations were examined:

| | |
|---|---|
| B1 | Blank sol-gel coating (45/55 pro-triMOS/TMOS) |
| A2 | B1 with l-CRM-12, 11 mM |
| B2 | B1 with AW 7, 11 mM |
| C2 | B1 with I-KA-53C, 17 mM |
| D2 | B1 with I-KA-63A, 2.5 mM |
| E2 | B1 with I-MDD-88, 150 mM |
| 2E | B1 with l-MDD-88, 300 mM |

As used herein 1-CRM-12 is compound 9a described in Example 1, AW 7 is compound 15a described in Example 1, I-KA-53C is compound 23a identified in Example 1, wherein the —O-phenyl is replaced by an —OH group, I-KA-63A is compound 20a identified in Example 1, and I-MDD-88 is compound 20b identified in Example 1, wherein Se is substituted for Te.

Methods

Standard leaching and settlement methods were used and these are summarized below. Spore detachment was examined using the automated water jet. Spores were settled on six replicates of each test surface; three were used to determine the spore count before exposure and three to determine the spore count after exposure to the water jet. Sporeling growth and detachment in the water channel were also studied.

Prior to the spore settlement assay, the slides were incubated at approximately 20° C. for 24 hours, in continuously stirred distilled water.

Zoospores were obtained from mature *Enteromorpha* plants by the standard method (Finlay et al., "Adhesion Strength of Settled Spores of the Green Alga *Enteromorpha*," *Biofouling* 18(4):251-256 (2002), which is hereby incorporated by reference in its entirety). Zoospores were settled in individual dishes containing 10 ml of zoospore suspension in the dark at approximately 20° C. After 1 hour, the slides were gently washed in seawater to remove zoospores that had not attached. The slides were then incubated in the light at approximately 20° C. for a further three hours (total of four hours). The density of zoospores attached to the surface was counted on each of three replicate slides using an image analysis system attached to a fluorescent microscope. Spores were visualized by autofluorescence of chlorophyll. Counts were made for 30 fields of view (each 0.064 $mm^2$) on each slide.

Spore motility was used to indicate whether toxic compounds were leaching out of the coatings. At the washing stage (one hour post addition of spores), the sea water and unsettled spores were poured into 20 ml glass vials and placed in the light. If toxic ingredients had leached out of the coatings, the swimming spores would have lost their ability to swim (spores are negatively phototactic and quickly move to the shaded side of a container) and hence they would have remained in suspension.

Slides settled with zoospores were incubated for a total of four hours (as described above) before exposure to the automated water jet, which was run (32 psi regulator pressure) to produce a surface pressure of 77 Pa. An area of 5 $cm^2$ was subjected to the compressive and shear stresses induced by the water jet. Glass standards were included.

The number of spores remaining attached was compared with unexposed control slides (the same as used to determine settlement). The number of cells in 30 fields of view (each 0.064 mm$^2$) were counted on each of three replicate slides as described above.

Sporelings were cultured in enriched sea water medium in individual (10 mil) wells in a polystyrene dish under illuminated conditions. The medium was refreshed every two days and the sporelings cultured for ten days.

Biomass was estimated at ten days by extraction of chlorophyll α and data are expressed as weight of chlorophyll α/unit area of test surface. A known area of algal biofilm was removed and chlorophyll α extracted in DMSO kept in the dark. Chlorophyll α concentration was determined spectrophotometrically using the equations of Jeffrey et al., *JPP* 167:191-194 (1975), which is hereby incorporated by reference in its entirety.

Sporelings (ten days old) growing on glass slides were exposed to shear in the water channel. The water channel was run at maximum flow velocity. Glass standards were included. After exposure the biomass remaining was determined by measurement of chlorophyll α as described above.

Results and Discussion

The surfaces were transparent, smooth, and shiny. The coatings were thin and could not be readily seen. None of the coatings detached or changed visually. Spores responded negatively to light indicating the leachate was not acutely toxic.

The settlement of zoospores is shown in FIG. 27. Settlement on glass was approximately twice as dense as on the other dendrimers. This difference was confirmed by analysis of variance (F 7, 712=40.3<0.05). However, the difference was not as great as in previous experiments where the settlement on glass had been up to 5 times greater than on some of the sol-gel bases. This may be accounted for by climatic/seasonal, weather fluctuations and their influence on spore behavior.

Contact angles were determined for the samples tested. Measurements were made using static droplets of distilled water (approximately 2 μl). Surfaces were new and unleached. Contact angles represent the mean of three measurements and are shown in Table 3, below.

TABLE 3

Contact angle measurements.

| Coating | Contact Angle |
| --- | --- |
| A2 | 90° |
| B2 | 93° |
| C2 | 92° |
| D2 | 93° |
| E2 | 94° |
| B1 | 95° |
| 2E | 89° |

The number of spores remaining after exposure to water pressure of 77 kPa is shown in FIG. 28. One-way analysis of variance indicated that spore density was significantly greater on glass than on the other coatings (F 7, 712=34.8<005). There were few differences in the number of spores remaining on the other coatings.

Figure 29:
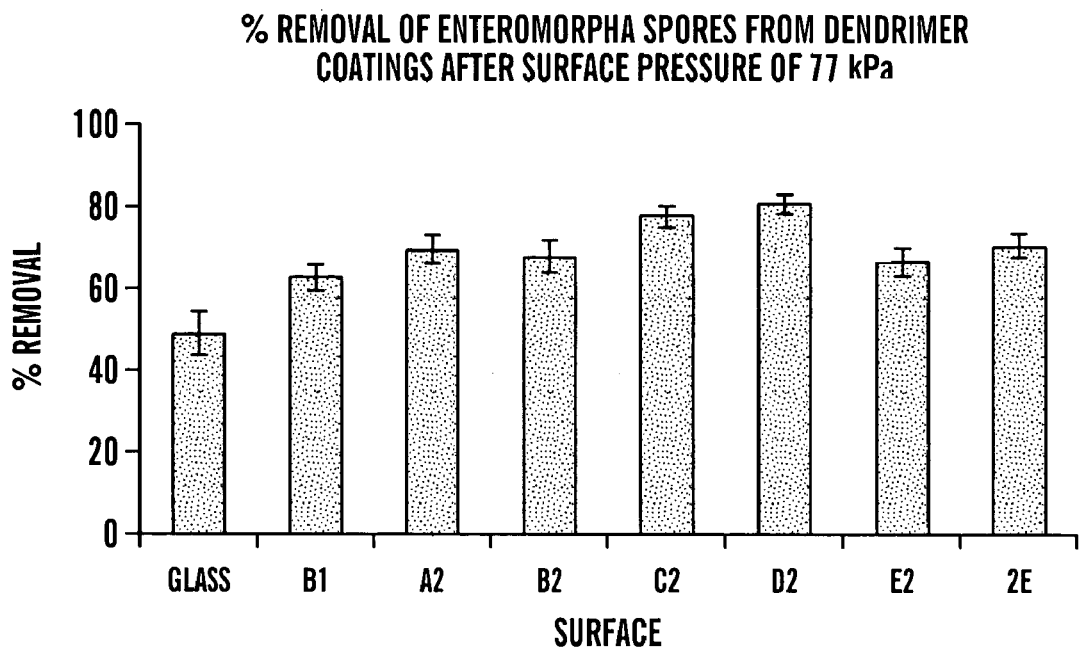
FIG. 29 is a graph showing detachment plotted as percent removal. Each point represents the mean percentage removal of zoospores from 90 observations of controls and 90 observations of treatments from three replicate slides. Bars represent 95% confidence limits from arcsine transformed slides.

Removal on a percentage basis is shown in FIG. 29. Percentage removal was greater from all of the experimental surfaces compared to glass. Removal was slightly higher from some of the dendrimer combinations (e.g., C2 and D2 with 77 and 80% removal respectively) than from the sol-gel base on its own (B1 with 62% removal). Variation in the concentration of 1-MDD-88 in the E series did not appear to make a difference to removal.

Figure 30:
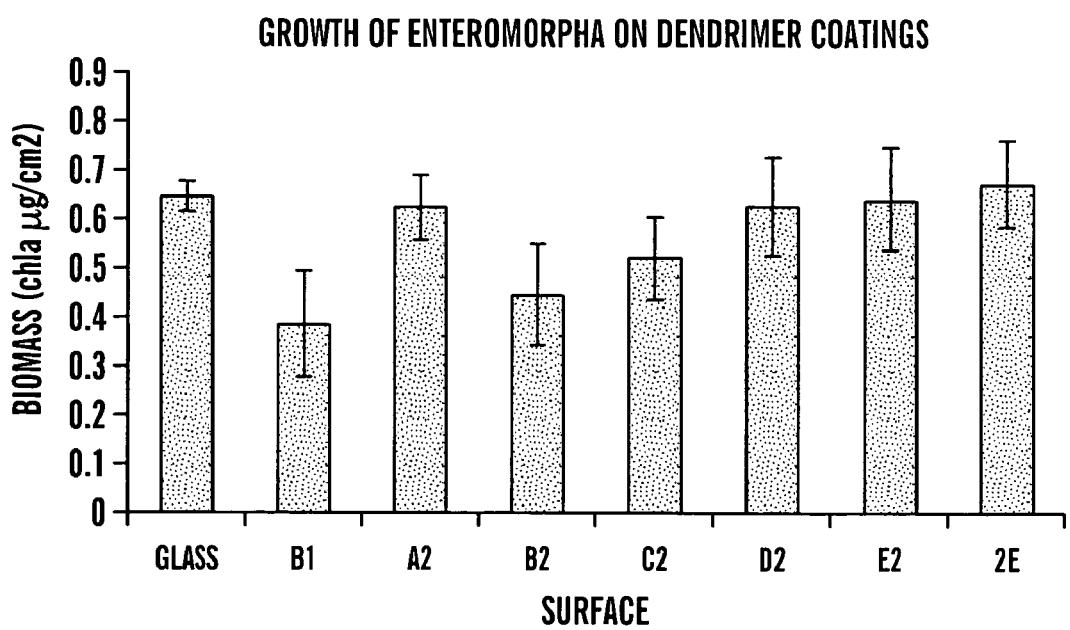
FIG. 30 is a graph showing the growth of sporelings after ten days, measured as chlorophyll α ($\mu g\ cm^{-2}$). Each point represents the mean of three slides with standard errors represented as bars.

The growth of sporelings in terms of chlorophyll α per unit area is shown in FIG. 30. One-way analysis of variance at the 5% level showed there were no significant differences within the data set (F 7, 24=1.4 P<0.05). No signs of acute toxicity were visible.

Figure 31:
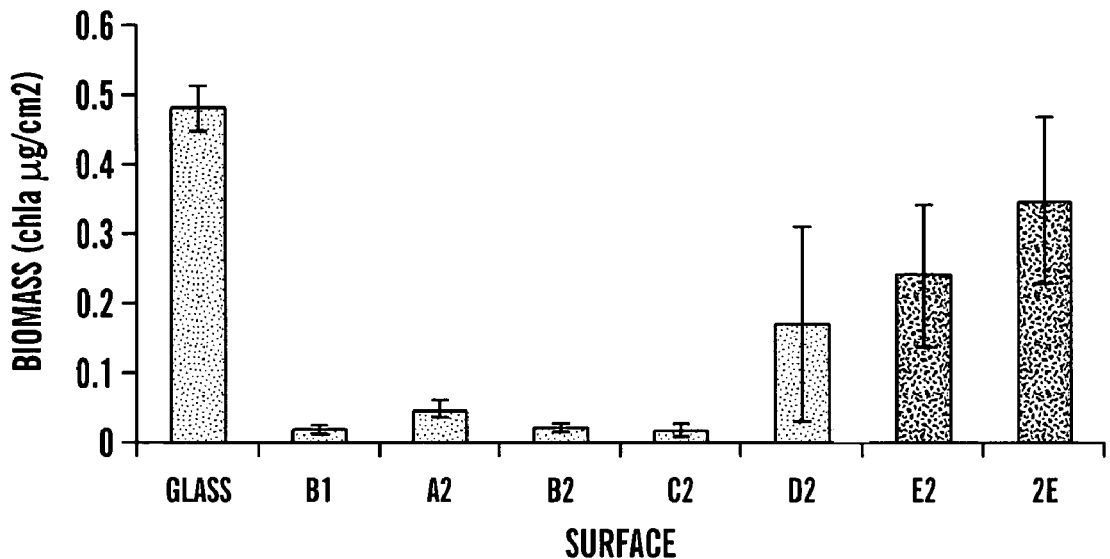
FIG. 31 is a graph showing the amount of biomass remaining after sporelings were subjected to 55 Pa shear stress (measured as chlorophyll α ($\mu g\ cm^{-2}$)). Each point represents the mean of three slides with standard errors represented as bars.

The detachment of sporelings in terms of chlorophyll α per unit area remaining is shown in FIG. 31. One-way analysis of variance at the 5% level showed there were significant differences within the data set (F 7, 24=2.4 P<0.05). A tukey test showed that the data set could be split into two halves. The first with D2, E2, and 2E being similar to glass and retaining a sporeling biofilm. The second with almost complete removal of the biofilm comprising A2, B2, C2 and B1. Surface wettability was similar on all coatings and therefore could not account for this result.

Figure 32:
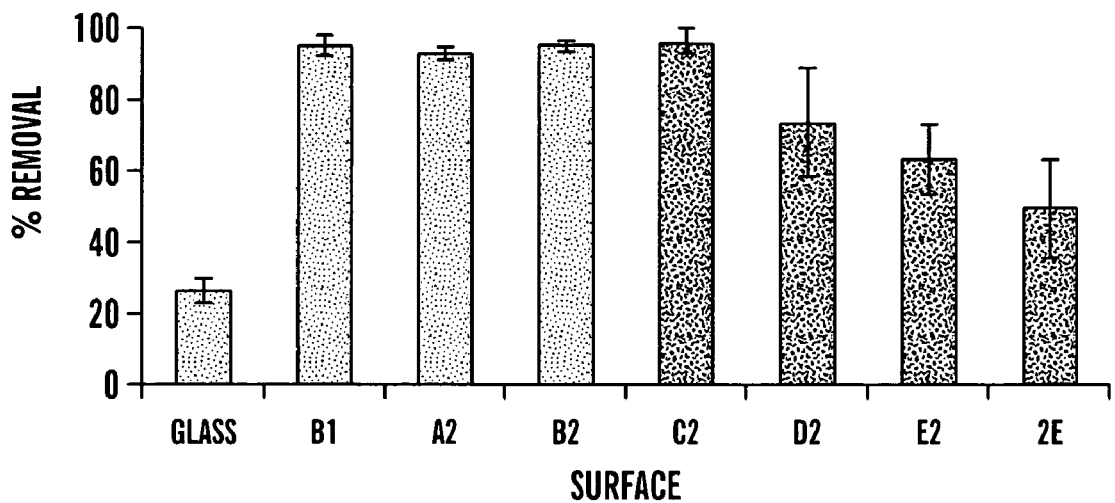
FIG. 32 is a graph showing detachment plotted as percent removal. Each point represents the mean percentage reduction of biomass from three replicate slides. Bars represent standard errors from arcsine transformed data.

The conversion of data into percent removal (FIG. 32) confirms the effectiveness of A2, B2, C2, and B1. In the previous example, the B1 and B2 sol-gel bases showed the greatest detachment of sporelings. In this example, the B1 sol-gel base was again showing impressive foul-release properties.

The lack of activity from D2, E2, and 2E indicates that the bleach generation process was not functioning, in these coatings. Presumably the concentration of I-KA-63A in D, at 2.5 mM, was too low to be effective, since in C2 at a concentration of 17 mM the detachment was much better. The IMDD-88 system of E2 and 2E did not seem to function as well as the others.

Thus, the coatings were of good quality. Settlement of spores was similar to previous studies (lower on sol-gels than on glass). Strength of attachment of spores was stronger on glass than on the dendrimers. Spore removal was greatest from C2 and D2. There was no sign of acute toxicity from the coatings. Sporelings (10 days old) grew to a similar extent on all coatings and glass. Sporeling detachment was greatest from A2, B2, C2 and B1. The sporeling data indicated no acute toxicity even after ten days, indicating that peroxide generation is too low to be effective. Overall, coating C2 was the most effective both in terms of removal of spores and sporelings.

Example 5

Sol-Gel Bases for Use with Bleach Generating Catalysts

Example 2 showed the base coatings B2 and B4 to significantly inhibit spore attachment compared to glass. These were both hydrophobic and possessed alkyl groups that projected from the surface. In contrast B3 which performed less well was more polar with amine residues.

To identify the most suitable sol-gel to use with the catalysts, six candidate coatings were examined:

| | |
| --- | --- |
| B1 | 50/50 TMOS/pro-triMOS |
| B2 | 20/80 TMOS/pro-triMOS |
| B3 | 50/50 TEOS (tetraethylorthosilane/APTES (aminopropyl-triethoxysilane) |
| B4 | 50/50 TEOS/enTMOS (bis[3-(trimethoxysilyl)propyl]ethylenediamine) |
| B5 | 90% (80/20 TMOS/pro-triMOS)/10% enTMOS |
| B6 | 50/50 TMOS/n-octyl-triethoxysilane |

Methods

Standard leaching and settlement methods were used and these are summarized below. Spore detachment was examined using the automated water jet. Spores were settled on six replicates of each test surface; three were used to determine the spore count before exposure and three to determine the spore count after exposure to the water jet. In addition, the experiment was repeated using the water channel to provide detachment, and results from this are given below. Sporeling growth and detachment in the water channel were also studied.

Prior to the spore settlement assay, the slides were incubated at approximately 20° C. for 24 hours in continuously stirred sea water.

Zoospores were obtained from mature *Enteromorpha* plants by the standard method (Finlay et al., "Adhesion Strength of Settled Spores of the Green Alga *Enteromorpha*," Biofouling 18(4):251-256 (2002), which is hereby incorporated by reference in its entirety). Zoospores were settled in individual dishes containing 10 ml of zoospore suspension in the dark at approximately 20° C. After one hour the slides were gently washed in seawater to remove zoospores that had not attached. The slides were then incubated in the light at approximately 20° C. for a further three hours (total of four hours). The density of zoospores attached to the surface was counted on each of three replicate slides using an image analysis system attached to a fluorescent microscope. Spores were visualized by autofluorescence of chlorophyll. Counts were made for 30 fields of view (each 0.064 mm$^2$) on each slide. Data obtained with the water channel were settled for one hour only.

Spore motility was used to indicate whether toxic compounds were leaching out of the coatings. At the washing stage (one hour post addition of spores), the sea water and unsettled spores were poured into 20 ml glass vials and placed in the light. If toxic ingredients had leached out of the coatings, the swimming spores would have lost their ability to swim (spores are negatively phototactic and quickly move to the shaded side of a container) and hence they would have remained in suspension.

Slides settled with zoospores were incubated for a total of four hours (as described above) before exposure to the automated water jet, which was run (35 psi regulator pressure) to produce a surface pressure of 83 kPa. An area of 5 cm$^2$ was subjected to the compressive and shear stresses induced by the water jet. Glass standards were included.

The number of spores remaining attached was compared with unexposed control slides (the same as used to determine settlement). The number of cells in 30 fields of view (each 0.064 mm$^2$) were counted on each of three replicate slides as described above.

Sporelings were cultured in enriched sea water medium in individual (10 ml) wells in a polystyrene dish under illuminated conditions. The medium was refreshed every three days and the sporelings cultured for ten days.

Biomass was estimated at ten days by extraction of chlorophyll α and data are expressed as weight of chlorophyll α/unit area of test surface. A known area of algal biofilm was removed and chlorophyll α extracted in DMSO kept in the dark. Chlorophyll α concentration was determined spectrophotometrically using the equations of Jeffrey et al., *JPP* 167:191-194 (1975), which is hereby incorporated by reference in its entirety.

Sporelings (10 days old) growing on glass slides were exposed to shear in a specially designed water channel. The water channel was run at maximum flow velocity. Glass standards were included. After exposure the biomass remaining was determined by measurement of chlorophyll α as described above.

Results and Discussion

The surfaces were transparent, smooth, and shiny. The coatings were extremely thin and could not be readily seen. None of the coatings detached or changed visually. Spores settled normally indicating the leachate was not toxic.

Figure 33:
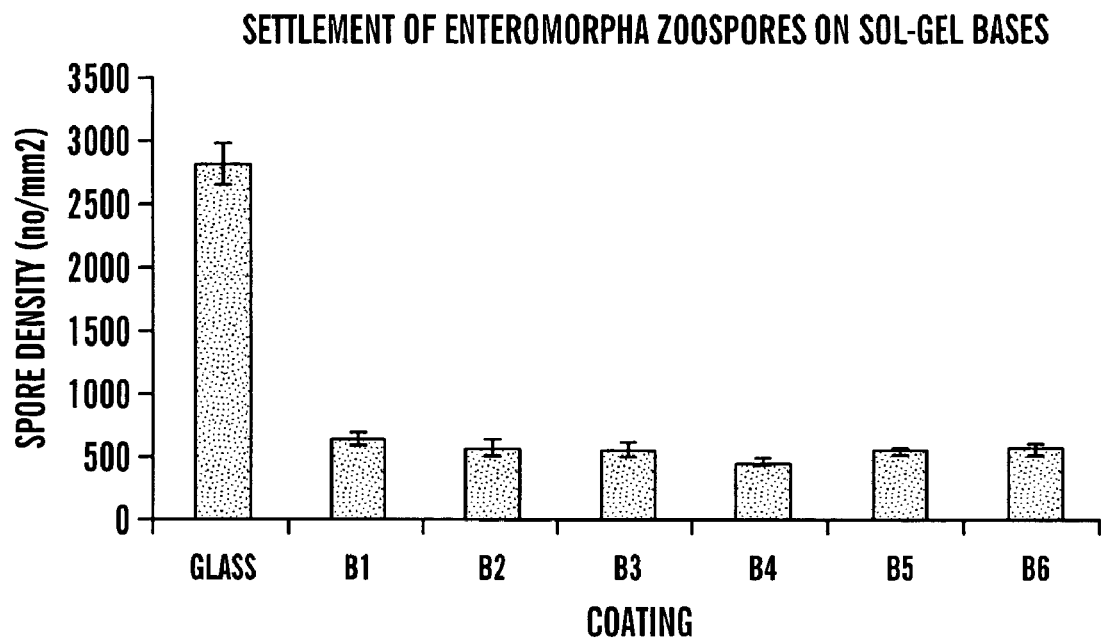
FIG. 33 is a graph showing the settlement of Enteromorpha zoospores on sol-gel coatings after four hours. Each point is the mean from 90 counts on three replicate slides. Bars show 95% confidence limits.

The settlement of zoospores is shown in FIG. 33. Settlement on glass was approximately five times that on the sol-gel coatings. This is in agreement with the previous study in which two of the sol-gel bases also had very low settlement. One-way analysis of variance showed that the settlement on glass was significantly different to all the others (F 6,623=453<0.05). Settlement on the sol-gel coatings was only different between B1 and B4.

Figure 34:
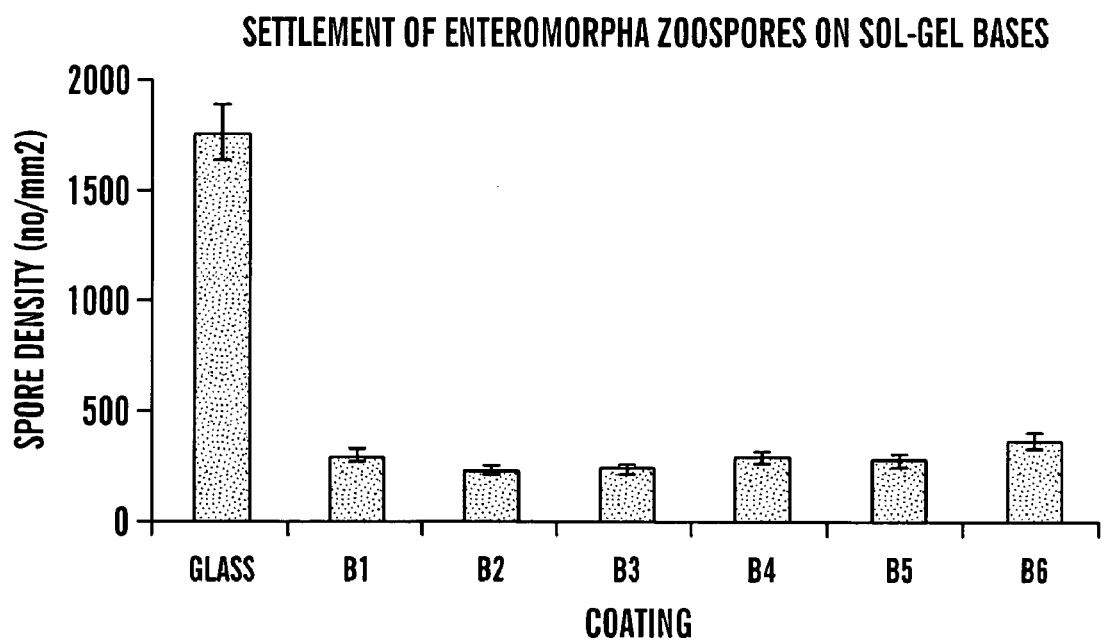
FIG. 34 is a graph sowing the settlement of Enteromorpha zoospores on sol-gel coatings after one hour. Each point is the mean from 90 counts on three replicate slides. Bars show 95% confidence limits.

A second spore settlement was carried out for the water channel. The distribution of spores was very similar and can be seen in FIG. 34. This further confirms the anti-settlement properties of all the sol-gel coatings.

Contact angles were determined for the samples tested. Measurements were made using static droplets of distilled water (approximately 2 μl). Surfaces were new and unleached. Contact angles represent the mean of three measurements and are shown in Table 4, below.

TABLE 4

Contact angle measurements.

| Coating | Contact Angle |
|---------|---------------|
| B1 | 93° |
| B2 | 93° |
| B3 | 60° |
| B4 | 46° |
| B5 | 85° |
| B6 | 105° |

The number of spores remaining after exposure to water pressure of 83 kPa is shown in FIG. 35. One-way analysis of variance indicated that spore density retained on glass was significantly different from all the others (F 6,630=540<0.05). The only other significant difference was between B1 and B3 coatings.

Removal on a percentage basis is shown in FIG. 36. Approximately 50% of spores were removed from glass and approximately 60-75% were removed from the sol-gel surfaces. However, the number of attached spores on the sol-gels was very low, especially after exposure to the water jet. Hence, no firm conclusions can be drawn regarding the relative efficacy of spore detachment from the sol-gel polymers. Overall, it is interesting to note that despite the large difference in settlement density between glass and the sol-gels, the extent of spore removal was similar.

Figure 37:
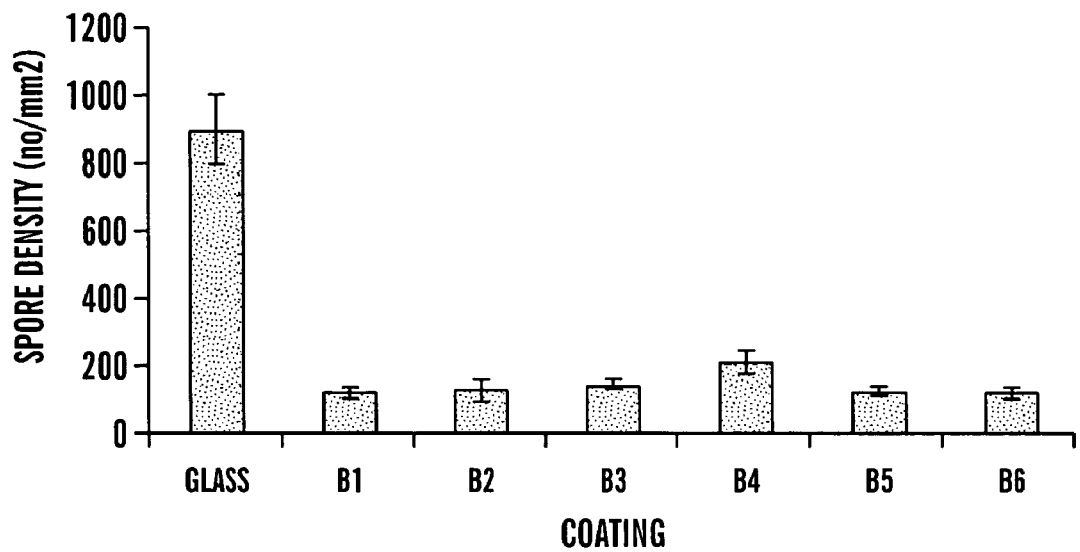
FIG. 37 is a graph showing the density of spores remaining after exposure to shear stress of 55 Pa. Each point is the mean from 90 observations on three replicate slides. Bars represent 95% confidence limits.
Figure 38:
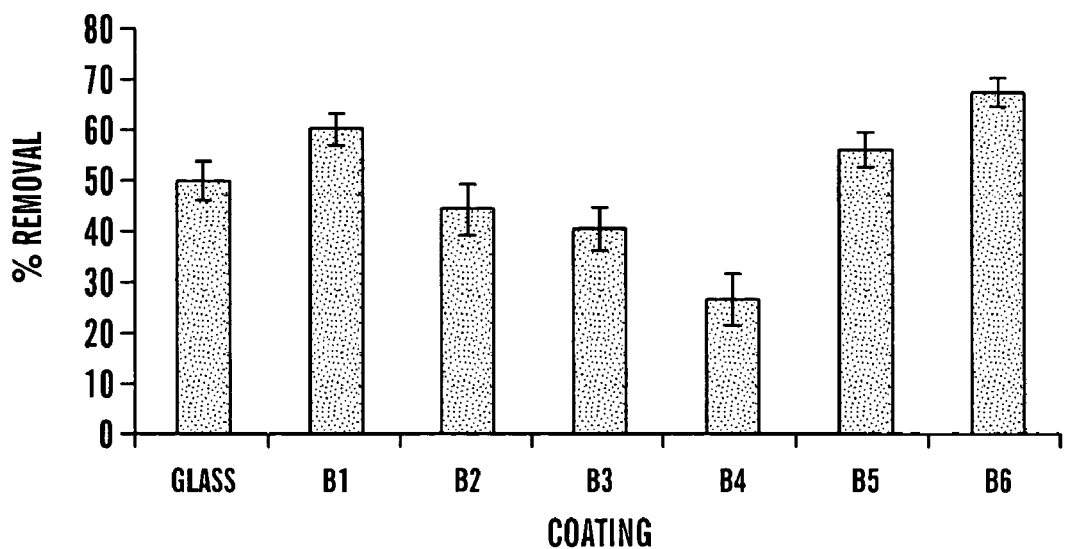
FIG. 38 is a graph showing detachment plotted as percent removal. Each point represents the mean percentage removal of zoospores from 90 observations of controls and 90 observations of treatments from three replicate slides. Bars represent 95% confidence limits from arcsine transformed data.

The water channel produces well characterized shear forces similar to those experienced on the hull of a ship. By comparison, the water jet described above, delivers a large component of compressive as well as shear forces from a stream of water in a less easily characterized fashion. Both methods provide information pertinent to strength of attachment and are frequently complementary. For most surfaces, the water channel is only useful for spores that have been settled for a short time (e.g., one hour). Spores settled longer than one hour are so strongly attached that few are removed in the water channel, hence it is more appropriate to use the water jet. A second experiment using the water channel on one hour settled spores was carried out and the results shown here. Slides settled with zoospores were exposed to shear in a specially designed water channel. The water channel was run at maximum flow velocity. Glass standards were included. The number of spores remaining attached was counted before and after exposure to shear stress. The number of cells in 30 fields of view (each 0.064 mm$^2$) were counted on each slide using image analysis as described above. Both settlement and detachment data from this experiment are in close agreement with those described above (see FIGS. 34, 37, and 38). The two sets show the same response. In particular, again approximately 50% of spores were removed from all surfaces confirming the conclusions from water jet data described above.

Figure 39:
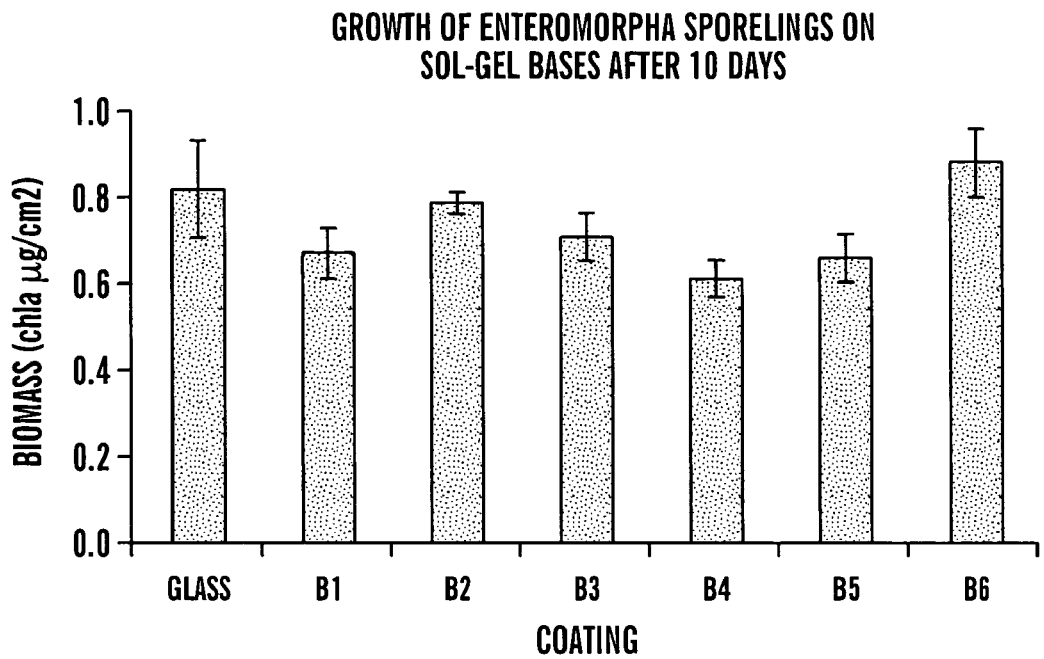
FIG. 39 is a graph showing the growth of sporelings after ten days, measured as chlorophyll α (μg cm$^{-2}$). Each point represents the mean of three slides with standard errors represented as bars.

The growth of sporelings in terms of chlorophyll α per unit area is shown in FIG. 39. One-way analysis of variance at the 5% level showed there were no significant differences within the data set (F 6,14=2.13 P<0.05). Although the settlement of spores was much greater on glass than on the sol-gels it did not affect the final biomass achieved after ten days of growth. It is well established that greater growth is exhibited by low density sporelings, thereby evening out differences in original settlement density.

All sporeling biofilms appeared healthy, strongly suggesting that there were no toxic compounds leaching from the coatings.

Figure 40:
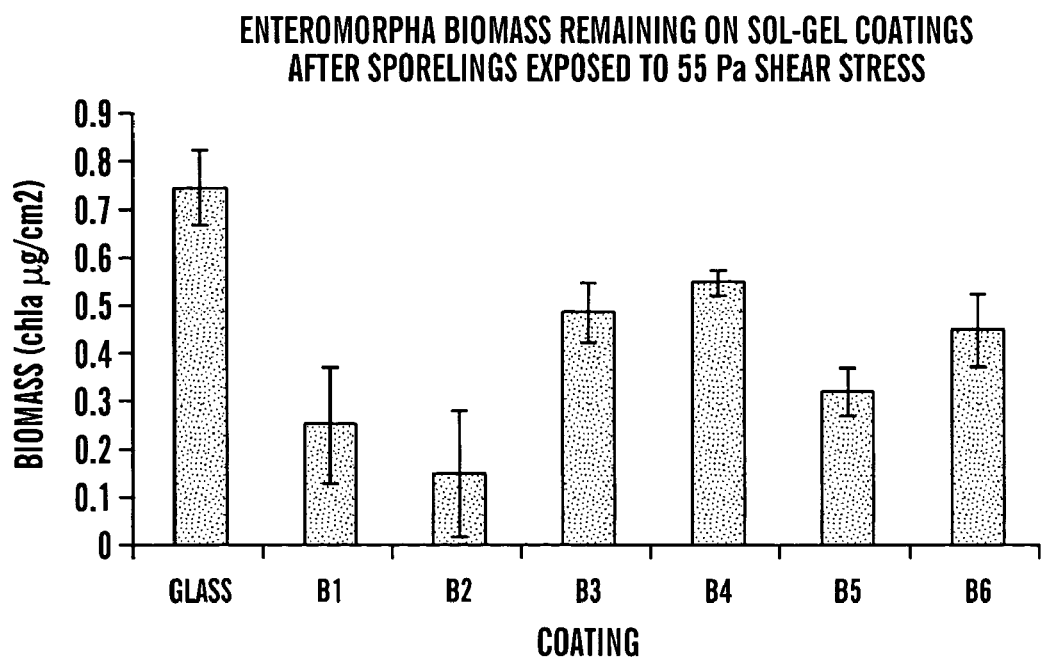
FIG. 40 is a graph showing the amount of biomass remaining after sporelings were subjected to 55 Pa shear stress (measured as chlorophyll α (μg cm$^{-2}$)). Each point represents the mean of three slides with standard errors represented as bars.

The detachment of sporelings in terms of chlorophyll α per unit area is shown in FIG. 40. One-way analysis of variance at the 5% level showed there were significant differences within the data set (F 6,14=5.3 P<0.05). A tukey test revealed that these differences lay between glass and B1, B2, and B5. The other three treatments were similar to glass.

Figure 41:
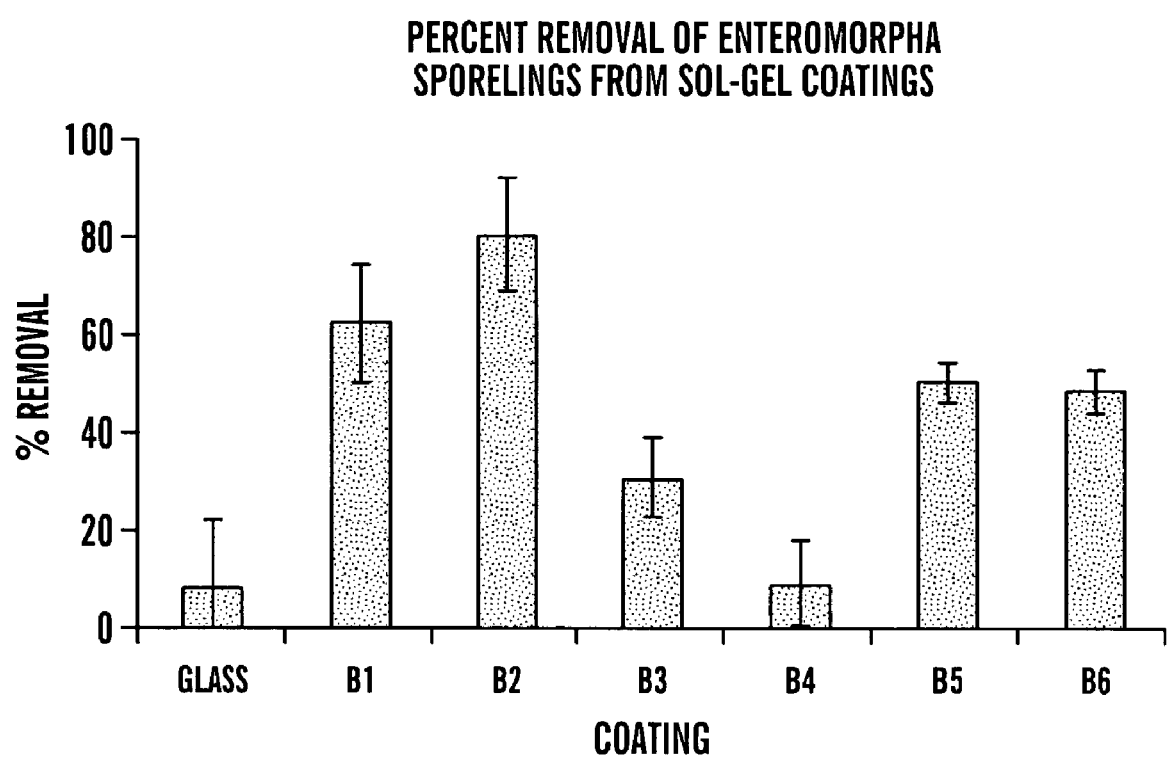
FIG. 41 is a graph showing detachment plotted as percent removal. Each point represents the mean percentage reduction of biomass from three replicate slides. Bars represent standard errors from arcsine transformed data.

Coatings B1 and B2 are TMOS/n-pro-triMOS mixtures with contact angles (see Table 4) of 93°. Coating B5 is mixture of TMOS/n-pro-triMOS/enTMOS with a contact angle of 85°. When percent removal is considered (FIG. 41) the greater loss of biomass from the B1 and B2 coatings is highlighted. It is interesting that the lowest removal was from B3 and B4 which were the most hydrophilic coatings (60° and 46°).

Sporelings tend to detach from surfaces in patches rather than as individual plants. Consequently removal is often an all or nothing event that increases the deviation between replicates, hence as removal increases so to do the error bars.

The conversion of data into percent removal shows that removal from B1 and B2 was in excess of that from other treatments. By comparison removal from glass was negligible.

Thus, the coatings were of good quality. Compared to glass, the settlement of spores was greatly reduced on the sol-gel coatings. Strength of attachment of spores was approximately the same on sol-gels and glass. There was no sign of toxicity from the coatings. Sporeling (10 day old) removal was greatest from B1 and B2. Sol-gel coatings B1 and B2 demonstrated the best 'foul-release' properties.

Example 6

Sol-Gel Bases Containing Enzymes and Catalysts

Hypochlorous acid generating catalysts have been embedded in sol-gel matrices as potential antifouling coatings, as described above. In the previous examples, the catalysts have been selenide and telluride derived. In this example, a vanadium bromoperoxidase (VBRPO) enzyme and VBRPO mimics have been incorporated. Organo-halogenides, which have a more rapid rate of oxidation than the previously used Se and Te catalysts, can mimic the halo-peroxidases. The hypochlorous acid is produced from hydrogen peroxide which is found naturally in sea water (up to 0.2 μM from effect of light on organic matter) and is also generated as a bi-product of phytosynthetic biochemical processes by *Ulva* plants (and presumably spores):

Br$^-$+H$_2$O$_2$→catalyst→HOBr.

To maximize the likelihood of the catalysts functioning well, hydrogen peroxide was added to the test systems to produce solutions of 20 μM. In separate studies, hydrogen peroxide showed no toxicity at this concentration to *Ulva* spores.

Vanadium bromoperoxidase enzyme is produced naturally by many seaweeds such as *Ascophyllum* spp., *Corallina* spp. *Macrocystis* spp. and *Fucus* spp. The enzyme catalyzes the formation of dioxygen or, if present, the bromation of organic substrates. Some of these, such as bromocyclic polyenes and bromocyclic ethers, are used in plant defenses to reduce microbial colonization or grazing by fish. The enzyme has also been shown to catalyze the formation of the adhesive produced by zygotes of the *Fucus distichus*.

Five active sol-gels containing catalysts and enzyme and 4 control sol-gels were tested, as shown in Table 5.

TABLE 5

Coatings tested.

| Active Sol-gels (+Catalyst) | Control Sol-gels |
|---|---|
| Enzyme (En) | B1H3 standard coating with propylsilyl groups |
| Te1 | B1H3 |
| Te2 | B2H3 polar and hydrophilic coating with ethylene diamine residues |
| Te3 | B3H2 standard coating with octylsilyl groups |
| Te4 | B4 fluorinated alkyl and propyl group terminated with a trifluoromethyl group |

Enzyme (En) = 2.7 units VBRPO/ml of sol-gel;
Te1–Te4 = 15 mM dendrimer (compound 9c of Example 1) in sol-gel solution;
B1H3 = 44/55 (mol. ratio) pro-TriMOS/TMOS;
B2H3 = 2/98 (mol. ratio) enTMOS/TEOS;
B3H2 = TMOS/n-octyl-triethyoxysilane;
B4 = trifluoropropyl TMOS/TMOS The degree of coating porosity was determined by the time of hydration during preparation. Pore size increases with hydrolysis time (although dimensions of pores are unknown). Contact angles were also determined for the coatings tested. Measurements were made using static droplets of distilled water (approximately 2 μl). Surfaces were new and unleached. Contact angles represent the mean of three measurements and are shown in Table 6.

TABLE 6

Contact angle measurements for sol-gel coatings.

| Coating | Contact Angle |
|---|---|
| En | 22° |
| Te1 | 92° |
| Te2 | 64° |
| Te3 | 102° |
| Te4 | 79° |
| B1H3 | 93° |
| B2H3 | 26° |

TABLE 6-continued

Contact angle measurements for sol-gel coatings.

| Coating | Contact Angle |
|---------|---------------|
| B3H2    | 105°          |
| B4      | 90°           |

In using these enzymes/mimics, it was hypothesized that the hypochlorous acid would be produced in quantities large enough to cause disruption and damage to cells or adhesion and in so doing prevent or delay settlement of the spores.

Methods—Leaching and Settlement

Standard leaching and settlement methods were used, as described above. Hydrogen peroxide was added to make final concentration of 20 µM. Spore detachment was examined using the automated water jet. Spores were settled on six replicates of each test surface; three were used to determine the spore count before exposure and three to determine the spore count after exposure to the water jet. Spores were settled for one hour, washed, and incubated for a further three hours (called four hour spores forthwith) before fixing or exposing to the water jet.

Results and Discussion—Leaching and Settlement

The surfaces were transparent, smooth, and shiny. The coatings were thin and could not be readily seen. None of the coatings detached or changed visually. Spores responded negatively to light indicating the leachates were not acutely toxic.

Figure 42:
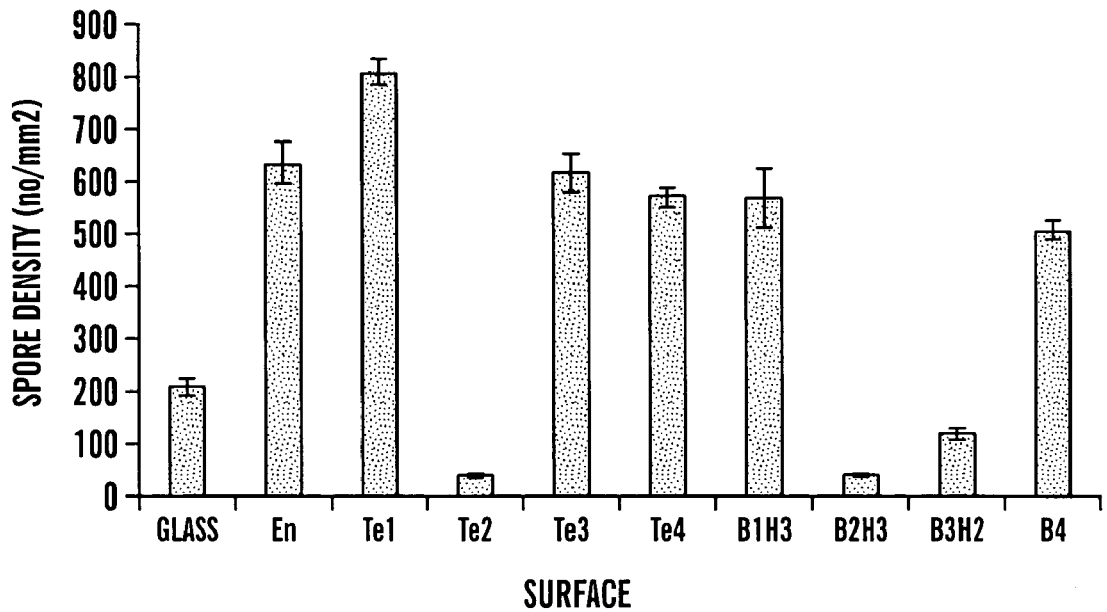
FIG. 42 is a graph showing the settlement of *Ulva* zoospores on sol-gel coatings. En=enzyme. Each point is the mean from 90 counts on three replicate slides. Bars show 95% confidence limits.

With the exception of coating Te2, settlement on all the active sol-gels was greater than on glass (FIG. 42). However, the control slide for Te2, namely B2H3, also had a low settlement in both this and the previous experiment. The low settlement may not, therefore, be due to the catalyst, but due to the high wettability of the sol-gel matrix. The incorporation of the catalyst had however caused the water contact angle to rise (see above). In this experiment, settlement was also lower than on glass on the B3H2 control. Settlement on the B1H3 and B4 surfaces was greater than on glass (this is in contrast to the previous experiment).

Figure 43:
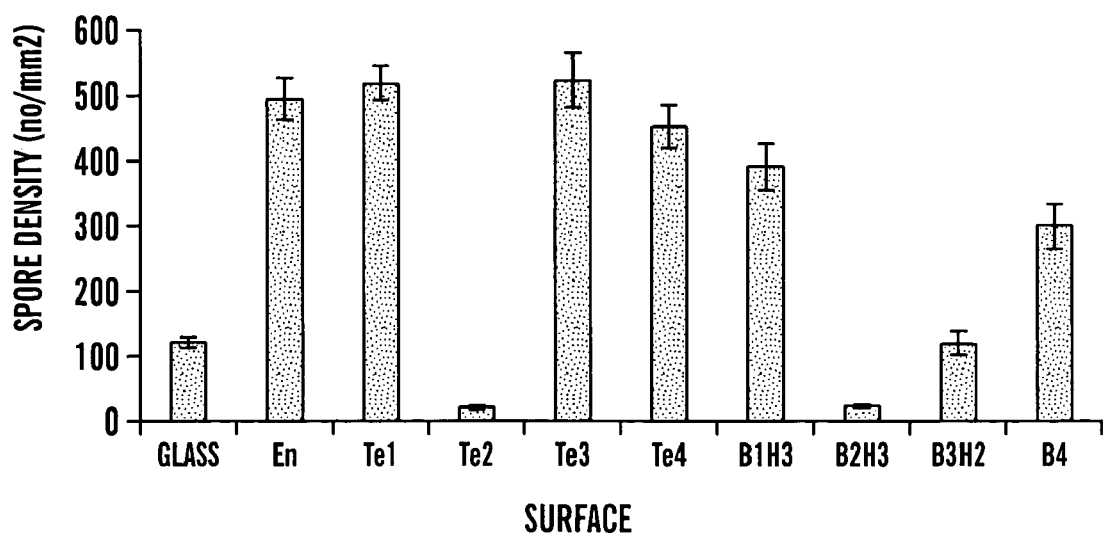
FIG. 43 is a graph showing the density of spores remaining after exposure to water jet surface pressure of 64 kPa. Each point is the mean from 90 observations on three replicate slides. Bars represent 95% confidence limits.
Figure 44:
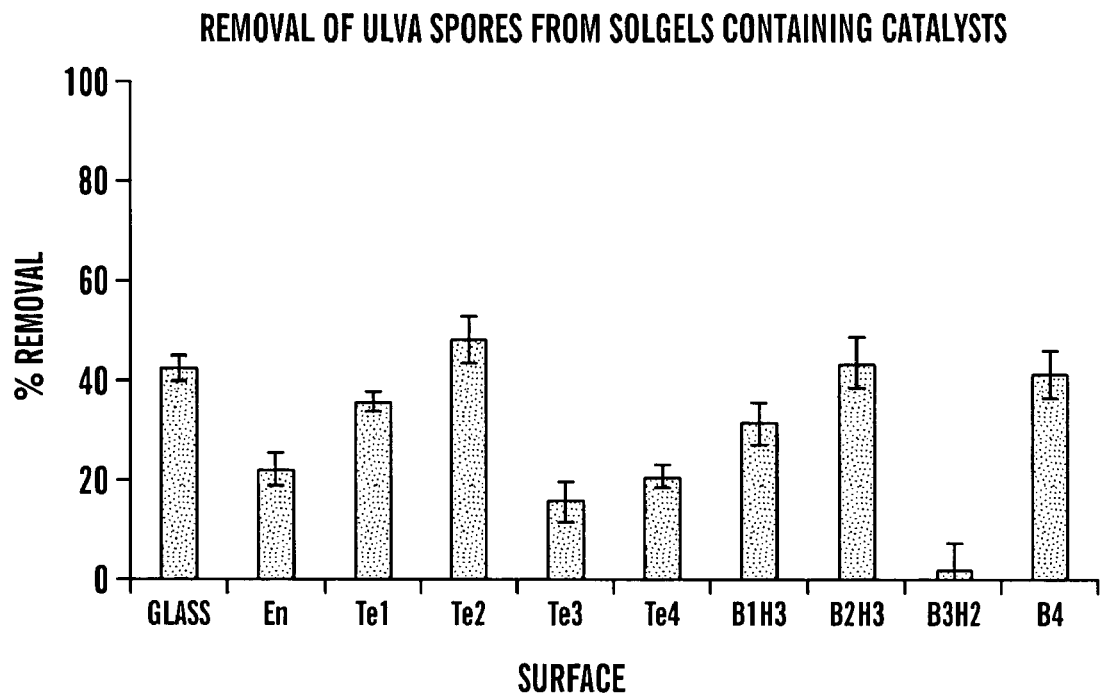
FIG. 44 is a graph showing detachment plotted as percent removal following exposure to water jet surface pressure of 64 kPa. Each point represents the mean percentage removal of zoospores from 90 observations of controls and 90 observations of treatments from three replicate slides. Bars represent 95% confidence limits from arcsine transformed data.

The number of spores remaining after exposure to water pressure of 64 kPa is shown in FIG. 43. Removal on a percentage basis is shown in FIG. 44. Spore removal from all surfaces was similar or lower than from glass. Greatest removal was from the Te2 catalyst, the other catalysts performed poorly. The B1H3 control did not perform as well as in the previous experiment in which removal was nearly twice that from glass. In this experiment, removal from glass was generally higher than in the previous experiment. This may reflect a seasonal difference in the spores.

Methods—Growth of Sporelings

Sporelings were grown in nutrient supplemented natural seawater medium containing 20 µM hydrogen peroxide. The medium was changed every two days.

Results and Discussion—Growth of Sporelings

Figure 45:
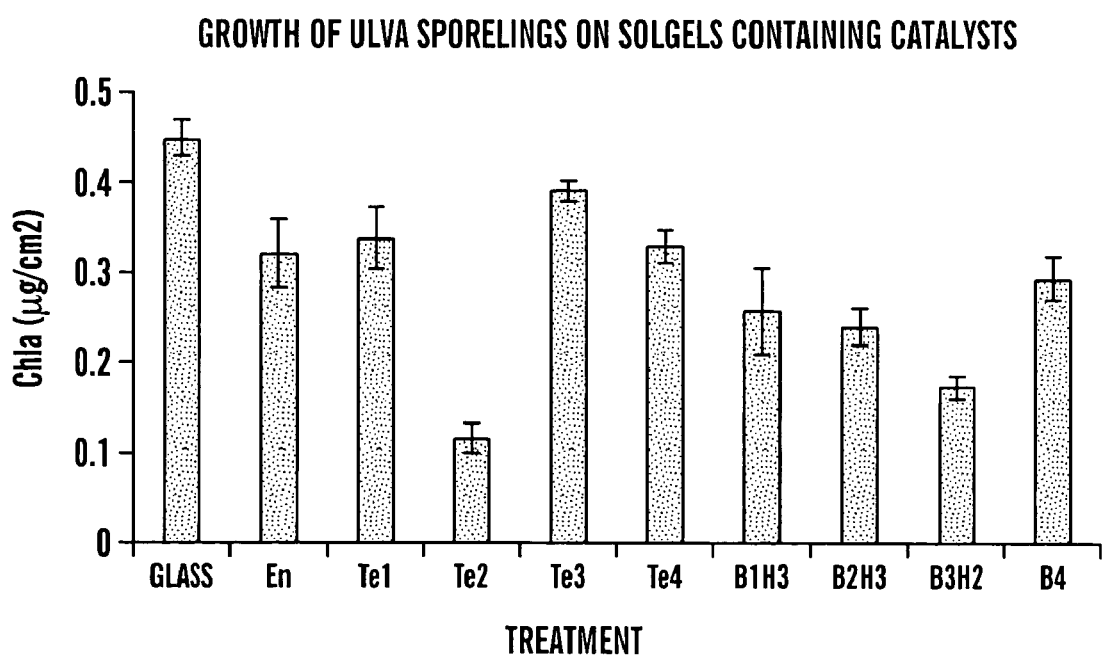
FIG. 45 is a graph showing the growth of sporelings after eight days, measured as chlorophyll α (μg cm$^{-2}$). Each point represents the mean of four slides with standard errors represented as bars.
Figure 46:
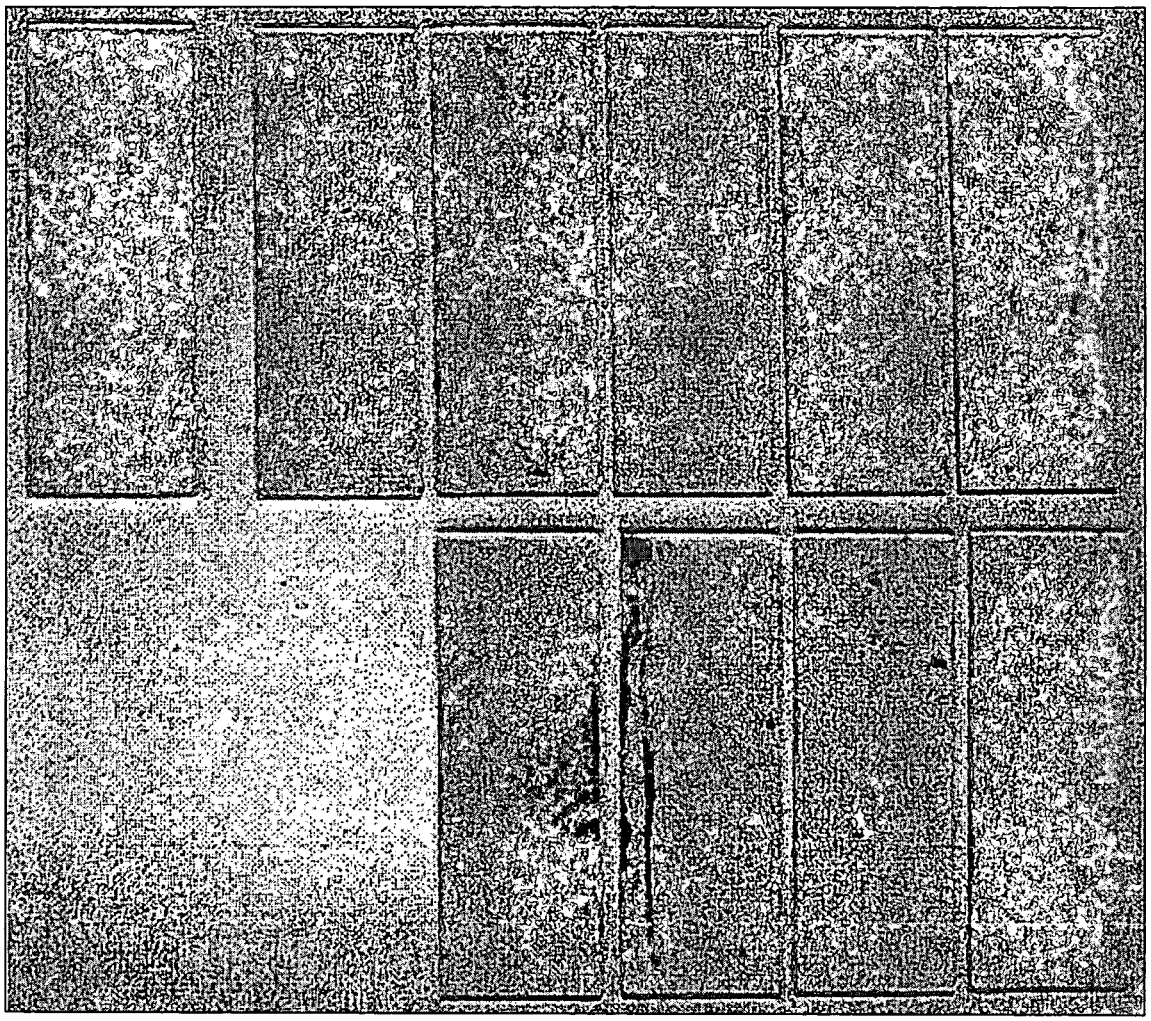
FIG. 46 shows images of typical slides demonstrating growth of sporelings after eight days. Top row from left: Glass, En, Te1, Te2, Te3, Te4. Bottom row from left: B1H3, B2H3, B3H2, B4.

The growth of sporelings on the sol-gel bases is shown in FIG. 45. Images of typical sporeling biofilms are shown in FIG. 46. Growth on the sol-gel surfaces was patchy. This was especially noticeable on the control slides. The catalyst containing coatings supported a more uniform sward. The growth on all the sol-gels was less than on glass. On active sol-gels, the growth was approximately 75% of that on glass except for Te2 on which growth was much lower at approximately 25%. However, the low growth on Te2 probably reflected a low spore settlement density rather toxicity.

Figure 47:
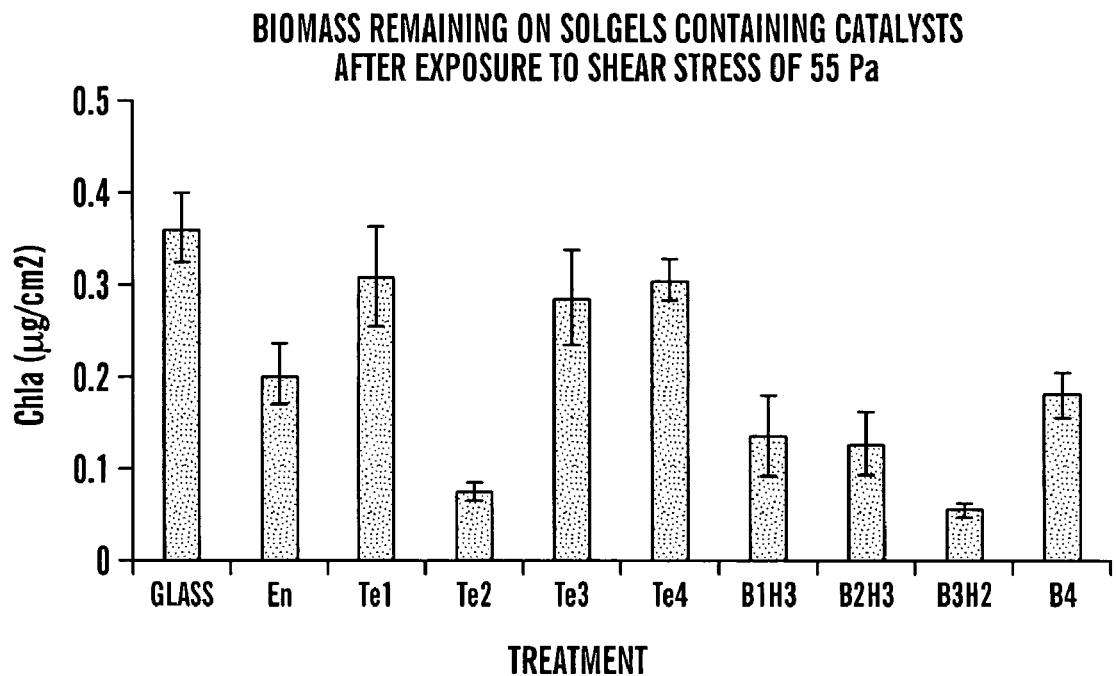
FIG. 47 is a graph showing sporeling biomass remaining after exposure to shear stress of 53 Pa. Each point is the mean from four replicate slides. Bars represent standard error of the mean.
Figure 48:
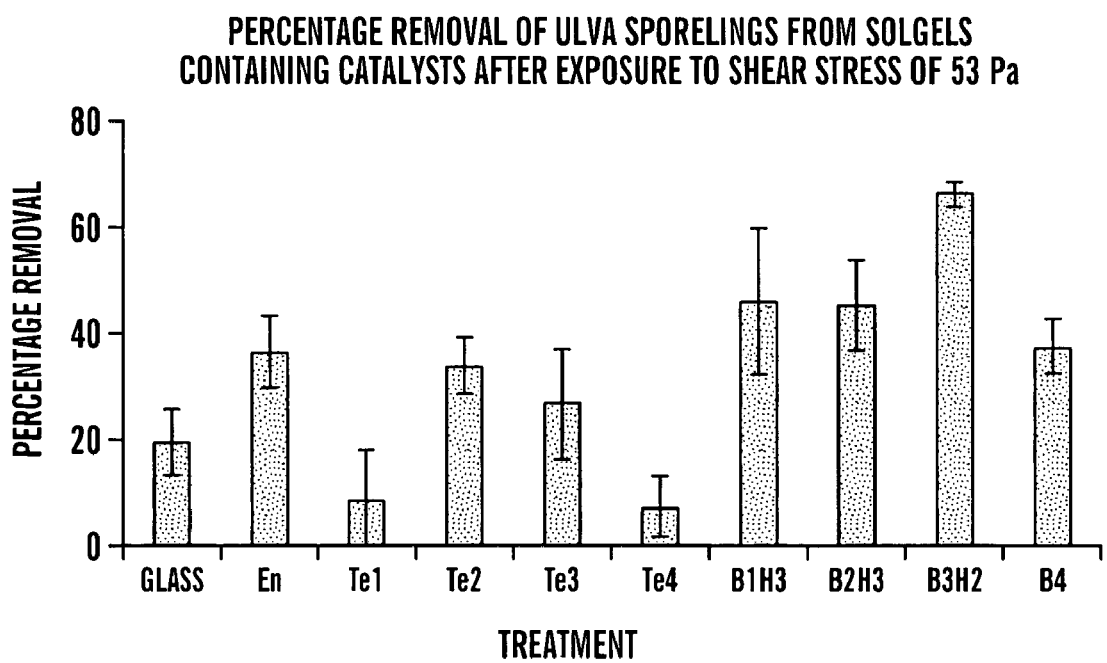
FIG. 48 is a graph showing detachment plotted as percent removal. Each point represents the mean percentage removal of sporeling biomass from four replicate slides. Bars represent standard error of the mean from arcsine transformed data.

The biomass remaining after exposure to a shear stress of 53 Pa in the water channel is shown in FIG. 47. The percent of biomass remaining is shown in FIG. 48. Overall removal tended to be greater from the sol-gels than from glass. However removal was greater from the control surfaces than from the active sol-gels. This suggests than the hypochlorous acid production had not been sufficient to limit growth or reduce attachment strength.

Thus, generally settlement was greater on the active sol-gels than on glass (excepting the hydrophilic Te2). Strength of attachment was lower on the active sol-gels than on glass; but was generally lower still on the control slides. Sporeling growth on the active sol-gels was lower than on glass, but was even lower on the sol-gel controls. Sporeling strength of attachment on the active sol-gels was lower than on glass, but was lower still on the control sol-gels. Overall, spore settlement, spore strength of attachment, sporeling growth, and sporeling strength of attachment appear to be influenced more by the physical properties of the sol-gel coating than by the incorporation of the catalyst. No positive effects of catalysts were found.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

What is claimed is:

1. A coating composition comprising:
   a sol-gel matrix and
   a dendrimeric organochalcogeno derivative bound to at least a portion of the sol-gel matrix, wherein the dendrimeric organochalcogeno derivative has the formula:

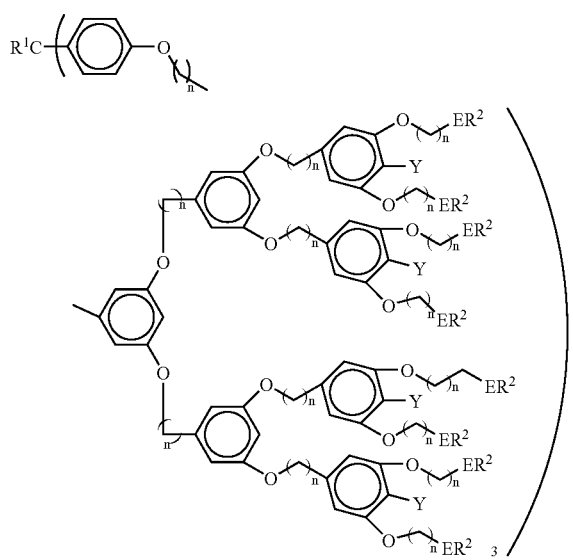

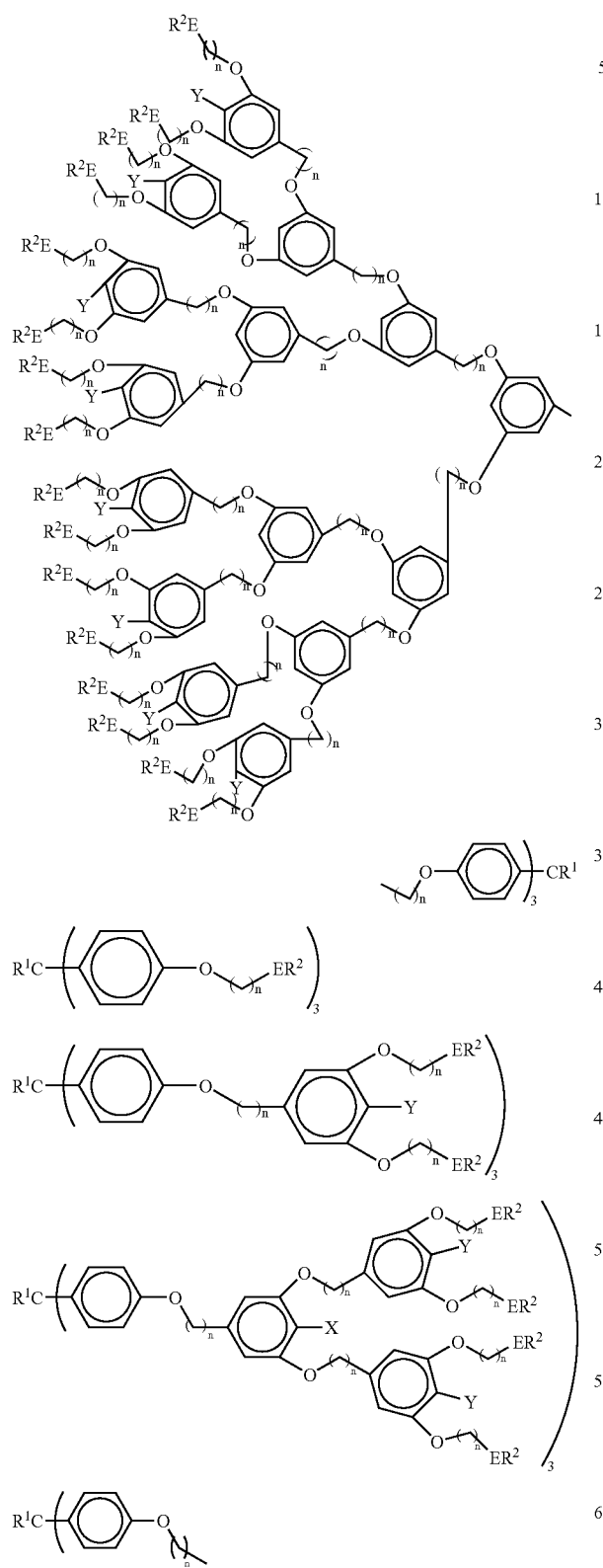
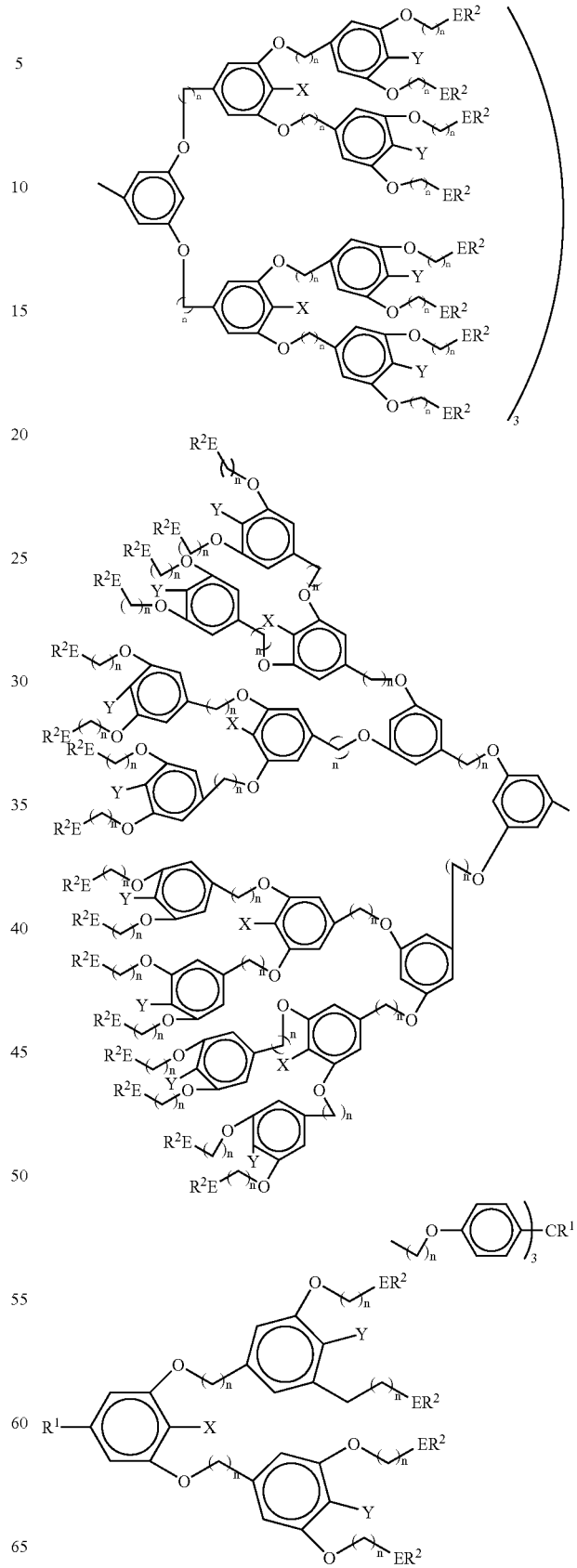

-continued

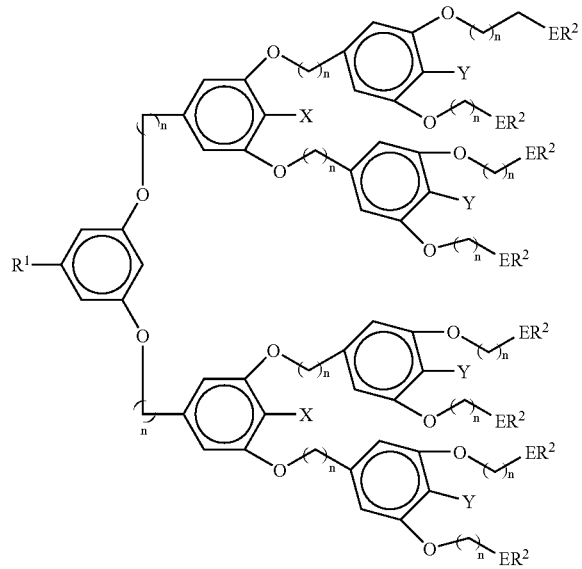

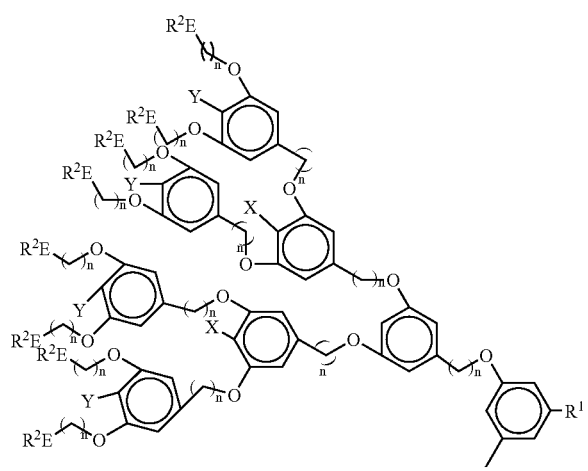

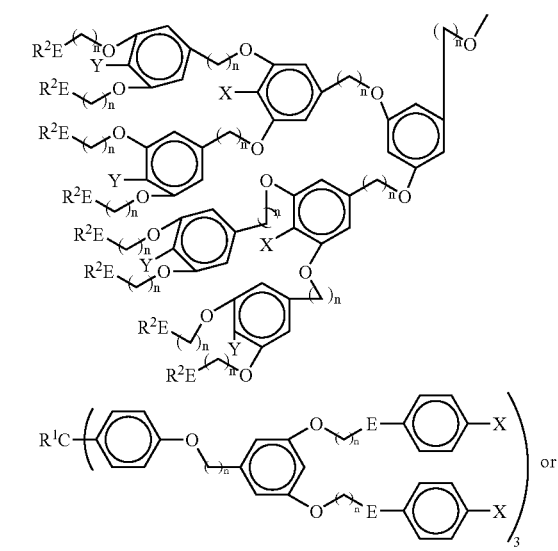

-continued

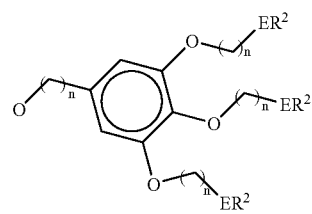

wherein each Y individually is H or $O(CH_2)_nER^2$,
each X individually is H, $N((CH_2)_nCO_2Na)_2$ or

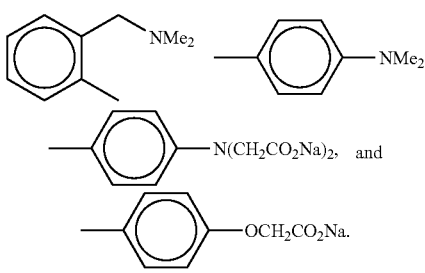

$R^1$ is a substituted or unsubstituted, straight or branched chain C1-C10 alkyl group, a substituted or unsubstituted, straight or branched chain C1-C10 alkenyl group, a substituted or unsubstituted aryl group, or a substituted or unsubstituted heteroaryl group, each E individually is a chalcogen, each $R^2$ individually is a substituted or unsubstituted, straight or branched chain C1-C16 alkyl group, a substituted or unsubstituted aryl group, a substituted or unsubstituted heteroaryl group, an ethylene glycol oligomer, or a perfluoroalkyl group, and each n individually is an integer from 1 to 16.

2. The coating composition according to claim 1, wherein $ER^2$ is selected from the group consisting of EPh, $4\text{-}(CH_3)_2C_6H_4E$, $4\text{-}(CH_3)_2NC_6H_4E$, $4\text{-}HOC_6H_4E$, $4\text{-}(CH_3O_2CCH_2)_2NC_6H_4E$, $4\text{-}(NaO_2CCH_2)_2NC_6H_4E$, $4\text{-}(HOCH_2CH_2)_2NC_6H_4E$, and $4\text{-}(NaO_2CCH_2O)C_6H_4E$.

3. The coating composition according to claim 1, wherein $R^2$ is selected from the group consisting of phenyl, $n\text{-}C_6H_{13}$,

4. The coating composition according to claim 1, wherein the dendrimeric organochalcogeno derivative is non-covalently bound to at least a portion of the sol-gel matrix.

5. The coating composition according to claim 1, wherein the dendrimeric organochalcogeno derivative is covalently bound to at least a portion of the sol-gel matrix.

6. The coating composition according to claim 1, wherein from about 0.1 wt. % to about 5 wt. % of the dendrimeric organochalcogeno derivative is bound to the sol-gel matrix.

7. The coating composition according to claim 1, wherein the sol-gel matrix is a sol-gel processed xerogel.

8. The coating composition according to claim 7, wherein the xerogel is formed from doped or undoped tetramethylorthosilane, doped or undoped tetraethylorthosilane, hybrid n-propyl-trimethoxysilane/tetramethylorthosilane, hybrid bis[3-(trimethoxysilyl)propyl]ethylenediamine)/tetraethylorthosilane, hybrid tetramethylorthosilane/n-propyl-trimethoxysilane/bis [3-(trimethoxysilyl)propyl]ethylenedi amine), or hybrid tetramethylorthosilane/n-octyl-triethoxysilane.

9. A system comprising:
- a coating composition comprising
  - a sol-gel matrix and
  - a dendrimeric organochalcogeno derivative bound to at least a portion of the sol-gel matrix, and
- a substrate, wherein at least a portion of the substrate is coated with the coating composition, wherein the dendrimeric organochalcogeno derivative has the formula:

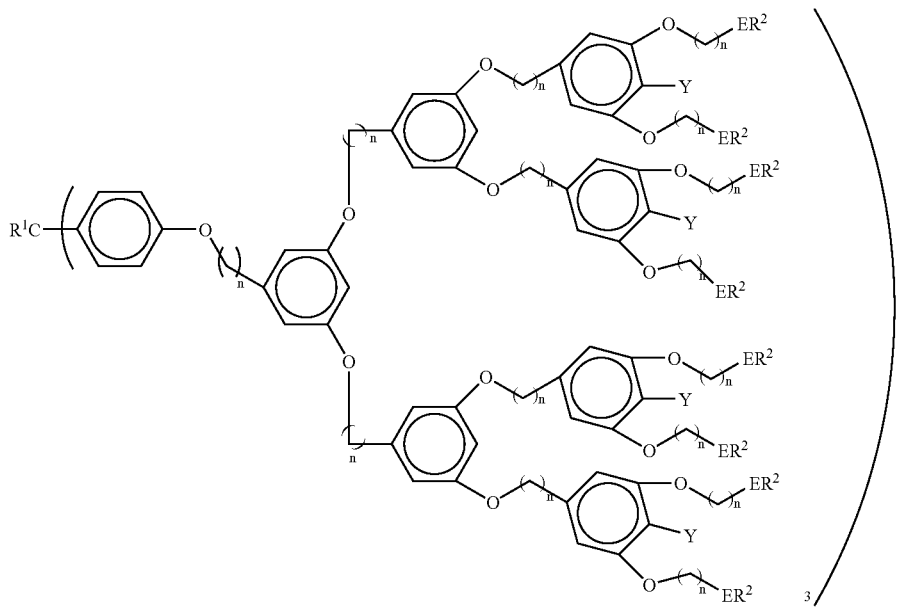

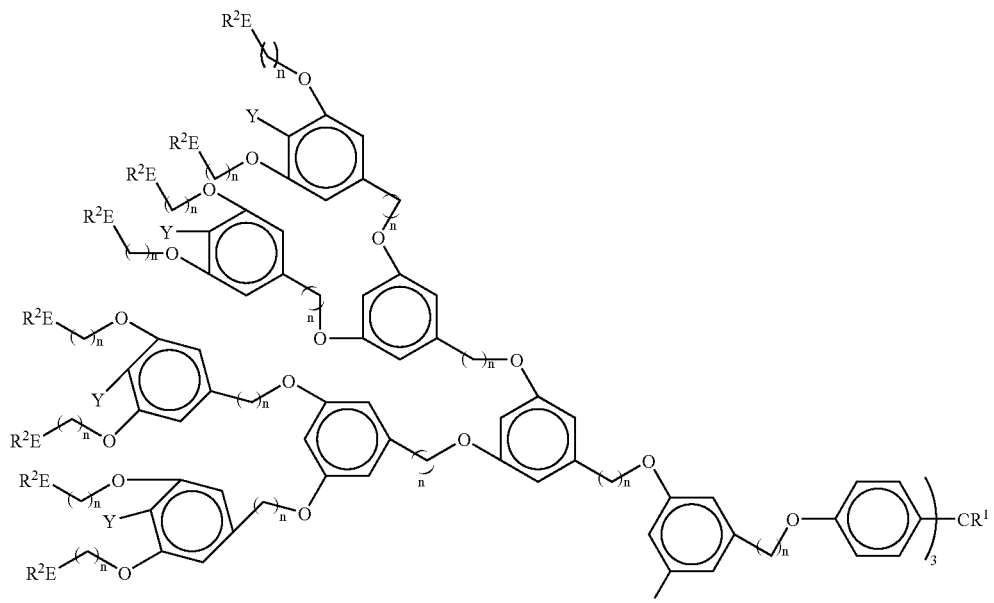

-continued
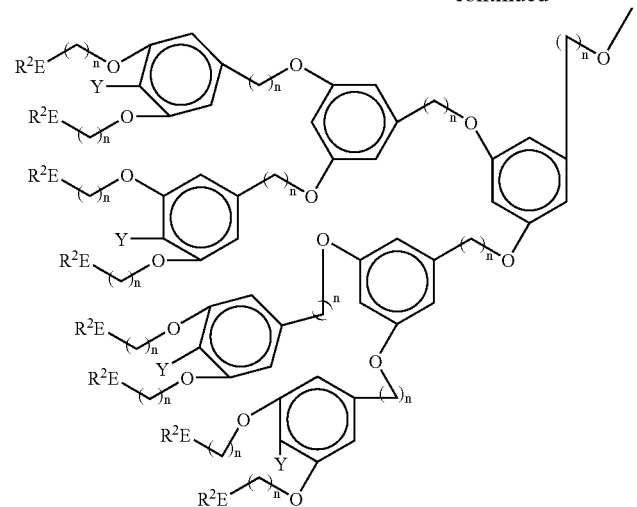
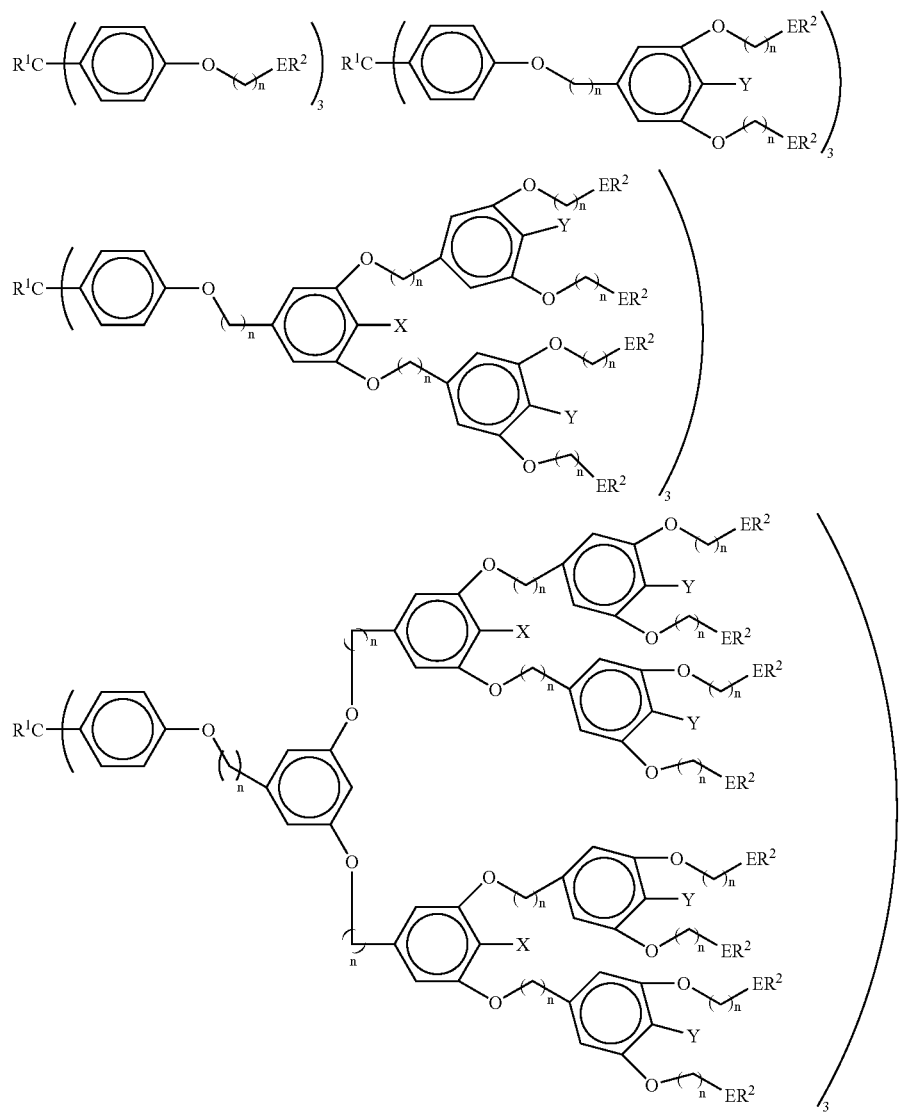

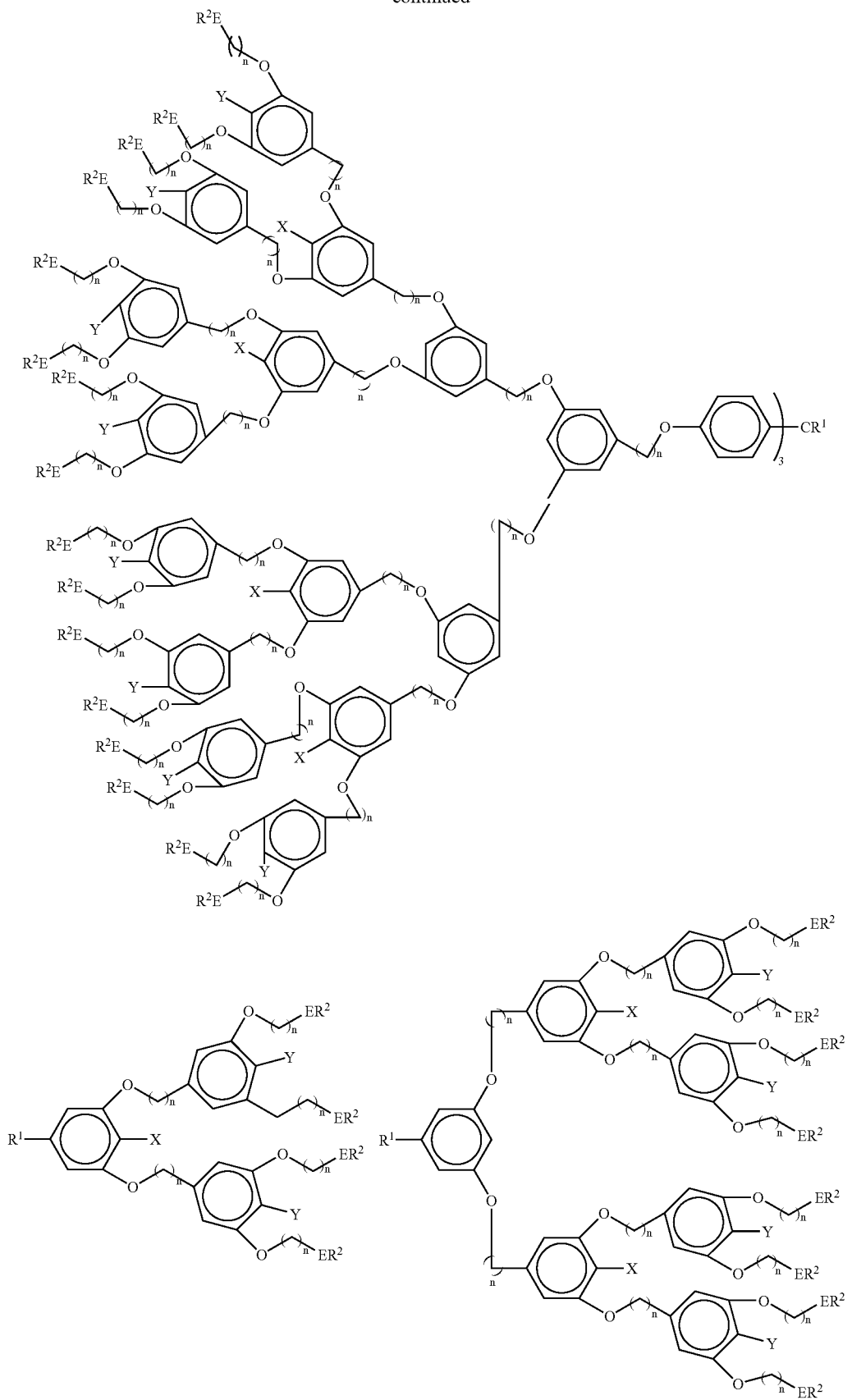

-continued
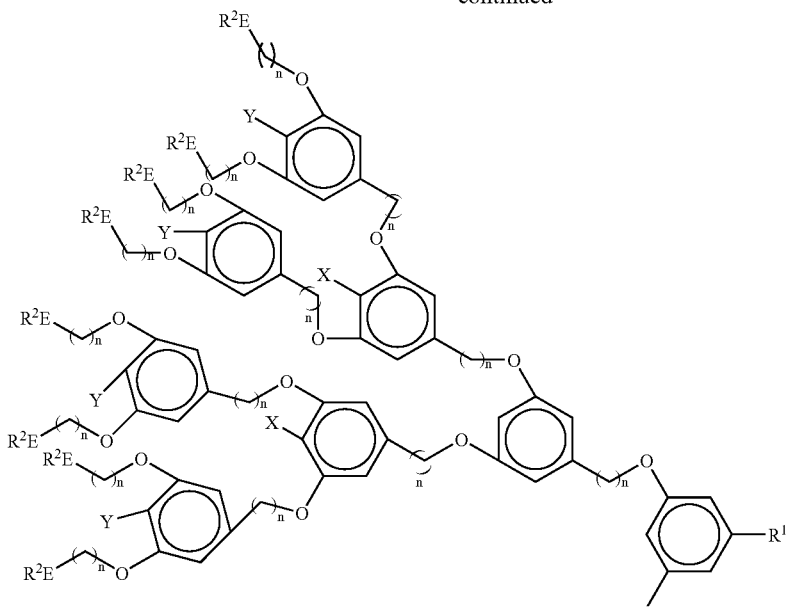
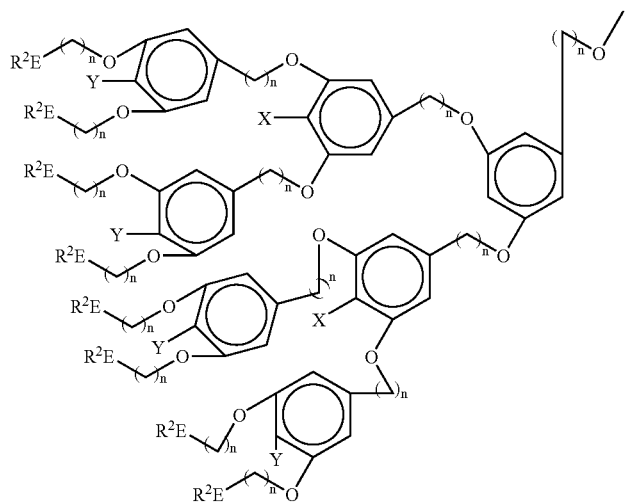
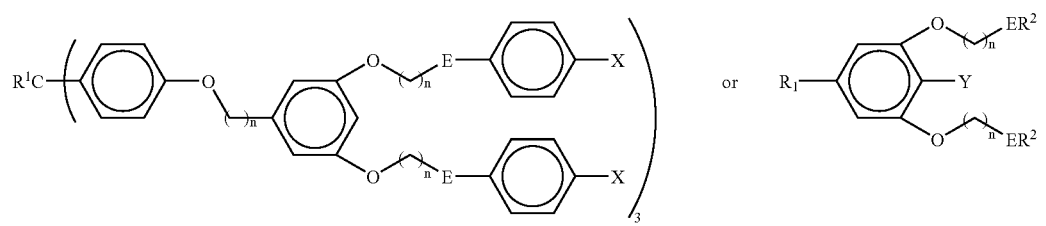

wherein each Y individually is H or O(CH$_2$)$_n$ER$^2$,
each X individually is H, N((CH$_2$)$_n$CO$_2$Na)$_2$ or

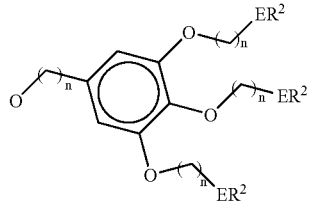

R$^1$ is a substituted or unsubstituted, straight or branched chain C1-C10 alkyl group, a substituted or unsubstituted, straight or branched chain C1-C10 alkenyl group, a substituted or unsubstituted aryl group, or a substituted or unsubstituted heteroaryl group, each E individually is a chalcogen, each R$^2$ individually is a substituted or unsubstituted, straight or branched chain C1-C16 alkyl group, a substituted or unsubstituted aryl group, a substituted or unsubstituted heteroaryl group, an ethylene glycol oligomer, or a perfluoroalkyl group, and each n individually is an integer from 1 to 16.

10. The system according to claim 9, wherein ER$^2$ is selected from the group consisting of EPh, 4-(CH$_3$)$_2$C$_6$H$_4$E, 4-(CH$_3$)$_2$NC$_6$H$_4$E, 4-HOC$_6$H$_4$E, 4-(CH$_3$O$_2$CCH$_2$)$_2$NC$_6$H$_4$E, 4-(NaO$_2$CCH$_2$)$_2$NC$_6$H$_4$E, 4-(HOCH$_2$CH$_2$)$_2$NC$_6$H$_4$E, and 4-(NaO$_2$CCH$_2$O)C$_6$H$_4$E.

11. The system according to claim 9, wherein R$^2$ is selected from the group consisting of phenyl, n-C$_6$H$_{13}$,

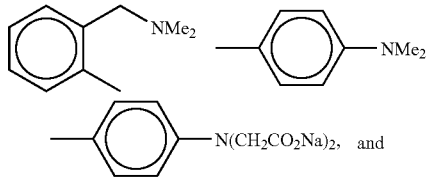

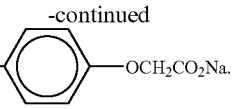

12. The system according to claim 9, wherein the dendrimeric organochalcogeno derivative is non-covalently bound to at least a portion of the sol-gel matrix.

13. The system according to claim 9, wherein the dendrimeric organochalcogeno derivative is covalently bound to at least a portion of the sol-gel matrix.

14. The system according to claim 9, wherein from about 0.1 wt. % to about 5 wt. % of the dendrimeric organochalcogeno derivative is bound to the sol-gel matrix.

15. The system according to claim 9, wherein the substrate is selected from the group consisting of metals, plastics, glass, and wood.

16. The system according to claim 9, wherein the sol-gel matrix is a sol-gel processed xerogel.

17. The system according to claim 16, wherein the xerogel is formed from doped or undoped tetramethylorthosilane, doped or undoped tetraethylorthosilane, hybrid n-propyltrimethoxysilane/tetramethylorthosilane, hybrid bis[3-(trimethoxysilyl)propyl]ethylenediamine)/tetraethylorthosilane, hybrid tetramethylorthosilane/n-propyltrimethoxysilane/bis [3-(trimethoxysilyl)propyl] ethylenediamine), or hybrid tetramethylorthosilane/n-octyltriethoxysilane.

18. A method of preventing fouling of surfaces subjected to a marine environment, said method comprising:
  providing a coating composition comprising:
    a sol-gel matrix and
    a dendrimeric organochalcogeno derivative bound to at least a portion of the sol-gel matrix, and
  applying the coating composition to a surface subjected to a marine environment under conditions effective to prevent or reduce fouling of the surface, wherein the dendrimeric organochalcogeno derivative has the formula:

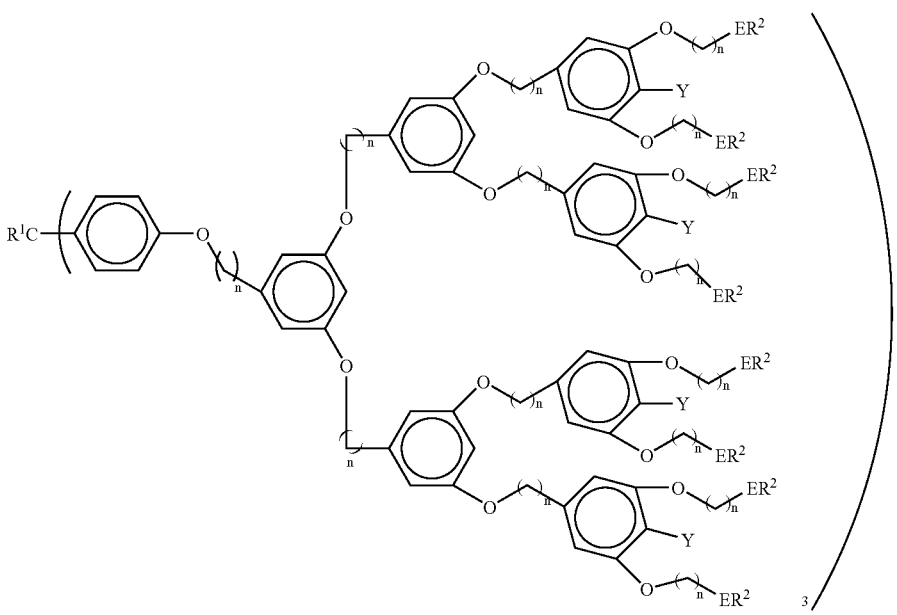

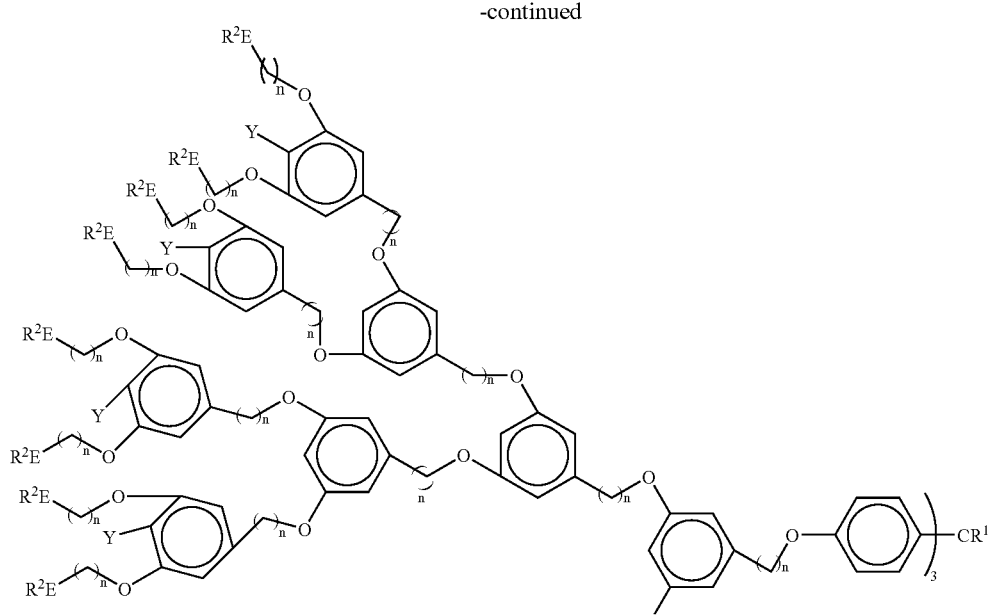
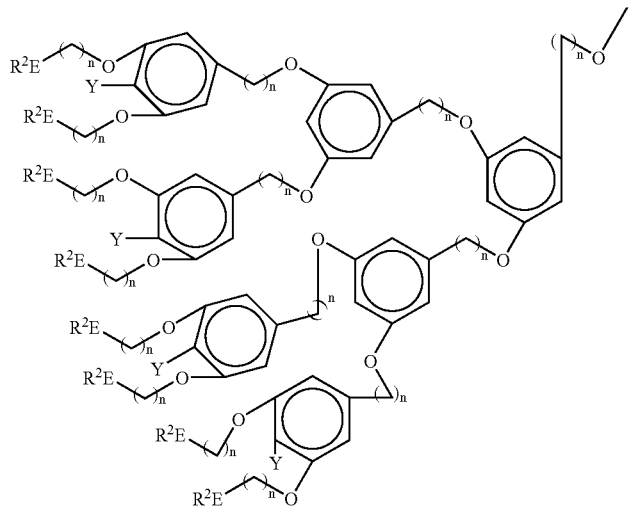
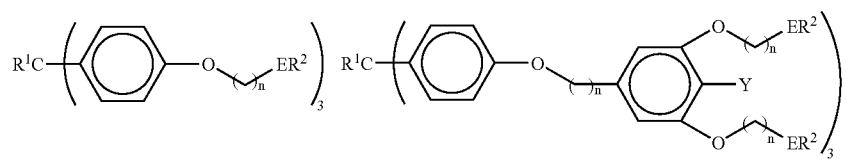
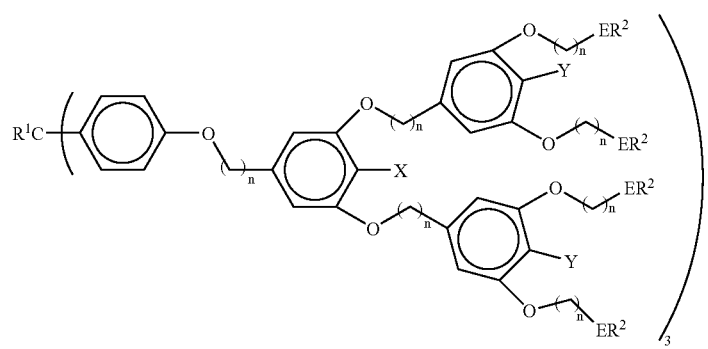

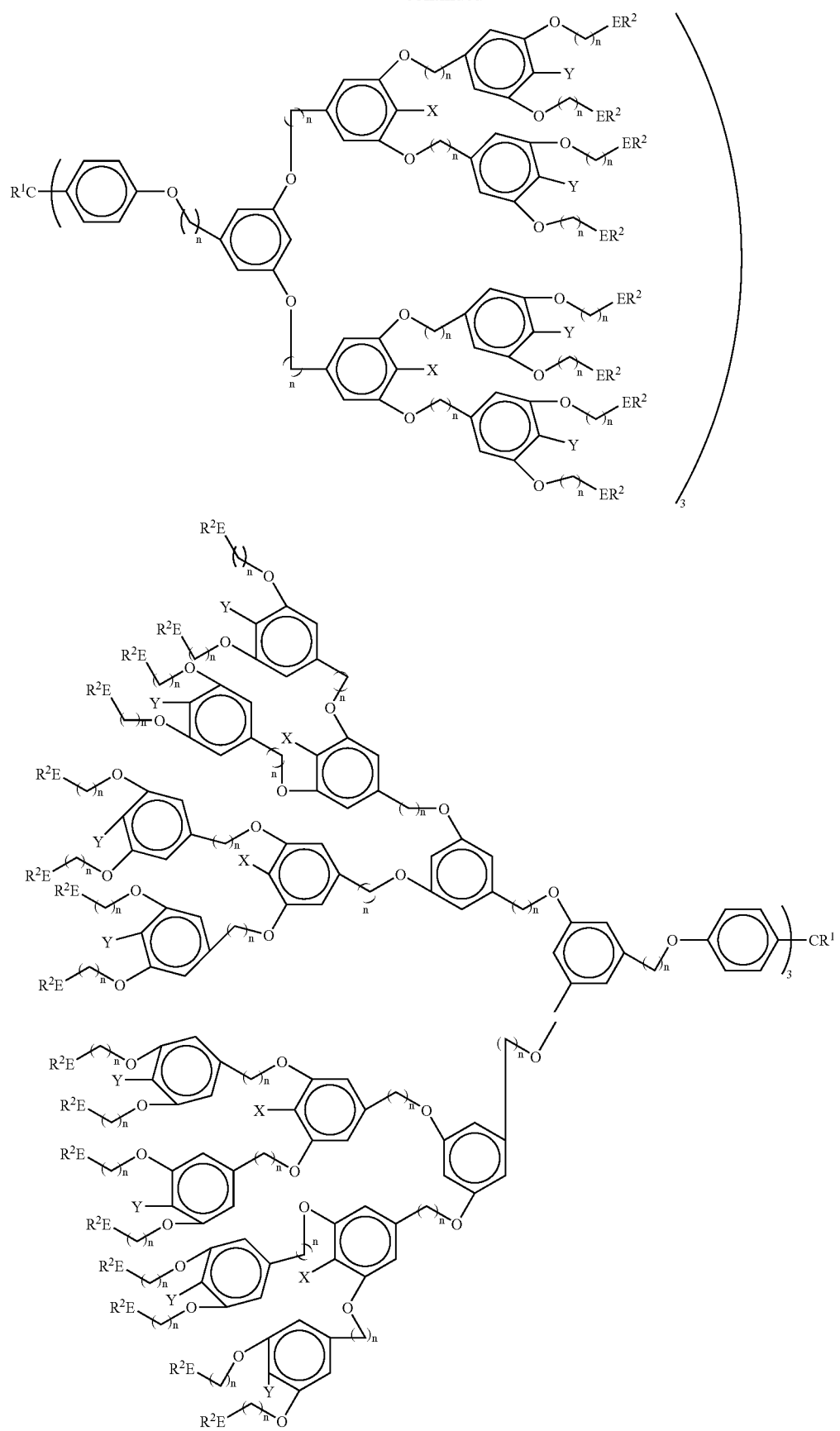

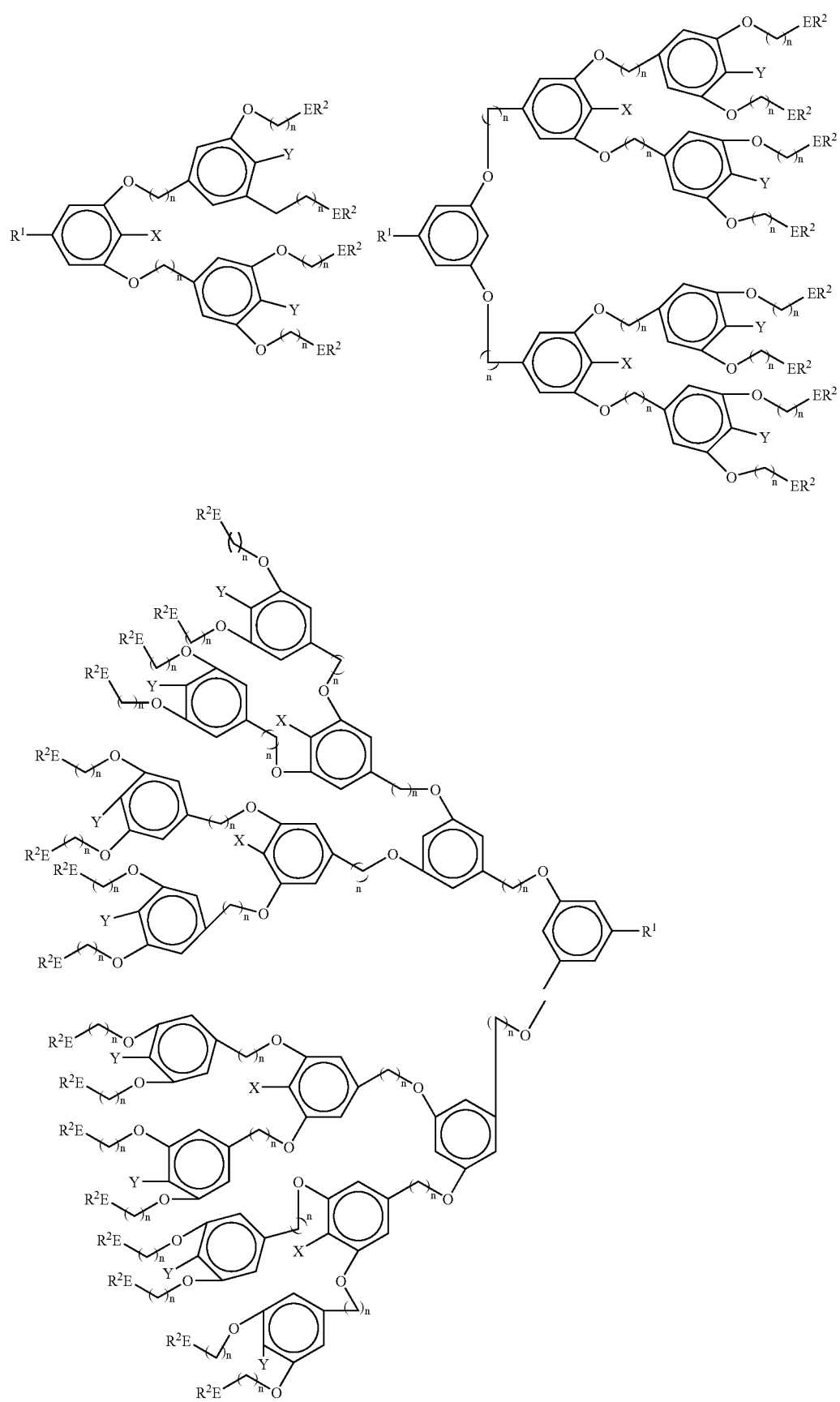

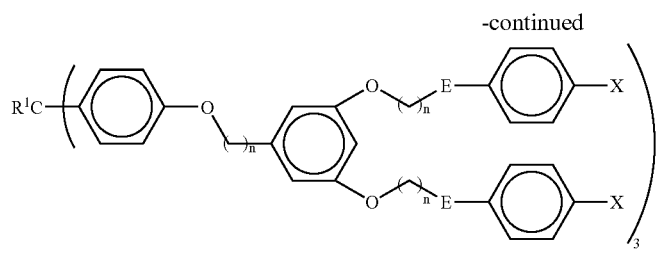
or
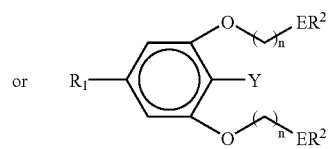

wherein each Y individually is H or $O(CH_2)_nER^2$,
each X individually is H, $N((CH_2)_nCO_2Na)_2$ or

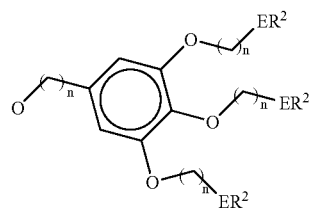

$R_1$ is a substituted or unsubstituted, straight or branched chain C1-C10 alkyl group, a substituted or unsubstituted, straight or branched chain C1-C10 alkenyl group, a substituted or unsubstituted aryl group, or a substituted or unsubstituted heteroaryl group, each E individually is a chalcogen, each $R^2$ individually is a substituted or unsubstituted, straight or branched chain C1-C16 alkyl group, a substituted or unsubstituted aryl group, a substituted or unsubstituted heteroaryl group, an ethylene glycol oligomer, or a perfluoroalkyl group, and each n individually is an integer from 1 to 16.

19. The method according to claim 18, wherein $ER^2$ is selected from the group consisting of EPh, $4\text{-}(CH_3)_2C_6H_4E$, $4\text{-}(CH_3)_2NC_6H_4E$, $4\text{-}HOC_6H_4E$, $4\text{-}(CH_3O_2CCH_2)_2NC_6H_4E$, $4\text{-}(NaO_2CCH_2)_2NC_6H_4E$, $4\text{-}(HOCH_2CH_2)_2NC_6H_4E$, and $4\text{-}(NaO_2CCH_2O)C_6H_4E$.

20. The method according to claim 18, wherein $R^2$ is selected from the group consisting of phenyl, $n\text{-}C_6H_{13}$,

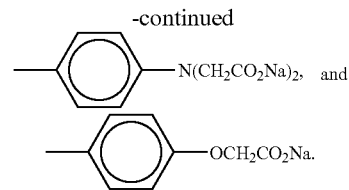

-continued

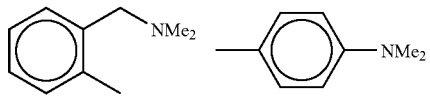

21. The method according to claim 18, wherein the dendrimeric organochalcogeno derivative is non-covalently bound to at least a portion of the sol-gel matrix.

22. The method according to claim 18, wherein the dendrimeric organochalcogeno derivative is covalently bound to at least a portion of the sol-gel matrix.

23. The method according to claim 18, wherein from about 0.1 wt. % to about 5 wt. % of the dendrimeric organochalcogeno derivative is bound to the sol-gel matrix.

24. The method according to claim 18, wherein the surface is selected from the group consisting of metals, plastics, glass, and wood.

25. The method according to claim 18, wherein applying comprises spraying, dipping, spreading, or brushing.

26. The method according to claim 18, wherein the sol-gel matrix is a sol-gel processed xerogel.

27. The method according to claim 26, wherein the xerogel is formed from doped or undoped tetramethylorthosilane, doped or undoped tetraethylorthosilane, hybrid n-propyl-trimethoxysilane/tetramethylorthosilane, hybrid bis[3-(trimethoxysilyl)propyl]ethylenediamine)/tetraethylorthosilane, hybrid tetramethylorthosilane/n-propyl-trimethoxysilane/bis[3-(trimethoxysilyl)propyl]ethylenediamine), or hybrid tetramethylorthosilane/n-octyl-triethoxysilane.

* * * * *